(12) United States Patent
Takao

(10) Patent No.: US 12,157,658 B2
(45) Date of Patent: Dec. 3, 2024

(54) CONTROL DEVICE, MOBILE BODY, MOVEMENT CONTROL SYSTEM, CONTROL METHOD, AND PROGRAM

(71) Applicant: MITSUBISHI HEAVY INDUSTRIES, LTD., Tokyo (JP)

(72) Inventor: Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 226 days.

(21) Appl. No.: 17/800,712

(22) PCT Filed: Feb. 5, 2021

(86) PCT No.: PCT/JP2021/004422
§ 371 (c)(1),
(2) Date: Aug. 18, 2022

(87) PCT Pub. No.: WO2021/171974
PCT Pub. Date: Sep. 2, 2021

(65) Prior Publication Data
US 2023/0348247 A1 Nov. 2, 2023

(30) Foreign Application Priority Data

Feb. 27, 2020 (JP) .................................. 2020-032155
Mar. 16, 2020 (JP) .................................. 2020-045507

(51) Int. Cl.
*B66F 9/075* (2006.01)
*B66F 9/06* (2006.01)
*G05D 1/00* (2024.01)

(52) U.S. Cl.
CPC ............ *B66F 9/0755* (2013.01); *B66F 9/063* (2013.01); *G05D 1/0214* (2013.01); *G05D 1/0225* (2013.01)

(58) Field of Classification Search
CPC ..... B66F 9/0755; B66F 9/063; G05D 1/0214; G05D 1/0225
(Continued)

(56) References Cited

U.S. PATENT DOCUMENTS 9,792,575 B2 * 10/2017 Khasis ................. G05D 1/0088
10,551,201 B2 * 2/2020 Yunoki ................. B60W 30/08
(Continued)

FOREIGN PATENT DOCUMENTS

GB 2550666 A * 11/2017 .......... B65G 1/0492
JP 2017-182502 A 10/2017

OTHER PUBLICATIONS

International Search Report, issued in PCT/JP2021/004422, PCT/ISA/210, dated May 11, 2021.
(Continued)

*Primary Examiner* — Krishnan Ramesh
(74) *Attorney, Agent, or Firm* — Birch, Stewart, Kolasch & Birch, LLP

(57) ABSTRACT

A control device is for a mobile machine that is provided in a mobile machine configured to automatically move. The control device includes a target object information acquisition unit that acquires a detection result of a direction of a target object; a region setting unit that sets a prohibited region through which a trajectory of the mobile machine is prohibited from passing, from the direction of the target object; a trajectory setting unit that sets a trajectory from the mobile machine to a target position where the mobile machine is in a predetermined position and direction with respect to the target object such that the trajectory does not pass through the prohibited region; and a movement control unit that moves the mobile machine based on the trajectory.

22 Claims, 32 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 10,850,961 | B2* | 12/2020 | Tanaka | G01B 11/002 |
| 11,059,177 | B1* | 7/2021 | Arora | B25J 9/1674 |
| 11,370,115 | B2* | 6/2022 | Cohen | G01C 21/30 |
| 2016/0244277 | A1* | 8/2016 | Paulussen | B65G 1/1378 |
| 2017/0262790 | A1* | 9/2017 | Khasis | G08G 1/012 |
| 2017/0285643 | A1 | 10/2017 | Ichinose et al. | |
| 2018/0155169 | A1* | 6/2018 | Tanaka | G05D 1/0225 |
| 2018/0252539 | A1* | 9/2018 | Yunoki | B60W 30/10 |
| 2019/0194005 | A1* | 6/2019 | Shah | G06T 7/73 |
| 2020/0391384 | A1* | 12/2020 | Cohen | G05D 1/0212 |
| 2021/0205993 | A1* | 7/2021 | Arora | G05B 23/0272 |

OTHER PUBLICATIONS

Written Opinion of the International Searching Authority, issued in PCT/JP2021/004422, PCT/ISA/237, dated May 11, 2021.

* cited by examiner

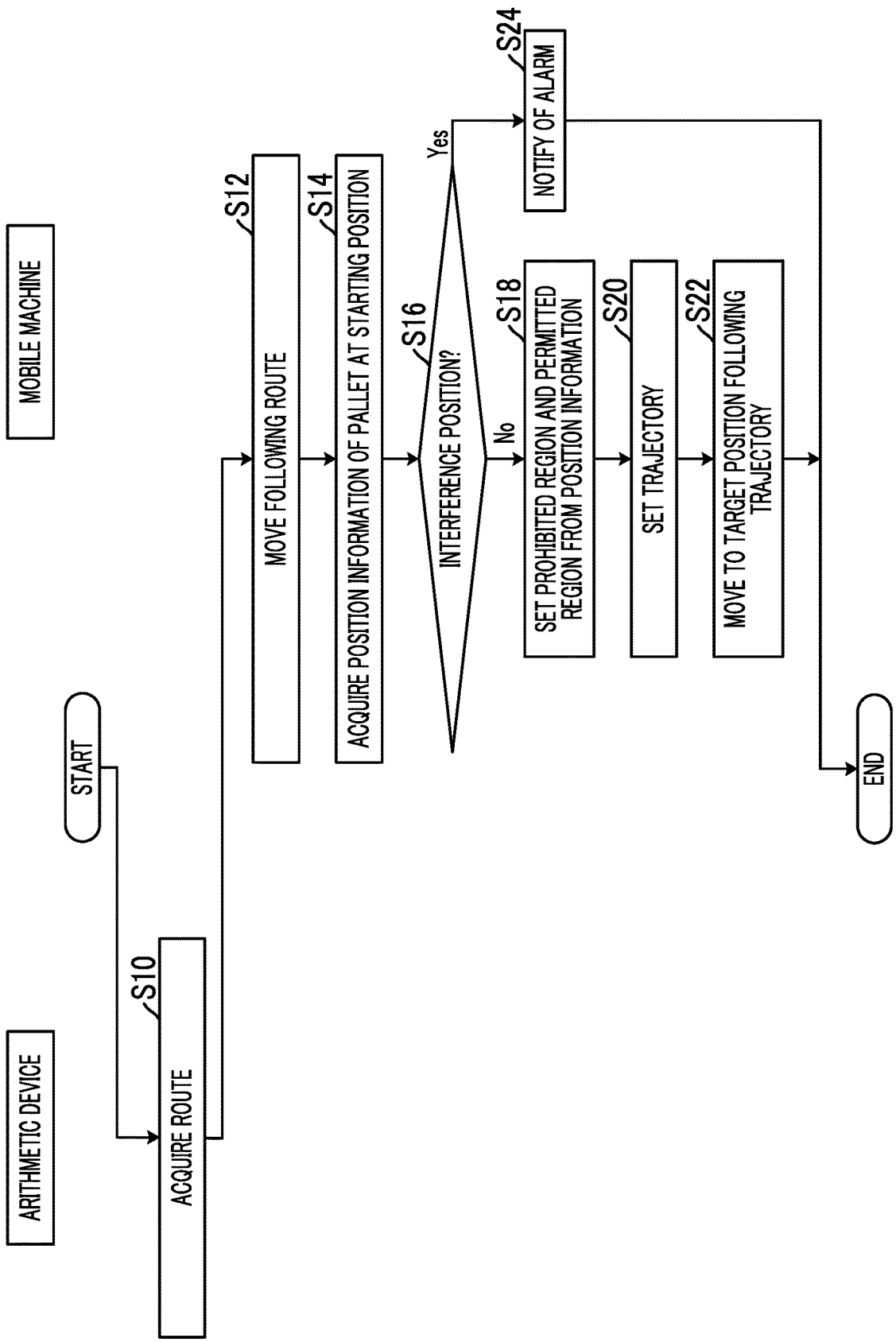

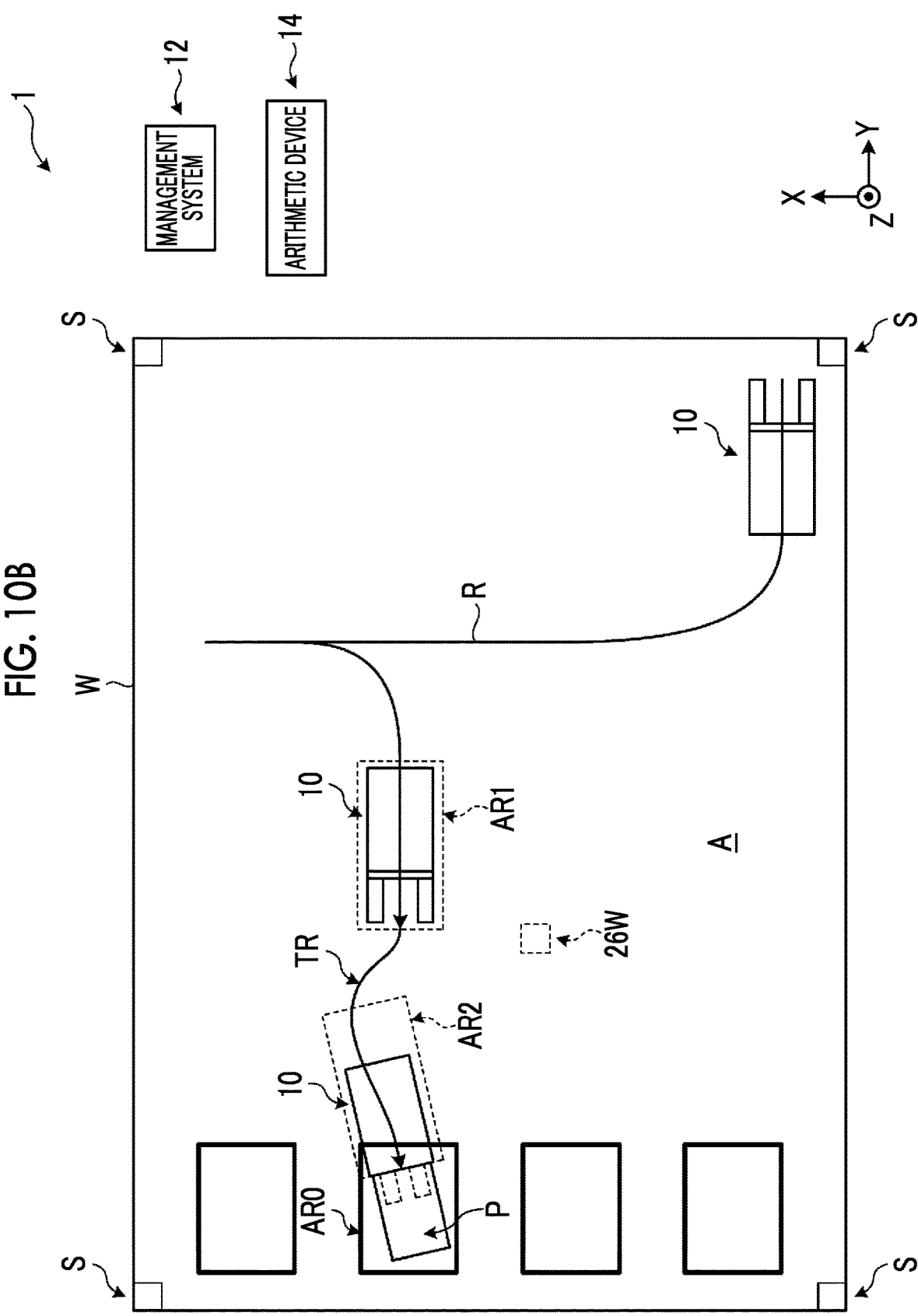

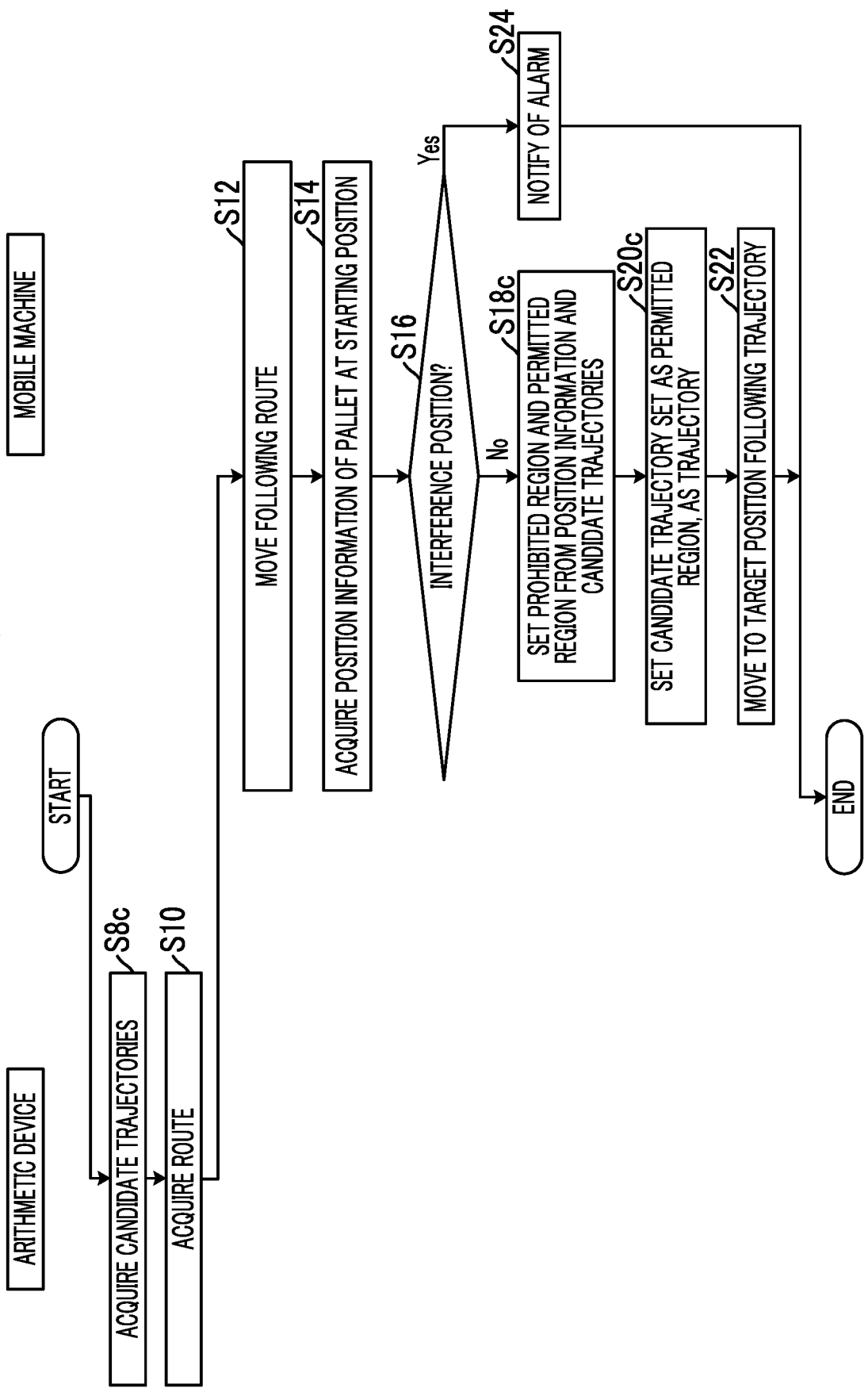

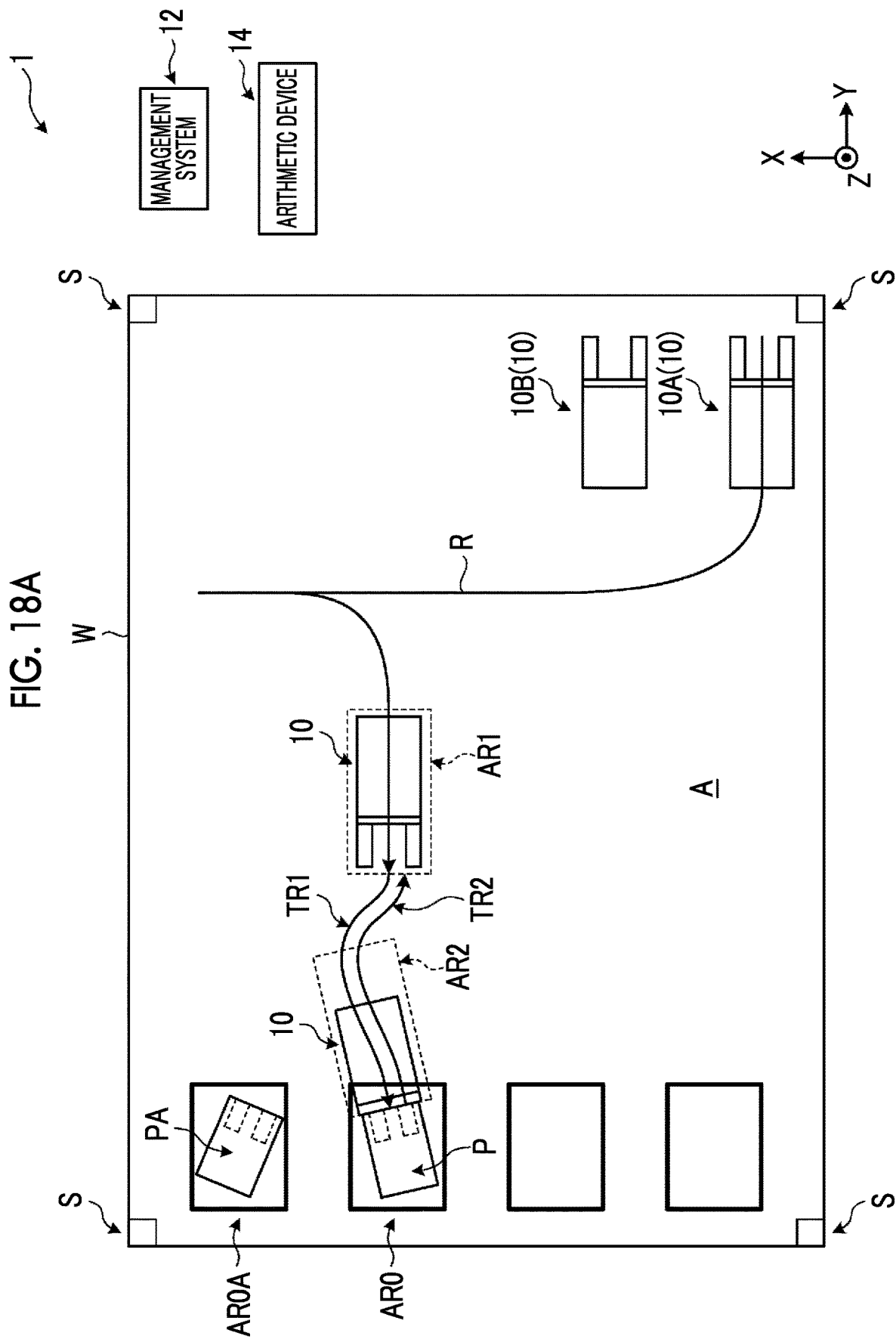

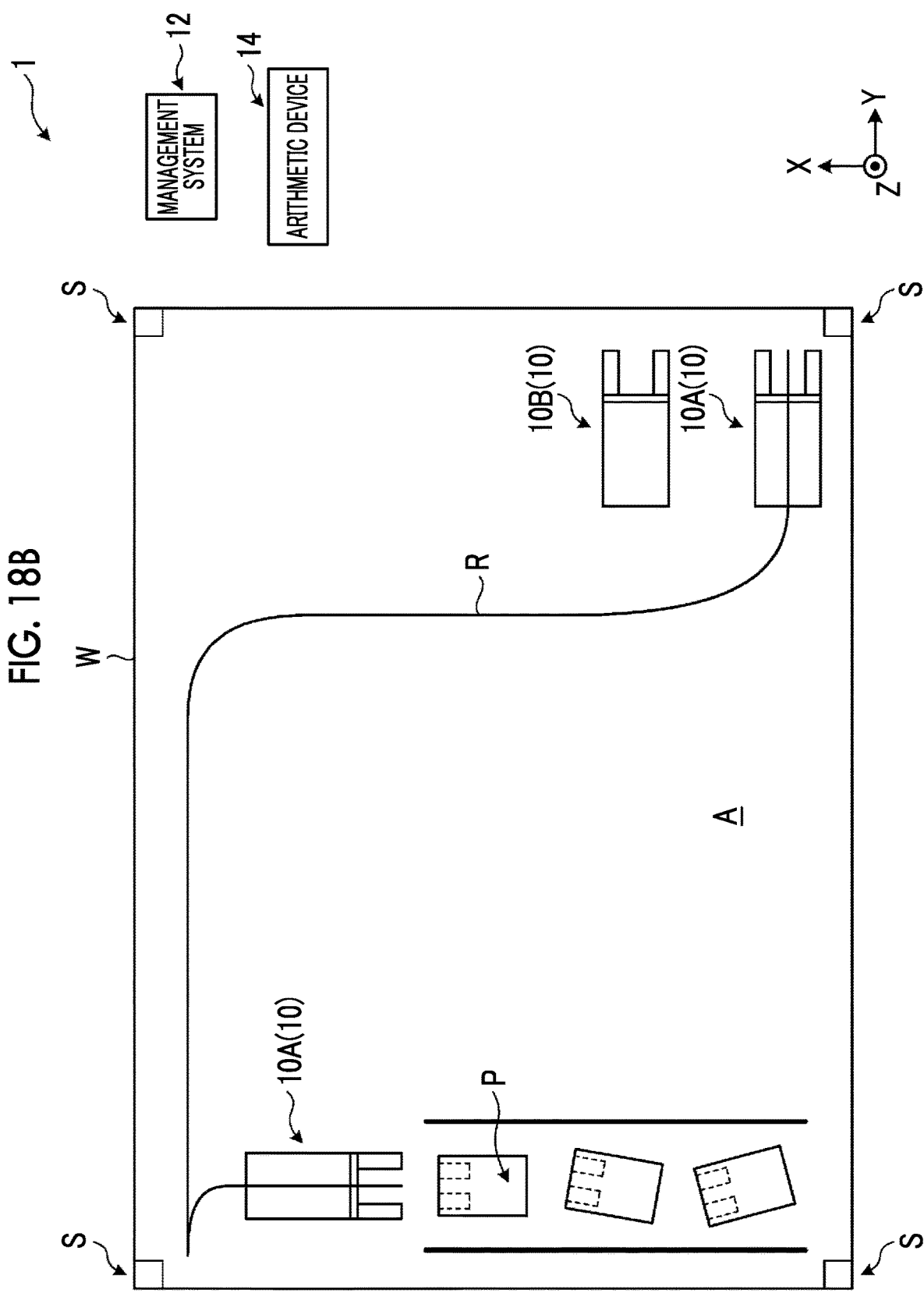

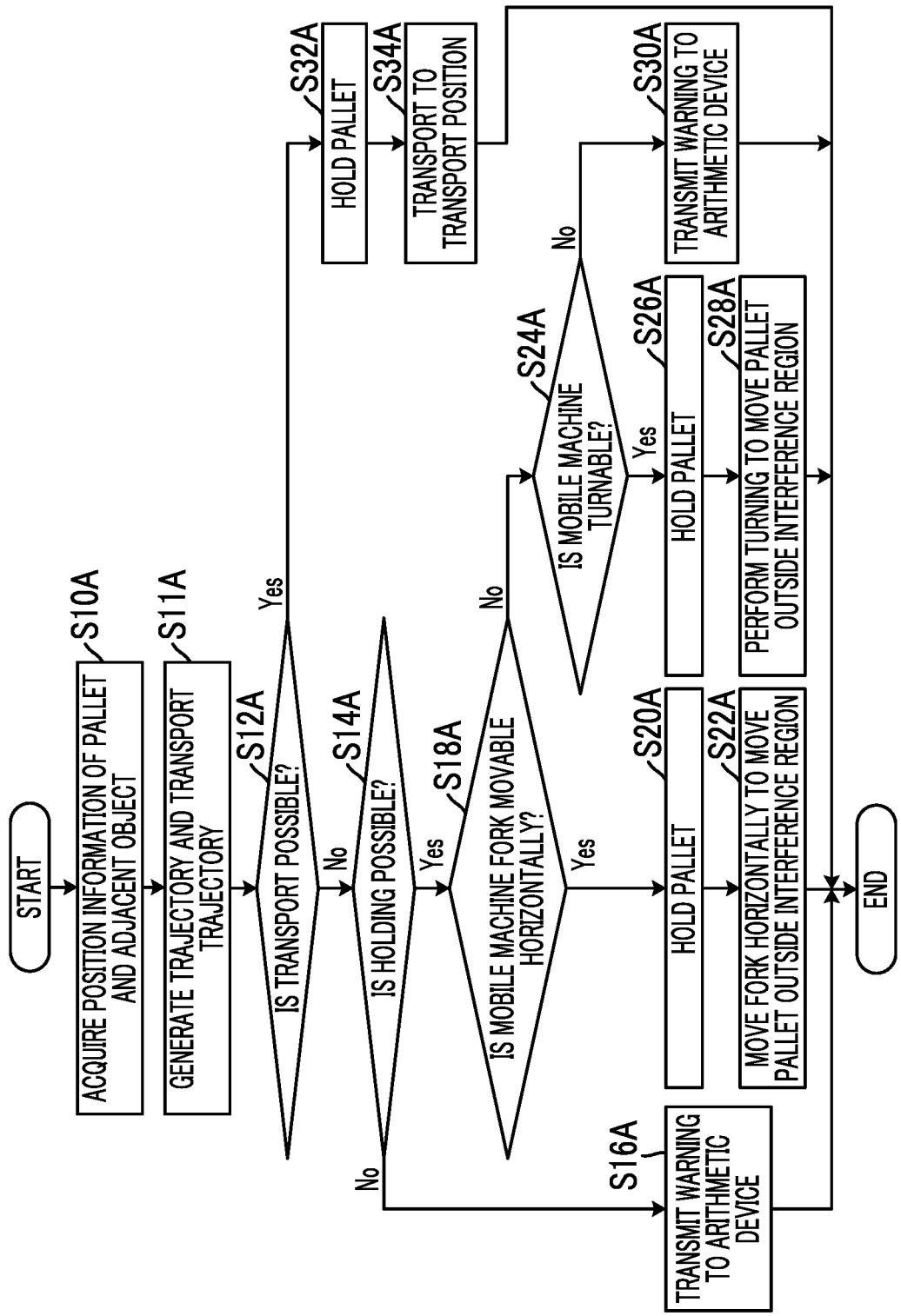

CONTROL DEVICE, MOBILE BODY, MOVEMENT CONTROL SYSTEM, CONTROL METHOD, AND PROGRAM

TECHNICAL FIELD

The present invention relates to a control device, a mobile machine, a movement control system, a control method, and a program.

BACKGROUND ART

For example, a technique that automatically moves a mobile machine, such as a forklift, to a target position is known. PTL 1 discloses a method that determines an approach trajectory to a target object based on position information of the target object detected by a range sensor in a forklift.

CITATION LIST

Patent Literature

[PTL 1] Japanese Unexamined Patent Application Publication No. 2017-182502

SUMMARY OF INVENTION

Technical Problem

The trajectory to the target object is calculated with an inside of a region between the mobile machine and the target object as a search range. In this case, since the search range is wide, a calculation load of the trajectory increases such that a lot of time is required for calculation, and work may be delayed. There may be a need to increase the performance of an arithmetic device. For this reason, in the mobile machine that automatically moves, a reduction in the calculation load of the trajectory is required.

The present disclosure has been accomplished to solve the above-described problem, and an object of the present disclosure is to provide a control device, a mobile machine, a movement control system, a control method, and a program capable of reducing a calculation load of a trajectory in a mobile machine that automatically moves.

Solution to Problem

To solve the above-described problem and to achieve the object, there is provided a control device for a mobile machine according to the present disclosure that is provided in a mobile machine configured to automatically move, the control device including a target object information acquisition unit that acquires a detection result of a direction of a target object, a region setting unit that sets a prohibited region through which a trajectory of the mobile machine is prohibited from passing, from the direction of the target object, a trajectory setting unit that sets a trajectory from the mobile machine to a target position where the mobile machine is in a predetermined position and direction with respect to the target object such that the trajectory does not pass through the prohibited region, and a movement control unit that moves the mobile machine based on the trajectory.

To solve the above-described problem and to achieve the object, there is provided a mobile machine according to the present disclosure including the control device.

To solve the above-described problem and to achieve the object, there is provided a control method for a mobile machine according to the present disclosure that controls a mobile machine configured to automatically move, the control method including a step of acquiring a detection result of a direction of a target object, a step of setting a prohibited region through which a trajectory of the mobile machine is prohibited from passing, from the direction of the target object, a step of setting a trajectory from the mobile machine to a target position where the mobile machine is in a predetermined position and direction with respect to the target object such that the trajectory does not pass through the prohibited region, and a step of moving the mobile machine based on the trajectory.

To solve the above-described problem and to achieve the object, there is provided a program according to the present disclosure that causes a computer to execute a control method for controlling a mobile machine configured to automatically move, the control method including a step of acquiring a detection result of a direction of a target object, a step of setting a prohibited region through which a trajectory of the mobile machine is prohibited from passing, from the direction of the target object, a step of setting a trajectory from the mobile machine to a target position where the mobile machine is in a predetermined position and direction with respect to the target object such that the trajectory does not pass through the prohibited region, and a step of moving the mobile machine based on the trajectory.

Advantageous Effects of Invention

According to the present disclosure, it is possible to reduce a calculation load of a trajectory in a mobile machine that automatically moves.

BRIEF DESCRIPTION OF DRAWINGS

FIG. 10A is a flowchart illustrating a movement control flow of the mobile machine according to the first embodiment.

FIG. 10B is a schematic view showing another example of a sensor.

FIG. 17 is a flowchart illustrating a movement control flow of a mobile machine according to a fourth embodiment.

FIG. 18A is a schematic view of a movement control system according to a fifth embodiment.

FIG. 18B is a schematic view showing an example of another installation region of the movement control system according to the fifth embodiment.

FIG. 27A is a flowchart illustrating a movement control flow of a mobile machine according to a sixth embodiment.

DESCRIPTION OF EMBODIMENTS

Hereinafter, a preferred embodiment of the present invention will be described with reference to the accompanying drawings. It should be noted that the present invention is not limited by the embodiment, and in a case where there are a plurality of embodiments, the present invention encompasses a configuration including a combination of the embodiments.

First Embodiment (Overall Configuration of Movement Control System)

Figure 1:
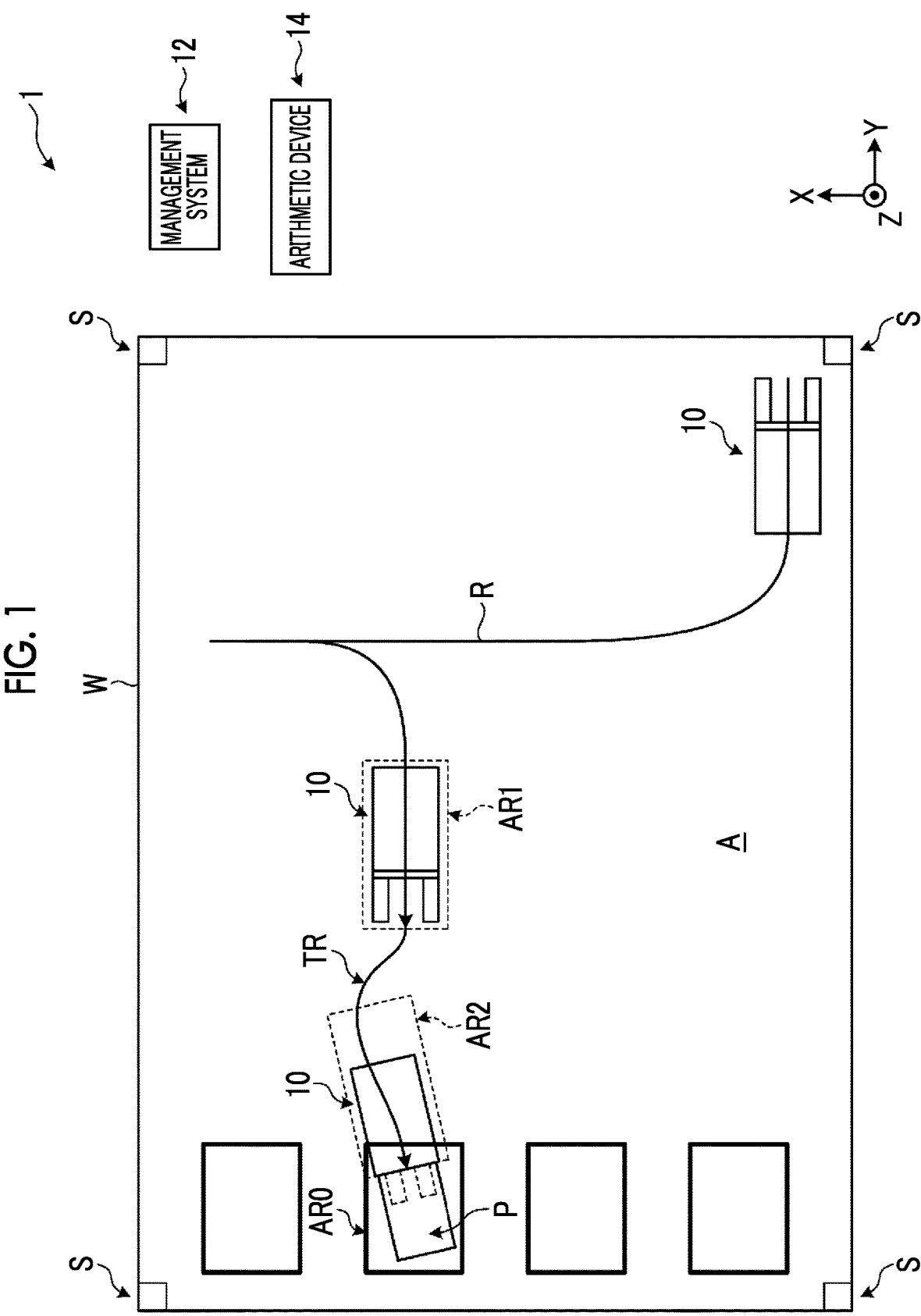
FIG. 1 is a schematic view of a movement control system according to a first embodiment.

FIG. 1 is a schematic view of a movement control system according to a first embodiment. As shown in FIG. 1, a movement control system 1 according to the first embodiment includes a mobile machine 10, a management system 12, and an arithmetic device 14. The movement control system 1 is a system that controls the movement of the mobile machine 10 belonging to a facility W. The facility W is, for example, a facility that is subjected to physical distribution management, such as a warehouse. In a region A of the facility W, a plurality of installation regions AR0 are provided. The region A is, for example, a floor surface of the facility W and is a region where a pallet P (load) is installed or the mobile machine 10 moves. The installation region AR0 is a region where the pallet P (load) as a target object is installed. The installation region AR0 is set in advance as a region where the pallet P (load) as a target object should be installed. The installation region AR0 is divided by, for example, white lines, and a position (coordinates), a shape, and a size of the installation region AR0 are set in advance. In the present embodiment, although the installation region AR0 is provided in the region A that is a floor of the facility W, the present invention is not limited thereto, and the installation region AR0 may be provided in a platform of a vehicle that carries the pallet P in the facility W. Although the installation region AR0 is partitioned for each pallet P, and one pallet P is disposed in the installation region AR0, the present invention is not limited thereto. For example, the installation region AR0 may be set as a free space such that a plurality of pallets P are installed. In the example of FIG. 1, although the installation region AR0 has a rectangular shape, the shape and the size may be optional.

The mobile machine 10 is a device that can automatically move. In the present embodiment, the mobile machine 10 is a forklift, and additionally, is a so-called automated guided forklift (AGF). As illustrated in FIG. 1, the mobile machine 10 moves on the region A in the facility W. The mobile machine 10 moves toward the installation region AR0 following a route R. In a case of reaching a starting position AR1, the mobile machine 10 moves from the starting position AR1 to a target position/posture (target position) AR2 following a trajectory TR set based on position information of the pallet P to pick up the pallet P. In the present embodiment, the mobile machine 10 continuously carries out detection with a sensor 26 described below during running following the route R, and a position where the sensor 26 can detect the position information of the pallet P is the starting position AR1. That is, it can be said that the starting position AR1 is a position on the route R where the sensor 26 can detect the position information of the pallet P (the detection of the position information of the pallet P with the sensor 26 is valid). The target position/posture AR2 is a position and a posture that are a predetermined position and direction with respect to the pallet P. It can be said that the target position/posture AR2 is a position/posture where the mobile machine 10 can pick up the pallet P. In the example of the present embodiment, it can be said that the target position/posture AR2 is a position and a posture (direction) of the mobile machine 10 in which the mobile machine 10 moves straight without moving in a lateral direction such that a fork 24 of the mobile machine 10 described below can be inserted into openings Pb of the pallet P described below. The mobile machine 10 moves straight from the target position/posture AR2 to pick up the pallet P and to transport the pallet P to another place. The details of movement following the route R and the trajectory TR of the mobile machine 10 will be described below. Hereinafter, one direction along the region A is referred to as a direction X, and a direction along the region A and orthogonal to the direction X is referred to as a direction Y. A direction orthogonal to the region A, that is, a direction orthogonal to the directions X and Y, is referred to as a direction Z. It can be said that the directions X and Y are a horizontal direction, and the direction Z is a vertical direction.

(Mobile Machine)

Figure 2:
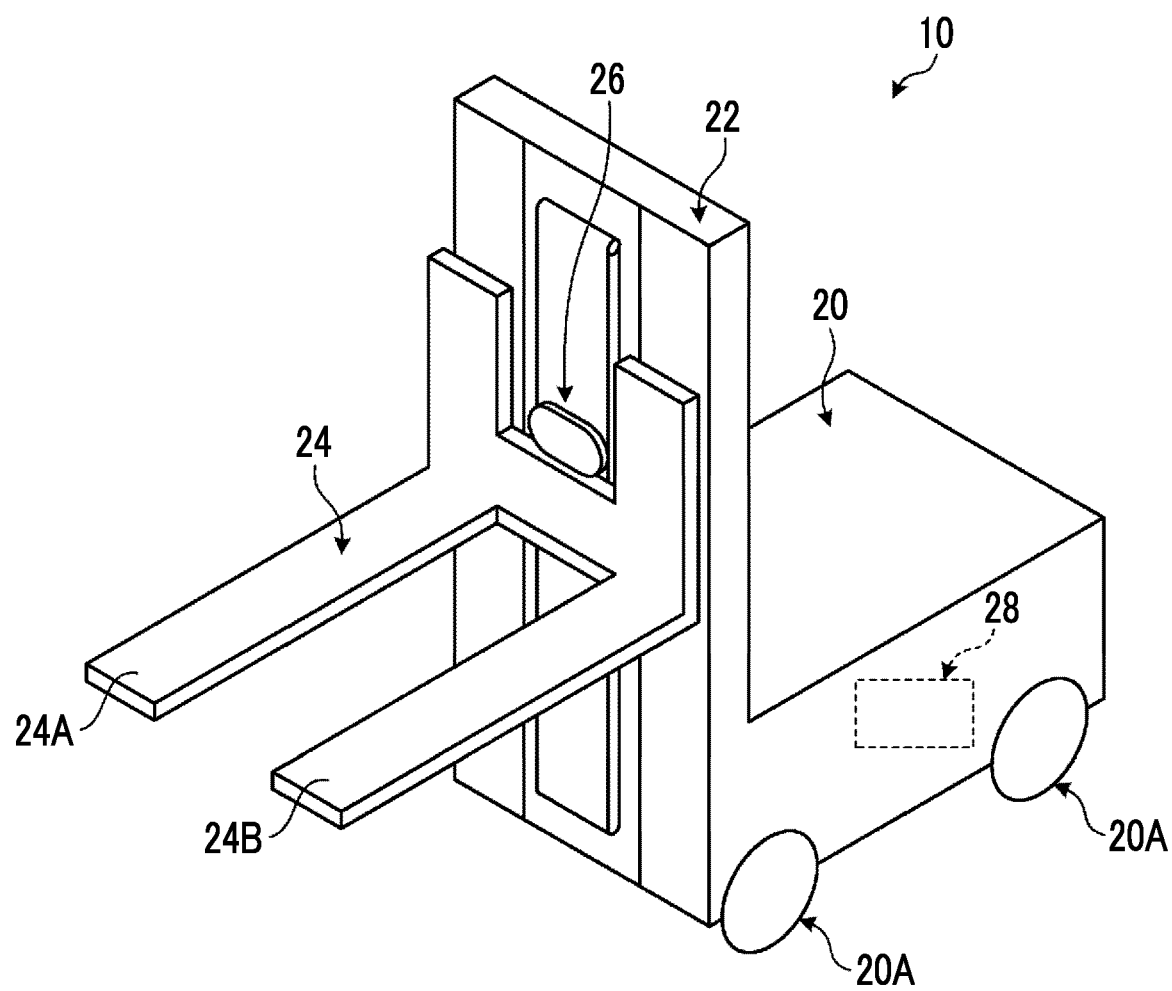
FIG. 2 is a schematic view of the configuration of a mobile machine.

FIG. 2 is a schematic view of the configuration of the mobile machine. As shown in FIG. 2, the mobile machine 10 includes a vehicle body 20, a mast 22, a fork 24, a sensor 26, and a control device 28. The vehicle body 20 includes wheels 20A. The mast 22 is provided in one end portion in a front-rear direction of the vehicle body 20. The mast 22 extends along an up-down direction (here, the direction Z) orthogonal to the front-rear direction. The fork 24 is attached to the mast 22 to be movable in the direction Z. The fork 24 may be movable in a lateral direction (a direction crossing the up-down direction and the front-rear direction) of the vehicle body 20 with respect to the mast 22. The fork 24 has a pair of tabs 24A and 24B. The tabs 24A and 24B extend from the mast 22 toward a front direction of the vehicle body 20. The tab 24A and the tab 24B are disposed away from each other in a lateral direction of the mast 22. Hereinafter, in the front-rear direction, a direction on a side on which the fork 24 is provided in the mobile machine 10 is referred to as a first direction, and a side on which the fork 24 is not provided is referred to as a second direction.

The sensor 26 detects at least one of a position and a direction of an object present around the vehicle body 20. It can also be said that the sensor 26 detects the position of the object with respect to the mobile machine 10 and the direction of the object with respect to the mobile machine 10. In the present embodiment, the sensor 26 is provided in the mast 22 and detects the position and the direction of the object on the first direction side of the vehicle body 20. Note that a detection direction of the sensor 26 is not limited to the first direction, and detection may be performed on both the first direction side and the second direction side. In this case, as the sensor 26, a sensor that performs detection on the first direction side and a sensor that performs detection on the second direction side may be provided. The sensor 26 is, for example, a sensor that emits laser light. The sensor 26 emits laser light while scanning in one direction (here, a lateral direction) and detects the position and the direction of the object from reflected light of the emitted laser light. The sensor 26 may be a sensor that detects an object using any method, not limited to that described above, and may be, for example, a camera. A position where the sensor 26 is provided is not limited to the mast 22. Specifically, for example, a safety sensor that is provided on the mobile machine 10 may be used as the sensor 26. The use of the safety sensor eliminates a need for newly providing a sensor.

The control device 28 controls the movement of the mobile machine 10. The control device 28 will be described below.

(Management System)

Figure 3:
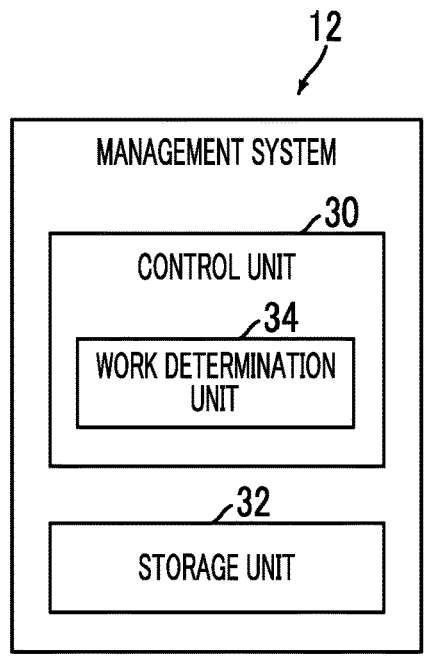
FIG. 3 is a schematic block diagram of a management system.

FIG. 3 is a schematic block diagram of the management system. The management system 12 is a system that manages physical distribution in the facility W. Although the management system 12 is a warehouse management system (WMS) in the present embodiment, the management system 12 may be any system not limited to the WMS, and may be, for example, a back end system, such as other production management systems. A position where the management system 12 is provided is optional and may be provided in the facility W or may be provided at a position away from the facility W to manage the facility W therefrom. The management system 12 is a computer, and as shown in FIG. 3, a control unit 30 and a storage unit 32. The storage unit 32 is a memory that stores various kinds of information, such as details of calculation of the control unit 30 and programs, and includes, for example, at least one of a main storage device, such as a random access memory (RAM) or a read only memory (ROM), and an external storage device, such as a hard disk drive (HDD).

The control unit 30 is an arithmetic device, that is, a central processing unit (CPU). The control unit 30 includes a work determination unit 34. The control unit 30 reads out a program (software) from the storage unit 32 and executes the program to realize the work determination unit 34, and executes processing thereof. The control unit 30 may execute the processing with one CPU or may include a plurality of CPUs and may execute the processing with a plurality of CPUs. The work determination unit 34 may be realized by a hardware circuit.

The work determination unit 34 determines the pallet P to be transported. Specifically, the work determination unit 34 determines work details indicating information of the pallet P to be transported based on, for example, an input work plan. It can be said that the work details are information for specifying the pallet P to be transported. In the example of the present embodiment, the work determination unit 34 determines, as the work details, a facility where the pallet (load) is present, the pallet P (load) that is to be transported, and when and where the pallet P (load) is to be transported. That is, the work details are information indicating a facility where the target pallet P is stored, the target pallet P, a transport destination of the pallet P, and a transport time of the pallet P. The work determination unit 34 transmits the determined work details to the arithmetic device 14.

(Arithmetic Device)

Figure 4:
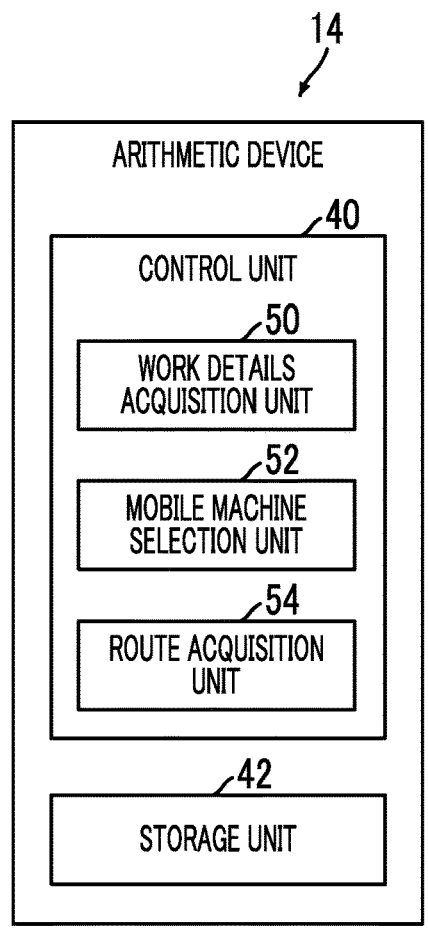
FIG. 4 is a schematic block diagram of an arithmetic device.

FIG. 4 is a schematic block diagram of the arithmetic device. The arithmetic device 14 is a device that is provided in the facility W and that calculates at least information regarding the movement of the mobile machine 10, or the like. The arithmetic device 14 is a computer, and as shown in FIG. 4, includes a control unit 40 and a storage unit 42. The storage unit 42 is a memory that stores various kinds of information, such as details of calculation of the control unit 40 and programs, and includes, for example, at least one of a main storage device, such as a RAM or a ROM, and an external storage device, such as an HDD.

The control unit 40 is an arithmetic device, that is, a CPU. The control unit 40 includes a work details acquisition unit 50, a mobile machine selection unit 52, and a route acquisition unit 54. The control unit 40 reads out a program (software) from the storage unit 42 and executes the program to realize the work details acquisition unit 50, the mobile machine selection unit 52, and the route acquisition unit 54, and executes processing thereof. The control unit 40 may execute the processing with one CPU or may include a plurality of CPUs to execute the processing with a plurality of CPUs. At least a part of the work details acquisition unit 50, the mobile machine selection unit 52, and the route acquisition unit 54 may be realized by a hardware circuit.

The work details acquisition unit 50 acquires information regarding the work details determined by the management system 12, that is, information regarding the pallet P to be transported. The work details acquisition unit 50 specifies the installation region AR0 where the pallet P is installed, from information regarding the pallet P in the work details. For example, the pallet P and the installation region AR0 where the pallet P is installed are stored in the storage unit 42 in association with each other, and the work details acquisition unit 50 reads out information from the storage unit 42 to specify the installation region AR0. The mobile machine selection unit 52 selects the target mobile machine 10. The mobile machine selection unit 52 selects the target mobile machine 10, for example, from a plurality of moving bodies that belong to the facility W. Although the mobile machine selection unit 52 may select the target mobile machine 10 using any method, the mobile machine 10 suitable for transporting the pallet P in the installation region AR0 may be selected as the target mobile machine 10, for example, based on the installation region AR0 specified by the work details acquisition unit 50.

The route acquisition unit 54 acquires information regarding the route R to the installation region AR0 specified by the work details acquisition unit 50. The route R is set in advance, for example, for each installation region AR0, and the route acquisition unit 54 acquires the route R set for the installation region AR0 specified by the work details acquisition unit 50, for example, from the storage unit 42. In the present embodiment, the route R is a passage from a start position set in advance to the installation region AR0. The start position herein may be a position where the mobile machine 10 is on standby. The route R is set in advance based on map information of the facility W. The map information of the facility W is information including position information of obstacles (posts) that are installed in the facility W or of passages through which the mobile machine 10 can run. It can be said that the map information is information indicating regions where the mobile machine 10 can move, in the region A. The route R may be set based on information regarding a vehicle specification of the mobile machine 10 in addition to the map information of the facility W. Information regarding the vehicle specification is, for example, a specification that affects a passage through which the mobile machine 10 can move, such as a size or a minimum turn radius of the mobile machine 10. In a case where the route R is set based on information regarding the vehicle specification, the route R may be set for each mobile machine. The route R may be manually set based on the map information, information regarding the vehicle specification, or the like or may be automatically set based on the map information, information regarding the vehicle specification, or the like with a device, such as the arithmetic device 14. In a case where the route R is automatically set, for example, a desired pass point (Waypoint) may be designated, and in this case, a shortest route R that avoids obstacles (a fixed object, such as a wall) while passing through the desired pass point can be set.

The route acquisition unit 54 may set the route R without reading out the route R set in advance. In this case, the route acquisition unit 54 may generate, as the route R, a passage from a current position of the mobile machine 10 to the installation region AR0 as a movement destination based on the position information of the target mobile machine 10, the position information of the installation region AR0, and the map information of the facility W.

The arithmetic device 14 transmits information regarding the acquired route R to the target mobile machine 10. Since the route R is a passage to the installation region AR0, it can be said that the route R is information regarding the movement of the mobile machine 10.

(Control Device for Mobile Machine)

Figure 5:
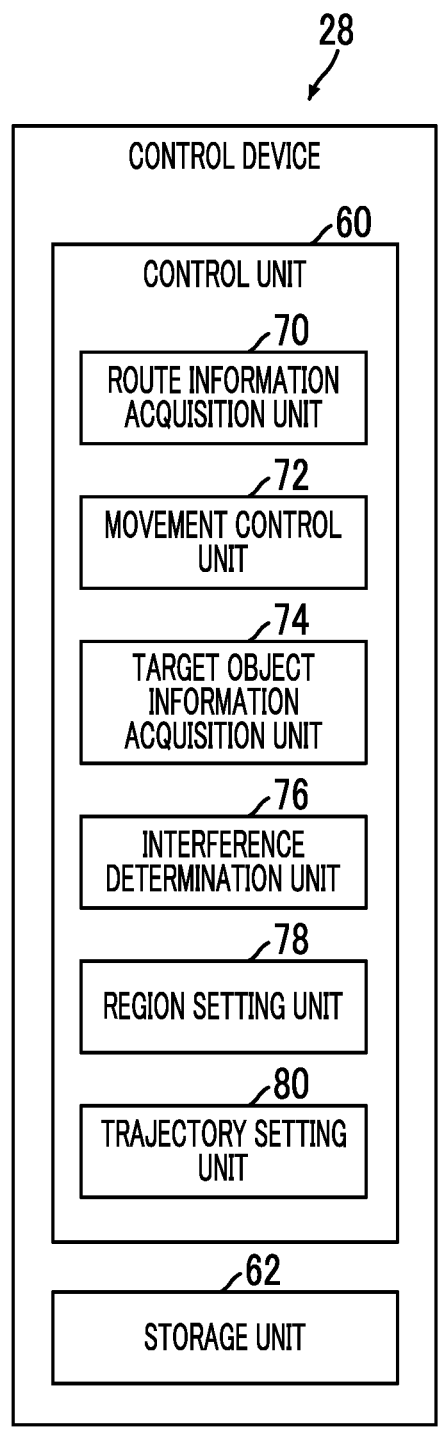
FIG. 5 is a schematic block diagram of a control device of the mobile machine.

Next, the control device 28 of the mobile machine 10 will be described. FIG. 5 is a schematic block diagram of the control device for a mobile machine. The control device 28 controls the mobile machine 10. The control device 28 sets the trajectory TR to the target position/posture AR2 based on a detection result of the position or the direction of the pallet P by the sensor 26 of the mobile machine 10. A setting method of the trajectory TR will be described below. The control device 28 moves the mobile machine 10 to the target position/posture AR2 along the trajectory TR to make the mobile machine 10 pick up the pallet P. The control device 28 is a computer, and as shown in FIG. 5, includes a control unit 60 and a storage unit 62. The storage unit 62 is a memory that stores various kinds of information, such as details of calculation of the control unit 60 and programs, and includes, for example, at least one of a main storage device, such as a RAM or a ROM, and an external storage device, such as an HDD.

The control unit 60 is an arithmetic device, that is, a CPU. The control unit 60 includes a route information acquisition unit 70, a movement control unit 72, a target object information acquisition unit 74, an interference determination unit 76, a region setting unit 78, and a trajectory setting unit 80. The control unit 60 reads out a program (software) from the storage unit 62 and executes the program to realize the route information acquisition unit 70, the movement control unit 72, the target object information acquisition unit 74, the interference determination unit 76, the region setting unit 78, and the trajectory setting unit 80, and executes processing thereof. The control unit 60 may execute the processing with one CPU or may include a plurality of CPUs to execute the processing with a plurality of CPUs. At least a part of the route information acquisition unit 70, the movement control unit 72, the target object information acquisition unit 74, the interference determination unit 76, the region setting unit 78, and the trajectory setting unit 80 may be realized by a hardware circuit.

The route information acquisition unit 70 acquires information regarding the route R from the arithmetic device 14. The movement control unit 72 performs control such that a drive unit of the mobile machine 10 or a movement mechanism, such as steering, controls the movement of the mobile machine 10. The movement control unit 72 moves the mobile machine 10 following the route R acquired by the route information acquisition unit 70. That is, the movement control unit 72 moves the mobile machine 10 to pass through the route R from the current position of the mobile machine 10 toward the installation region AR0. The movement control unit 72 sequentially ascertains the position information of the mobile machine 10 to move the mobile machine 10 to pass through the route R. Although an acquisition method of the position information of the mobile machine 10 is optional, for example, in the present embodiment, as shown in FIG. 1, detection bodies S are provided in the facility W, and the movement control unit 72 acquires the position information of the mobile machine 10 based on the detection of the detection body S. Specifically, the mobile machine 10 emits laser light toward the detection body S and receives reflected light of the laser light by the detection body S to detect the position of the mobile machine 10 in the facility W. The position of the mobile machine 10 herein is two-dimensional coordinates of the direction X and the direction Y in the region A of the facility W. Hereinafter, a position indicates two-dimensional coordinates in the region A unless otherwise described.

The target object information acquisition unit 74 makes the sensor 26 of the mobile machine 10 detect an object while the mobile machine 10 is running on the route R. That is, the target object information acquisition unit 74 makes the sensor 26 sequentially execute detection processing of the object while the mobile machine 10 is running on the route R. The sensor 26 receives, for example, reflected light from the pallet P to detect the position information of the pallet P in a case where the mobile machine 10 reaches a distance at which the position information of the pallet P can be detected by the sensor 26. In the present embodiment, the position of the mobile machine 10 in a case where the sensor 26 detects the position information of the pallet P is the starting position AR1. That is, the target object information acquisition unit 74 acquires a detection result of the position information of the pallet P from the sensor 26 at the starting position AR1.

Figure 6:
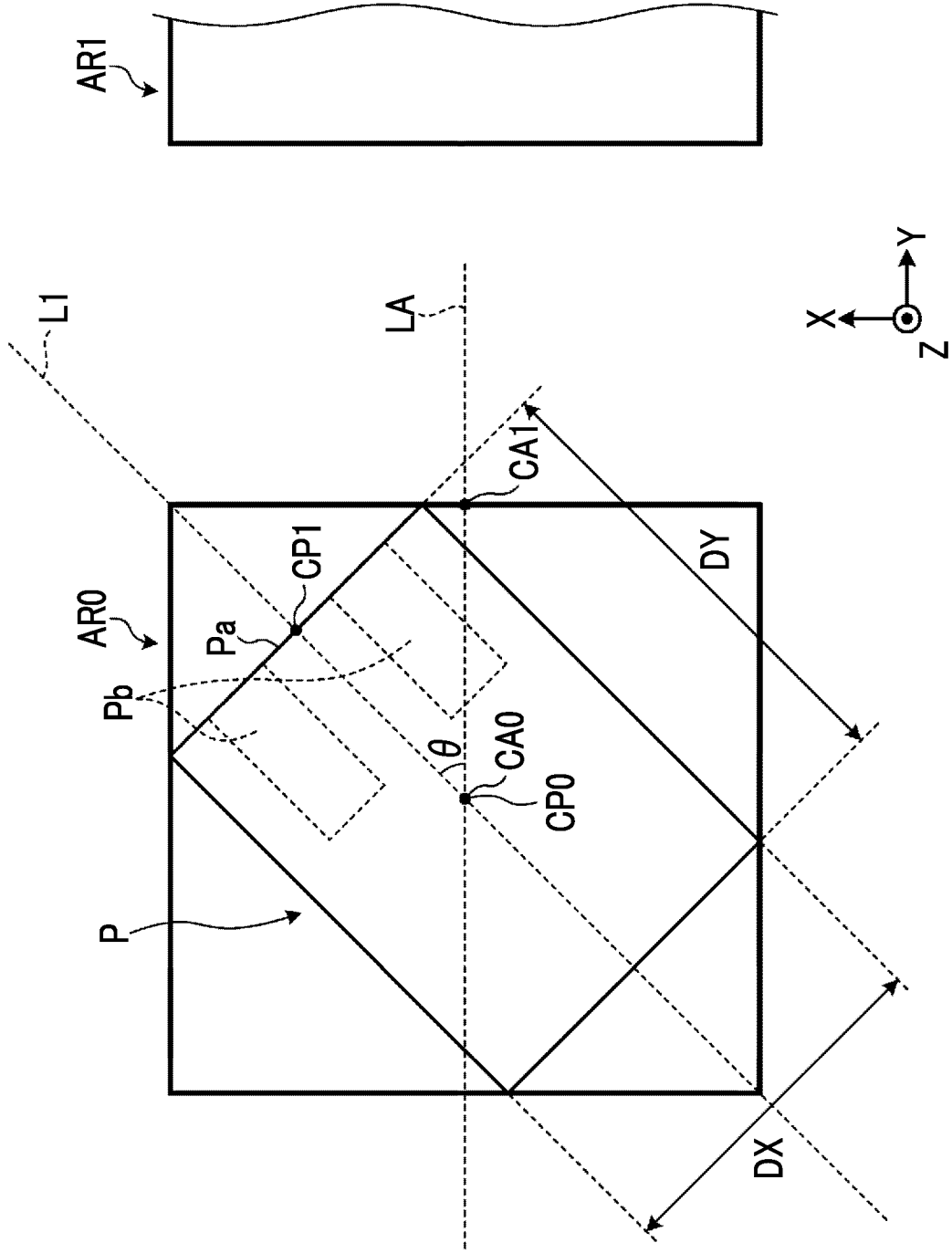
FIG. 6 is a diagram illustrating disposition of a pallet in an installation region.

FIG. 6 is a diagram illustrating disposition of the pallet in the installation region. As shown in FIG. 6, the pallet P has openings Pb into which the fork 24 is inserted, in a front surface Pa as one surface (side surface). The pallet P is disposed in the installation region AR0 such that the front surface Pa faces the starting position AR1. It is preferable that the pallet P is disposed to fall within the installation region AR0, in other words, not to protrude from the installation region AR0. It is preferable that the installation region AR0 has a size set such that an inclination angle θ of the pallet P with respect to the installation region AR0 does not exceed 45 degrees in a case where the pallet P is disposed not to protrude from the installation region AR0. That is, the inclination angle θ is set to fall within a range equal to or greater than 0 degrees and equal to or less than 45 degrees. The inclination angle θ indicates deviation of an angle of the pallet P with respect to the installation region AR0 in the horizontal direction along the region AR. For example, a straight line that connects a center point CP0 of the pallet P and a middle point CP of the front surface Pa of the pallet P in the horizontal direction and that is orthogonal to the Z direction (vertical direction) is referred to as a straight line L1. In addition, a straight line that connects a center point CA0 of the installation region AR0 and a middle point CA1 of a side of the installation region AR0 facing the starting position AR1 and that is orthogonal to the Z direction (vertical direction) is referred to as a straight line LA. In this case, it can be said that an angle between the straight line L1 and the straight line LA is the inclination angle θ. Here, a length of the side in the front surface Pa of the pallet P is referred to as a length DX, and a length of a side in the side surface is referred to as a length DY. In this case, to make the inclination angle θ not exceed 45 degrees in a case where the pallet P is disposed not to protrude from the installation region AR0, for example, at least one of the sides of the installation region AR0 should be set shorter than $\{(DX/\sqrt{2})+(DY/\sqrt{2})\}$.

Figure 7:
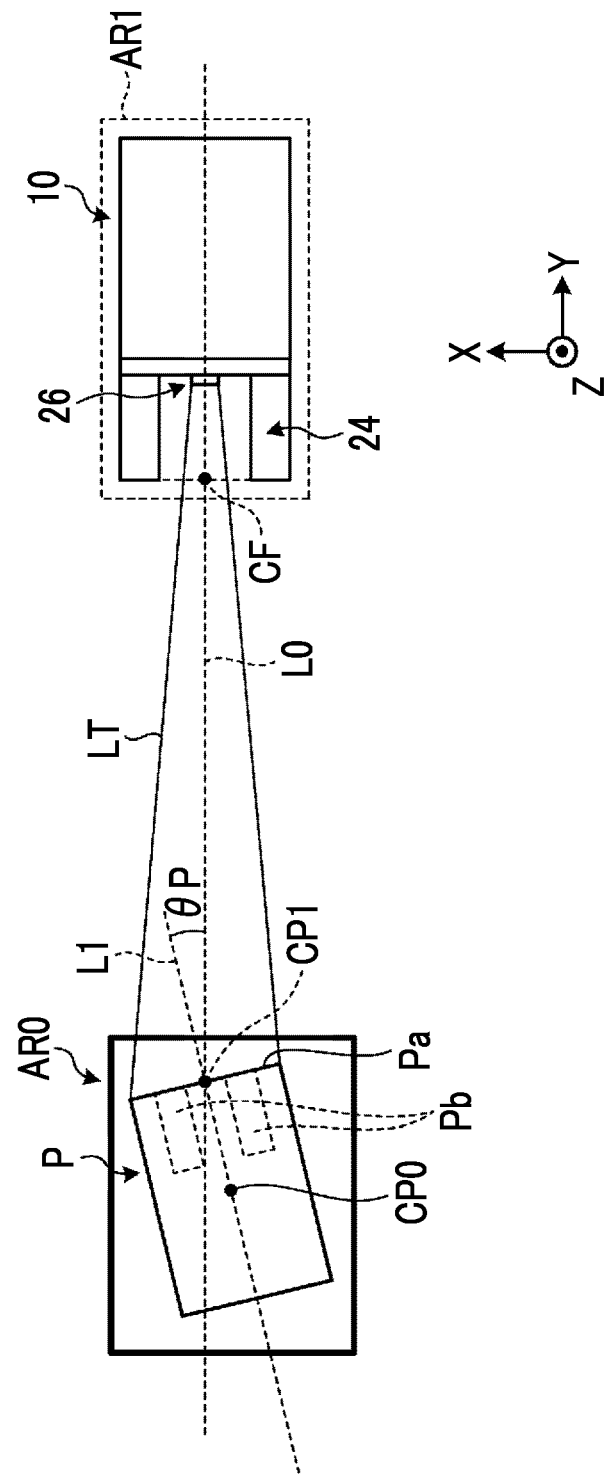
FIG. 7 is a schematic view illustrating a state in which position information of the pallet is detected.

The target object information acquisition unit 74 shown in FIG. 5 acquires the detection result of the position information of the pallet P as a target object from the sensor 26 of the mobile machine 10 at the starting position AR1. The position information of the pallet P is information indicating the direction of the pallet P, and additionally, is information indicating the position and the direction of the pallet P. FIG. 7 is a schematic view illustrating a state in which the position information of the pallet is detected. For example, in a case of a configuration in which the sensor 26 emits laser light, the target object information acquisition unit 74 makes the sensor 26 emit laser light LT while scanning in the lateral direction (horizontal direction) while the mobile machine 10 is running on the route R. In a case where the mobile machine 10 reaches the starting position AR1, the pallet P in the front direction of the sensor 26 reflects laser light LT. The sensor 26 receives reflected light from the pallet P. The target object information acquisition unit 74 detects the position and the direction of the pallet P based on reflected light from the pallet P received by the sensor 26. That is, as shown in FIG. 7, it can be said that the target object information acquisition unit 74 acquires the detection result of the position and the direction of the pallet P in the installation region AR0 from the sensor 26 in a case where the mobile machine 10 arrives at the starting position AR1 on the route R. The position of the pallet P herein is the position of the pallet P with respect to the mobile machine 10. It can be said that the position of the pallet P is the direction and the distance (that is, coordinates) in which the pallet P is positioned with respect to the mobile machine 10. It can be said that the position of the pallet P acquired by the target object information acquisition unit 74 is the position of the pallet P with respect to the starting position AR1.

The direction of the pallet P indicates a direction in which the pallet P faces the mobile machine 10, and more specifically, indicates a direction in which the front surface Pa of the pallet P faces the starting position AR1. For example, in a case where a straight line that connects a middle point CP1 of the pallet P and a reference point CF of the mobile machine 10 and that is orthogonal to the direction Z (vertical direction) is referred to as a straight line L0, it can be said that an inclination of the straight line L1 with respect to the straight line L0 is the direction of the pallet P. That is, it can be said that the direction of the pallet P is an angle θP between the straight line L0 and the straight line L1, and the target object information acquisition unit 74 may calculate the angle θP. It can be said that the reference point CF is a reference point of the starting position AR1. The position of the reference point CF is set in advance. Although the reference point CF may be set at any position with respect to the starting position AR1, for example, a position overlapping a middle point in the horizontal direction of the mobile machine 10 that arrives at the starting position AR1 may be set as the reference point CF. The target object information acquisition unit 74 can calculate the position and the direction of the pallet P from a direction in which reflected light from the pallet P is directed toward the sensor 26, a time from when laser light LT is emitted to when reflected light is received, or the like.

The movement control unit 72 stops the running following the route R in a case where the mobile machine 10 reaches the starting position AR1, that is, in a case where the position information of the pallet P is acquired. Then, the movement control unit 72 moves the mobile machine 10 from the starting position AR1 to the target position/posture AR2 following the trajectory TR set by the trajectory setting unit 80 described below. That is, the mobile machine 10 runs to the starting position AR1 following the route R and runs from the starting position AR1 to the target position/posture AR2 following the trajectory TR. Hereinafter, a setting method of the trajectory TR will be described.

Figure 8:
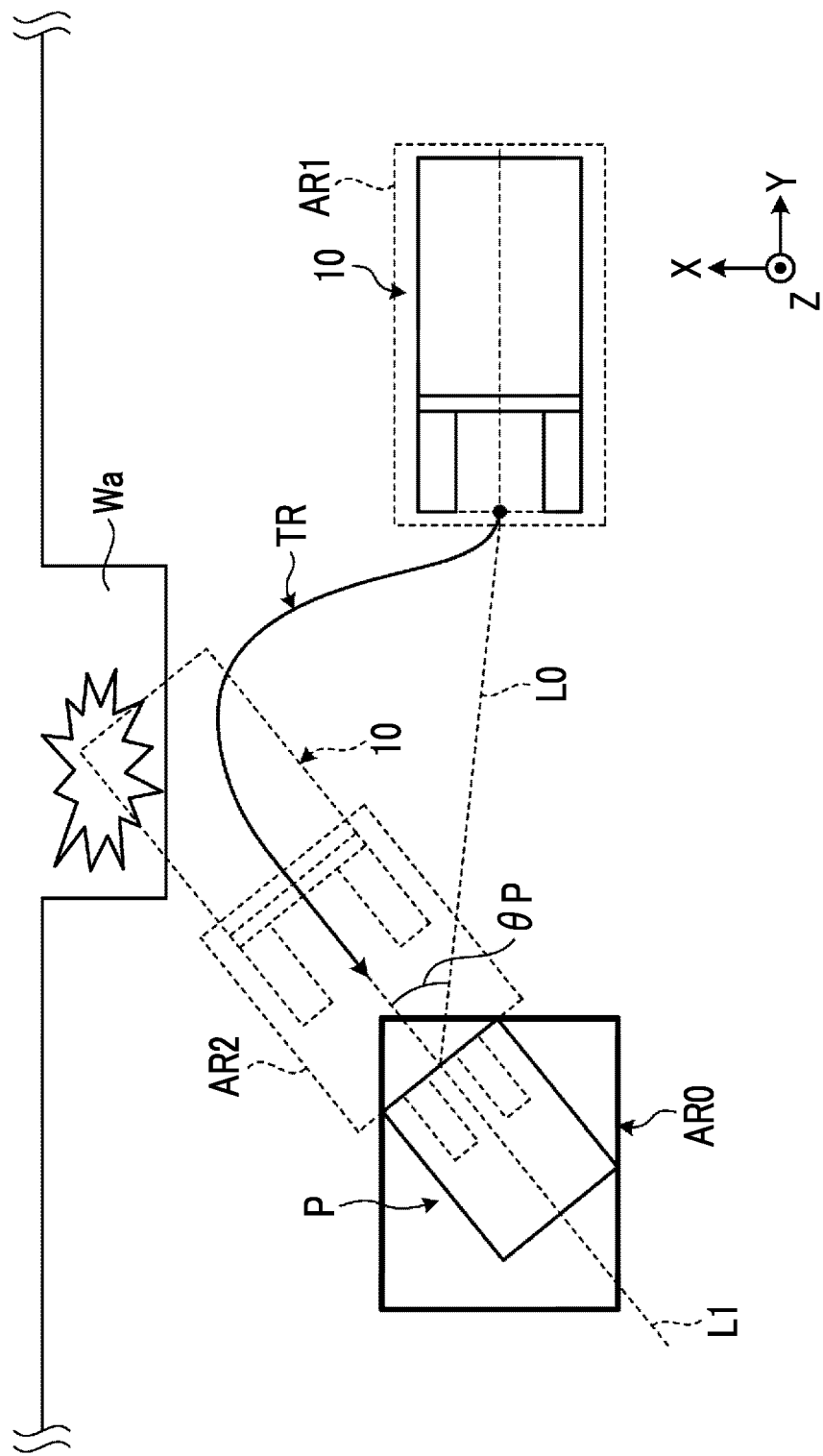
FIG. 8 is a schematic view illustrating an example of an interference position.

The interference determination unit 76 shown in FIG. 5 determines whether or not the pallet P is at an interference position, based on the position information of the pallet P acquired by the target object information acquisition unit 74. FIG. 8 is a schematic view illustrating an example of the interference position. The interference position indicates a position and a direction of the pallet P in which the mobile machine 10 interferes with an obstacle to be unable to reach the target position/posture AR2. FIG. 8 shows an example of a case where an obstacle Wa is present in the vicinity of the installation region AR0, and the front surface Pa of the pallet P is largely inclined to the obstacle Wa side. In this case, in a case of going toward the target position/posture AR2 in which the pallet P can be picked up, the mobile machine 10 interferes with the obstacle Wa halfway no matter what passage is taken, and cannot reach the target position/posture AR2 without interfering with the obstacle Wa. In this way, the mobile machine 10 inevitably interferes with the obstacle Wa depending on the position of the obstacle Wa or on the position and the direction of the pallet P no matter what passage is taken, and the trajectory TR to the target position/posture AR2 may not be set. The position and the direction of the pallet P where the trajectory TR cannot be set in this way are an interference position. The position and the direction of the pallet P where the trajectory TR cannot be set, that is, the interference position, is determined by a position (coordinates) of the installation region AR0 and by a position (coordinates) of the obstacle Wa. Since the position of the installation region AR0 and the position of the obstacle Wa are determined in advance, the interference position can be calculated in advance based on the position of the installation region AR0 and on the position of the obstacle Wa. Since the interference position may depend on information regarding the vehicle specification of the mobile machine 10, the interference position may be calculated in advance based on information regarding the vehicle specification of the mobile machine 10. In the present embodiment, the arithmetic device 14 calculates the interference position in advance, for example, before the route R of the mobile machine 10 is read out. It is preferable that the arithmetic device 14 calculates the interference position based on a position (coordinates) of the starting position AR1, in addition to the position of the installation region AR0 and the position of the obstacle Wa. The arithmetic device 14 calculates the interference position for each installation region AR0. The interference determination unit 76 acquires information regarding the interference position set for the installation region AR0 of the target pallet P from the arithmetic device 14 and determines whether or not the position and the direction of the pallet P acquired by the target object information acquisition unit 74 correspond to the interference position. In the example of FIG. 8, although the obstacle Wa is a post, the present invention is not limited thereto, and any object into which the mobile machine 10 should not come into contact may be applied as the obstacle Wa. For example, the obstacle Wa may be a wall, other installation regions AR0, or the like.

In a case where the position and the direction of the pallet P are at the interference position, determination is made that there is no solution in the calculation of the trajectory TR, and the control device 28 does not execute calculation processing of the trajectory TR described below. On the other hand, in a case where the position and the direction of the pallet P are not at the interference position, determination is made that a solution is found in the calculation of the trajectory TR, and the control device 28 executes the calculation processing of the trajectory TR described below. In this way, determination is made whether or not the position and the direction of the pallet P are at the interference position before the calculation of the trajectory TR is performed, whereby it is possible to suppress execution of unnecessary calculation in which there is no solution. The interference position is calculated in advance, whereby it is also possible to ascertain, for example, layout failure of the facility W, such as a wide numerical range of the angle or the like of the pallet P to be the interference position (a small allowable angle deviation), in advance. The layout failure of the facility W is ascertained in advance, whereby it is also possible to change the layout to an appropriate layout, such as resetting of the installation region AR0.

Figure 9:
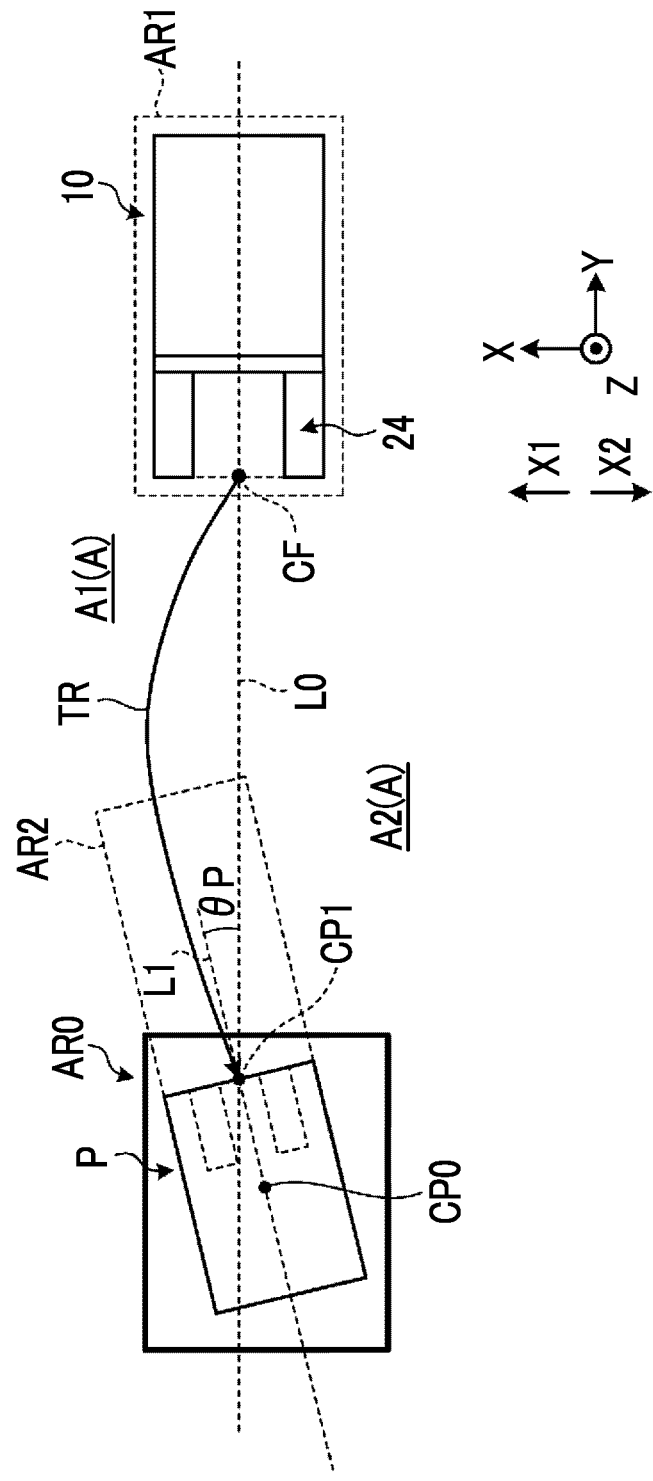
FIG. 9 is a schematic view illustrating setting of a trajectory in the first embodiment.

FIG. 9 is a schematic view illustrating setting of the trajectory in the first embodiment. As shown in FIG. 9, the region setting unit 78 (see FIG. 5) sets a permitted region A1 through which the trajectory TR is permitted to pass and a prohibited region A2 through which the trajectory TR is prohibited from passing, from the direction of the pallet P acquired by the target object information acquisition unit 74. The permitted region A1 is a region where the trajectory TR that is set hereafter is permitted to overlap, in the region A, and the prohibited region A2 is a region where the trajectory TR that is set hereafter is prohibited from overlapping, in the region A. The region setting unit 78 divides the region A with a reference line that connects the mobile machine 10 and the pallet P, sets a region on a side toward which the pallet P is directed, among the divided regions as the permitted region A1, and sets a region on an opposite side to the side toward which the pallet P is directed, as the prohibited region A2. The reference line in the present embodiment is the straight line L0 that connects the middle point CP1 of the pallet P and the reference point CF of the mobile machine 10 (the starting position AR1). Accordingly, in a case where a vector that connects from the center point CP0 to the middle point CP1 along the straight line L1 is resolved into a first direction component along the straight line L0 and a second direction component orthogonal to the straight line L0, it can be said that a region on a direction side of the second direction component is the permitted region A1, and a region on a side in an opposite direction to the second direction component is the prohibited region A2.

The trajectory setting unit 80 (see FIG. 5) sets the trajectory TR from the starting position AR1 (the mobile machine 10 at the starting position AR1) to the target position/posture AR2. The trajectory setting unit 80 sets the target position/posture AR2 based on the position information of the pallet P acquired by the target object information acquisition unit 74, that is, the position and the direction of the pallet P. That is, the trajectory setting unit 80 calculates a position and a posture in which the pallet P can be picked up (the mobile machine 10 can move straight and insert the fork 24 into the openings Pb of the pallet P), from the position and the direction of the pallet P and sets the position and the posture as the target position/posture AR2. As an example, a place at 1000 mm in parallel in an axial direction of the opening Pb of the pallet P from an entrance of the openings Pb may be set as the target position/posture AR2. Then, the trajectory setting unit 80 sets the trajectory TR such that the trajectory TR does not pass through the prohibited region A2 set in the region setting unit 78, in other words, such that the trajectory TR passes through the permitted region A1. That is, the trajectory setting unit 80 excludes the prohibited region A2 from a search range of the trajectory TR and calculates the trajectory TR for reaching the starting position AR1 through the permitted region A1 without passing through the prohibited region A2.

In the present embodiment, the trajectory setting unit 80 calculates the trajectory TR through model predictive control (MPC). Hereinafter, an example of a calculation method of the trajectory TR will be described.

A control input u(k) of the mobile machine 10 is represented by Expression (1) described below.

$$u(k)=[v(k),\varphi(k)]^T \quad (1)$$

Here, v(k) is a speed command value of the mobile machine 10, φ(k) is a yaw rate command value of the mobile machine 10, and k represents an index of a discrete time. A control input U(k) of the mobile machine 10 of each discrete time is represented by Expression (2) described below. N is a predictive horizon.

$$U(k)=[u(k),u(k+1),\ldots,u(k+N-1)]^T \quad (2)$$

The trajectory setting unit 80 solves an optimization problem shown in Expression (3) described below and obtains u(k), u(k+1), ..., u(k+N−1) as an optimum solution of the control input to calculate the trajectory TR. As a solution of the optimization problem, a known technique, such as a sequential quadratic programming method or an interior method, can be used.

$$J(U(k))\to\min \quad (3)$$

In calculating the trajectory TR in this way, for example, constraint conditions shown in Expressions (4) to (8) described below are given.

$$x(k) = v(k)\cos\theta(k) \quad (4)$$

$$y(k) = v(k)\sin\theta(k) \quad (5)$$

$$\theta(k) = \frac{v(k)}{L}\tan\phi(k) \quad (6)$$

$$v(k) \le v_{MAX} \quad (7)$$

$$-\phi_{MAX} \le \phi(k) \le \phi_{MAX} \quad (8)$$

Here, x is a coordinate of the mobile machine 10 in the direction X, y is a coordinate of the mobile machine 10 in the direction Y, θ is an inclination angle of the mobile machine 10 with respect to a reference axis, and L is a wheelbase indicating a distance between a front wheel and a rear wheel of a vehicle V. $v_{MAX}$ and $\phi_{MAX}$ are upper limit values of a speed and a yaw rate set in advance. In the present embodiment, a condition that the mobile machine 10 does not pass through the prohibited region A2 is also given as a constraint condition.

There may be a plurality of trajectories capable of reaching the target position/posture AR2 from the starting position AR1. In this case, the trajectory setting unit 80 may calculate a plurality of trajectories capable of reaching the target position/posture AR2 from the starting position AR1 and may set the trajectory closest to the straight line L0 from among a plurality of trajectories as the trajectory TR. The straight line L0 is a trajectory in a case where it is assumed that the pallet P is not inclined (the angle θP is 0), and is a linear trajectory that connects from the starting position AR1 to the target position/posture AR2. Thus, the trajectory closest to the straight line L0 is set as the trajectory TR, whereby it is possible to decrease a curve and to allow the mobile machine 10 to quickly reach the target position/posture AR2.

In a case where the trajectory TR is set in the above-described manner, the movement control unit 72 (see FIG. 5) moves the mobile machine 10 from the starting position AR1 to the target position/posture AR2 to pass through the trajectory TR. Then, the movement control unit 72 moves the mobile machine 10 straight from the target position/posture AR2 and makes the mobile machine 10 insert the fork 24 into the openings Pb of the pallet P to pick up the pallet P. The movement control unit 72 transports the mobile machine 10 that picks up the pallet P, to a set transport destination. In this way, although the movement control unit 72 moves the mobile machine 10 from the starting position AR1 to the target position/posture AR2 along the trajectory TR, the present invention is not limited thereto, and the movement control unit 72 may switch between movement along the trajectory TR and movement through direct feedback control to move the mobile machine 10 to the target position/posture AR2. Examples of the direct feedback control include control using a visual servo scheme as described in "Atsushi Ozato and NoriakiMaru, "Position and Orientation Control of Omnidirectional Mobile Robot by Linear Visual Servoing", Transactions of the Japan society of mechanical engineers (C), Vol. 77, No. 774, p. 215-224, Feb. 25, 2011".

(Movement Control Flow)

A flow of movement control of the mobile machine 10 described above will be described based on a flowchart. FIG. 10A is a flowchart illustrating a movement control flow of the mobile machine according to the first embodiment. As shown in FIG. 10A, first, the arithmetic device 14 acquires the route R to the installation region AR0 of the pallet P (Step S10). The arithmetic device 14 calculates the interference position set for the installation region AR0 of the pallet P in advance.

The control device 28 of the mobile machine 10 acquires information regarding the route R acquired by the arithmetic device 14 with the route information acquisition unit 70, and moves the mobile machine 10 following the route R with the movement control unit 72 (Step S12). In a case where the mobile machine 10 arrives at the starting position AR1, the control device 28 acquires the position information of the pallet P, that is, information indicating the position of the direction of the pallet P, with the target object information acquisition unit 74 (Step S14). The target object information acquisition unit 74 makes the sensor 26 continuously perform detection during running of the mobile machine 10 on the route R and detect the position information of the pallet P at the starting position AR1, and acquires a detection result. Then, the control device 28 acquires information regarding the interference position from the arithmetic device 14 with the interference determination unit 76 and determines whether or not the position and the direction of the pallet P correspond to the interference position (Step S16). In a case where the position and the direction of the pallet P correspond to the interference position (Step S16; Yes), that is, in a case where a solution of the trajectory TR capable of reaching the pallet P without interfering with the obstacle Wa is not found, the control device 28 does not perform the setting of the prohibited region A2 or the setting of the trajectory TR shown in Steps S18 and S20 described below, and notifies of an alarm without moving the mobile machine 10 from the starting position AR1 (Step S24). The alarm is information indicating that the setting of the trajectory TR cannot be performed and the pallet P cannot be picked up. The notification of the alarm may be made by any system, such as voice or a signal.

In a case where the position and the direction of the pallet P do not correspond to the interference position (Step S16; No), that is, in a case where a solution of the trajectory TR is found, the control device 28 sets the prohibited region A2 and the permitted region A1 based on the position information of the pallet P, that is, the direction of the pallet P, with the region setting unit 78 (Step S18). The region setting unit 78 divides the region A by the straight line L0 (reference line) that connects the starting position AR1 and the pallet P, sets the region on the side toward which the pallet P is directed, among the divided regions, as the permitted region A1, and sets the region on the opposite side to the side toward which the pallet P is directed, as the prohibited region A2. Then, the control device 28 sets the trajectory TR with the trajectory setting unit 80 (Step S20). The trajectory setting unit 80 sets the target position/posture AR2 based on the position and the direction of the pallet P. The trajectory setting unit 80 sets the trajectory TR from the starting position AR1 to the target position/posture AR2 such that the trajectory TR does not pass through the prohibited region A2 and passes through the permitted region A1. In a case where the trajectory TR is set, the control device 28 moves the mobile machine 10 from the starting position AR1 to the target position/posture AR2 following the trajectory TR with the movement control unit 72 (Step S22). The movement control unit 72 moves the mobile machine 10 from the target position/posture AR2 to the position of the pallet P and makes the mobile machine 10 insert the fork 24 into the openings Pb of the pallet P to pick up the pallet P. Then, the movement control unit 72 transports the mobile machine 10 that picks up the pallet P, to the transport destination.

(Effects of Present Embodiment)

Here, the trajectory TR of the mobile machine 10 is calculated with an inside of a region between the starting position AR1 and the target position/posture AR2 as a search range. In this case, since the search range is wide, the calculation load of the trajectory TR increases such that a lot of time is required for the calculation of the trajectory, and working time may be extended. There may be a need to increase the performance of an arithmetic device. In contrast, the control device 28 according to the present embodiment sets the prohibited region A2 based on the direction of the pallet P and calculates the trajectory TR such that the trajectory TR does not pass through the prohibited region A2. That is, the control device 28 excludes the prohibited region A2 from the search range and sets the permitted region A1 as the search range. As a result, since the control device 28 can narrow the search range to perform the calculation of the trajectory TR, it is possible to reduce the calculation load. In addition, since the prohibited region A2 is set based on the direction of the pallet P, it is possible to exclude a region through which the mobile machine 10 will not normally pass, from the search range, to narrow down the search range to a region through which the mobile machine 10 has a high probability of passing, and to suppress reduction of the calculation accuracy of the trajectory TR while narrowing down the search range to suppress the calculation load. In particular, in the control device 28 that is mounted in the mobile machine 10, since it is preferable that the CPU does not need to have excessively high performance, it is particularly preferable that the trajectory TR is calculated in this way to suppress the calculation load.

As described above, the control device 28 according to the present embodiment is provided in the mobile machine 10 that automatically moves, and includes the target object information acquisition unit 74, the region setting unit 78, the trajectory setting unit 80, and the movement control unit 72. The target object information acquisition unit 74 acquires the detection result of the direction of the pallet P (target object). The region setting unit 78 sets the prohibited region A2 through which the trajectory TR of the mobile machine 10 is prohibited from passing, from the direction of the pallet P. The trajectory setting unit 80 sets the trajectory TR from the mobile machine 10 to the target position/posture AR2 to be the predetermined position and direction with respect to the pallet P such that the trajectory TR does not pass through the prohibited region. The movement control unit 72 moves the mobile machine 10 based on the trajectory TR. Since the control device 28 according to the present embodiment sets the prohibited region A2 based on the direction of the pallet P, it is possible to exclude a region through which the mobile machine 10 will not normally pass, from the search range of the trajectory TR, to narrow down the search range to a region through which the mobile machine 10 has a high probability of passing, and to suppress reduction of the calculation accuracy of the trajectory TR while narrowing down the search range to suppress the calculation load.

The region setting unit 78 divides the region A where the mobile machine 10 can move, with the reference line that connects the mobile machine 10 and the pallet P, and sets the region on the opposite side to the region on the side toward which the pallet P is directed, among the divided regions as the prohibited region A2. The control device 28 excludes the region toward which the pallet P is not directed and through which the mobile machine 10 will not normally pass, from the search range of the trajectory TR, and narrows down the search range to the region through which the mobile machine 10 has a high probability of passing. Thus, it is possible to suppress reduction of the calculation accuracy of the trajectory TR while narrowing down the search range to suppress the calculation load.

The interference determination unit 76 acquires information regarding the interference position and determines whether or not the pallet P is at the interference position, based on the detection result of the target object information acquisition unit 74. The interference position indicates the position of the pallet P where the mobile machine 10 interferes the obstacle Wa to be unable to reach the target position/posture AR2. The interference position is calculated in advance based on the position of the obstacle Wa around the pallet P and on the position of the installation region AR0. The region setting unit 78 and the trajectory setting unit 80 set the prohibited region A2 and the trajectory TR in a case where determination is made that the pallet P is not at the interference position. No solution of the trajectory TR capable of reaching the target position/posture AR2 without interfering with the obstacle Wa may be found depending on the position of the pallet P. The calculation in a case where no solution is found particularly requires a lot of time. In contrast, the control device 28 determines whether or not the detected position of the pallet P corresponds to the interference position to determine whether or not no solution of the trajectory TR is found, and in a case where a solution is found, performs the calculation of the trajectory TR. For this reason, with the control device 28, the calculation is not performed in a case where no solution is found, and it is possible to suppress the extension of the working time.

The mobile machine 10 according to the present embodiment includes the control device 28. For this reason, with the mobile machine 10, it is possible to suppress reduction of the calculation accuracy of the trajectory TR while suppressing the calculation load of the trajectory TR.

The movement control system 1 according to the present embodiment includes the mobile machine 10 and the arithmetic device 14. The arithmetic device 14 transmits information regarding the movement of the mobile machine 10 to the mobile machine 10. Information regarding the movement of the mobile machine 10 is, for example, information regarding the route R or information regarding the interference position. With the movement control system 1, it is possible to suppress reduction of the calculation accuracy of the trajectory TR while suppressing the calculation load of the trajectory TR.

A control method for the mobile machine 10 according to the present embodiment is a control method that controls the mobile machine 10 configured to automatically move. The present control method includes a step of acquiring the detection result of the direction of the pallet P, a step of setting the prohibited region A2 through which the trajectory TR of the mobile machine 10 is prohibited from passing, from the direction of the pallet P, a step of setting the trajectory TR from the mobile machine 10 to the target position/posture AR2 to be the predetermined position and direction with respect to the pallet P such that the trajectory TR does not pass through the prohibited region A2, and a step of moving the mobile machine 10 based on the trajectory TR. With the present control method, it is possible to suppress reduction of the calculation accuracy of the trajectory TR while suppressing the calculation load of the trajectory TR.

A program according to the present embodiment is a program that causes a computer to execute the control method for controlling the mobile machine 10 configured to automatically move. The program causes the computer to execute a step of acquiring the detection result of the direction of the pallet P, a step of setting the prohibited region A2 through which the trajectory TR of the mobile machine 10 is prohibited from passing, from the direction of the pallet P, a step of setting the trajectory TR from the mobile machine 10 to the target position/posture AR2 to be the predetermined position and direction with respect to the pallet P such that the trajectory TR does not pass through the prohibited region A2, and a step of moving the mobile machine 10 based on the trajectory TR. With the program, it is possible to suppress reduction of the calculation accuracy of the trajectory TR while suppressing the calculation load of the trajectory TR.

(Example where Starting Position is Set)

In the above description, a position on the route R where the sensor 26 can detect the position information of the pallet P is the starting position AR1, and the starting position AR1 is not a position set in advance. Note that the starting position AR1 may be a position set in advance. In this case, the starting position AR1 is set in advance as a position where the sensor 26 can detect the position information of the pallet P installed in the installation region AR0, for each installation region AR0. In this case, the route R may be set in advance as a passage from the start position to the starting position AR1. In a case of arriving at the starting position AR1 through the route R, the mobile machine 10 starts the detection of the position information of the pallet P with the sensor 26 at the starting position AR1 to acquire the position information of the pallet P. An example where the starting position AR1 is set in advance can be applied to other embodiments described below.

(Another Example of Sensor)

In the present embodiment, the control device 28 of the mobile machine 10 acquires the detection result of the position information of the pallet P from the sensor 26 provided in the mobile machine 10. Note that the position information of the pallet P is not limited as being detected in the sensor provided in the mobile machine 10, and may be detected by a sensor provided at a place other than the mobile machine 10. FIG. 10B is a schematic view showing another example of the sensor. In the example of FIG. 10B, a sensor 26w is provided in the facility W. The sensor 26w may detect the position information of the pallet P using the same method as in the sensor 26 described above. That is, for example, the sensor 26w may emit laser light inside the facility W and receive reflected light of laser light from the pallet P to detect the position information of the pallet P or may detect the position information of the pallet P with other systems, such as a camera. The control device 28 of the mobile machine 10 acquires the detection result of the position information of the pallet P from the sensor 26w, for example, through communication means, such as wireless communication. The sensor 26w is provided at any position, and may be fixed and provided in the facility W, for example. In this case, for example, the sensor 26w may be provided on a ceiling or the like of the facility W to detect the position and the direction of the pallet P from above, may be provided on a wall or the like of the facility W to detect the position and the direction of the pallet P from the side, or may be provided on both the ceiling and the wall. The sensor 26w may be provided in a mobile machine other than the mobile machine 10. The mobile machine other than the mobile machine 10 may be, for example, a vehicle that is provided with the sensor 26w and that patrols in the facility W, a flying body (a drone or the like) that is provided with the sensor 26w and that flies in the facility W, or the like. An example where the position information of the pallet P is detected with the sensor 26w provided at a place other than the mobile machine 10 can also be applied to other embodiments described below.

(Another Example of System)

In the present embodiment, the management system 12 determines the work details indicating information regarding the pallet P, and the arithmetic device 14 specifies the target mobile machine 10 or acquires the route R. Note that the details of processing of the management system 12 and the arithmetic device 14 are not limited thereto. For example, the management system 12 may perform at least a part of the processing of the arithmetic device 14, and the arithmetic device 14 may perform at least a part of the processing of the management system 12. The management system 12 and the arithmetic device 14 may be one device (computer).

Second Embodiment

Next, a second embodiment will be described. A control device 28 according to the second embodiment is different from that in the first embodiment in terms of a setting method of the permitted region A1 and the prohibited region A2. In the second embodiment, description of a configuration common to that in the first embodiment will not be repeated.

Figure 11:
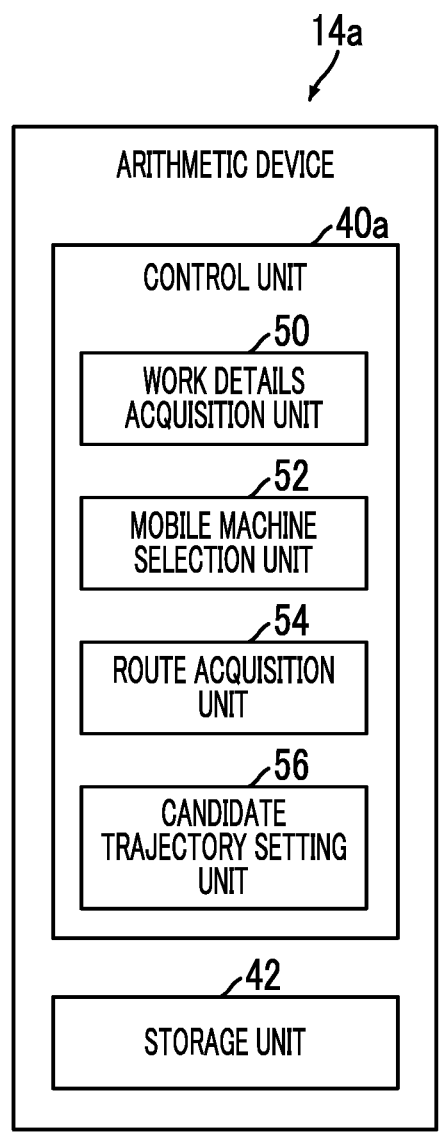
FIG. 11 is a schematic block diagram of an arithmetic device according to a second embodiment.
Figure 12:
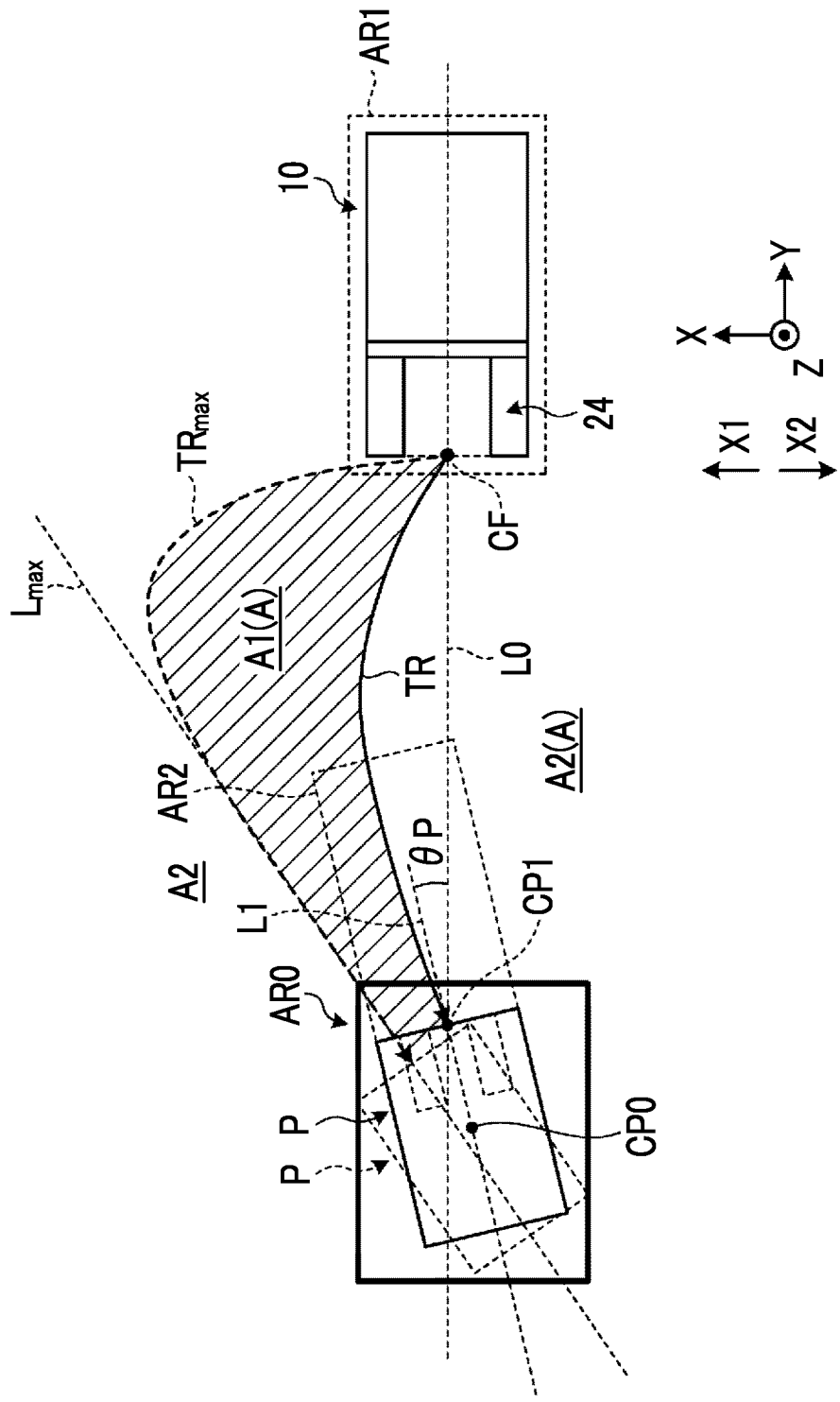
FIG. 12 is a schematic view illustrating a maximum inclination trajectory.

FIG. 11 is a schematic block diagram of an arithmetic device according to the second embodiment. FIG. 12 is a schematic view illustrating a maximum inclination trajectory. As shown in FIG. 11, a control unit 40a of an arithmetic device 14a according to the second embodiment includes a candidate trajectory setting unit 56. The candidate trajectory setting unit 56 calculates a trajectory from the starting position AR1 to the target position/posture AR2 in advance as a maximum inclination trajectory TRmax in a case where the pallet P is inclined by an upper limit angle θPmax. The upper limit angle θPmax is a possible maximum value of the angle θP of the pallet P. In the example of FIG. 11, the straight line L1 in a case where the angle θP of the pallet P is the upper limit angle θPmax is shown as a straight line $L_{max}$. It can be said that an angle between the straight line L0 (not shown) at the upper limit angle θPmax and the straight line $L_{max}$ is the upper limit angle θPmax. The upper limit angle θPmax is a possible maximum value of the angle θP in a case where the pallet P is disposed not to protrude from the installation region AR0. The upper limit angle θPmax is set to, for example, 45 degrees in advance depending on the layout of the facility W. Alternatively, for example, the upper limit angle Pmax may be calculated based on the dimension of the installation region AR0 and an allowable value as the dimension of the pallet P installed in the installation region AR0. The candidate trajectory setting unit 56 calculates a target position/posture AR2 in a case where the angle θP of the pallet P is the upper limit angle θPmax. Then, the candidate trajectory setting unit 56 calculates a trajectory TR from the starting position AR1 to the target position/posture AR2 as the maximum inclination trajectory TRmax. A calculation method of the target position/posture AR2 or the trajectory TR in the candidate trajectory setting unit 56 is the same as the calculation method in the trajectory setting unit 80 of the first embodiment. In a case where a plurality of trajectories TR to the target position/posture AR2 at the upper limit angle θPmax can be set, it is desirable that the candidate trajectory setting unit 56 sets, as the maximum inclination trajectory TRmax, a trajectory closest to the straight line L0 corresponding to a trajectory in a case where it is assumed that the pallet P is not inclined, among a plurality of trajectories TR to the target position/posture AR2 at the upper limit angle θPmax.

A region setting unit 78 of the control device 28 according to the second embodiment acquires information regarding the maximum inclination trajectory TRmax from the candidate trajectory setting unit 56. The region setting unit 78 divides the region A using the straight line L0 (reference line) that connects the pallet P and the starting position AR1, and the maximum inclination trajectory TRmax. The region setting unit 78 sets a region between the straight line L0 and the maximum inclination trajectory TRmax, that is, a region surrounded by the straight line L0 and the maximum inclination trajectory TRmax, as a permitted region A1. Then, the region setting unit 78 sets a region other than the region between the straight line L0 and the maximum inclination trajectory TRmax, that is, a region on a side toward which the pallet P is not directed and a region outside the maximum inclination trajectory TRmax, as a prohibited region A2. The trajectory setting unit 80 sets a trajectory TR such that the trajectory TR passes through the permitted region A1 and does not pass through the prohibited region A2. The movement control unit 72 moves the mobile machine 10 to the target position/posture AR2 following the trajectory TR set in this way.

Both a case where the pallet P is inclined in one direction (for example, a clockwise direction) by the upper limit angle θPmax and a case where the pallet P is inclined in the other direction (for example, a counterclockwise direction) by the upper limit angle θPmax are considered. In this case, the candidate trajectory setting unit 56 calculates the maximum inclination trajectory TRmax for each inclination direction. Then, the region setting unit 78 determines a direction in which the pallet P is inclined, from the direction of the pallet P and acquires the maximum inclination trajectory TRmax in a case where the pallet P is inclined in the inclination direction by the upper limit angle θPmax. Then, the region setting unit 78 sets a region between the acquired maximum inclination trajectory TRmax and the straight line L0 as the permitted region A1.

Figure 13:
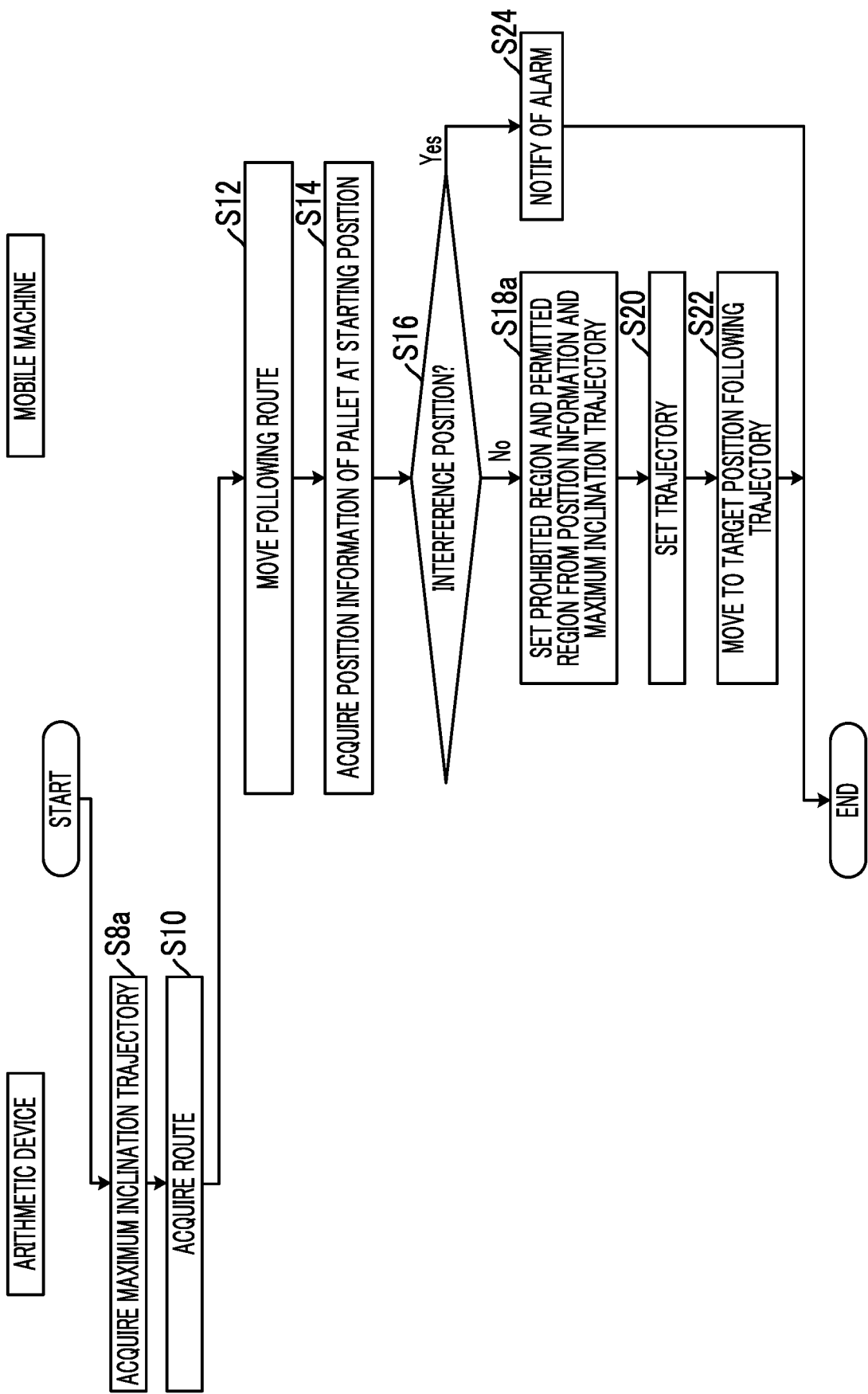
FIG. 13 is a flowchart illustrating a movement control flow of a mobile machine according to the second embodiment.

FIG. 13 is a flowchart illustrating a movement control flow of the mobile machine according to the second embodiment. As shown in FIG. 13, the arithmetic device 14a according to the second embodiment acquires the maximum inclination trajectory TRmax set in advance, with the candidate trajectory setting unit 56 (Step S8a). The candidate trajectory setting unit 56 calculates the trajectory TR from the starting position AR1 to the target position/posture AR2 at the upper limit angle θPmax, in advance as the maximum inclination trajectory TRmax. The candidate trajectory setting unit 56 calculates the maximum inclination trajectory TRmax in advance for each installation region AR0. The candidate trajectory setting unit 56 acquires the maximum inclination trajectory TRmax set for the installation region AR0 of the target pallet P. Processing of subsequent Steps S10 to S16 is the same as in the first embodiment, and thus, description thereof will not be repeated. In the example of FIG. 13, although Step S10 is executed after Step S8a, the order of Steps S8a and S10 is not limited thereto and is optional.

In a case where determination is made in Step S16 that the pallet P is not at the interference position (Step S16; No), the control device 28 sets the prohibited region A2 and the permitted region A1 based on the position information of the pallet P and on the maximum inclination trajectory TRmax, with the region setting unit 78 (Step S18a). The region setting unit 78 sets the region between the straight line L0 and the maximum inclination trajectory TRmax as the permitted region A1, and sets a region other than the region between the straight line L0 and the maximum inclination trajectory TRmax, as the prohibited region A2. Processing after subsequent Step S20 is the same as in the first embodiment, and thus, description thereof will not be repeated.

As described above, the region setting unit 78 according to the second embodiment acquires the maximum inclination trajectory TRmax set in advance as the trajectory TR in a case where the pallet P is inclined by the predetermined upper limit angle θPmax. The region setting unit 78 sets the region between the maximum inclination trajectory TRmax and the straight line L0 as the reference line, as the permitted region A1 through which the trajectory TR is permitted to pass. In this way, in the second embodiment, the maximum inclination trajectory TRmax is set in advance without depending on the detection result of the position information of the pallet P. Then, the control device 28 also sets a region outside the maximum inclination trajectory TRmax as the prohibited region A2, in addition to the region on the side toward which the pallet P is not directed, and sets only the region between the straight line L0 and the maximum inclination trajectory TRmax as a search range. For this reason, with the control device 28 of the second embodiment, it is possible to further narrow down the search range. The maximum inclination trajectory TRmax is the trajectory TR in a case where the pallet P is inclined to the maximum extent, and there is a lower probability that the outside of the maximum inclination trajectory TRmax is set as an actual trajectory TR. For this reason, with the control device 28 of the second embodiment, it is possible to suppress reduction of the calculation accuracy of the trajectory TR while narrowing down the search range.

In a case where the pallet P is disposed not to protrude from the installation region AR0, a possible numerical range of the angle θP (direction) of the pallet P depends on the position of the pallet P. That is, for example, as shown in FIG. 6, in a case where the pallet P is positioned in the vicinity of the center of the installation region AR0, since the pallet P can be installed not to protrude from the installation region AR0 even though the pallet P is largely inclined, a possible angle θP of the pallet P increases. However, in a case where the pallet P is disposed at a position away from the center of the installation region AR0, since the pallet P protrudes from the installation region AR0 in a case where the pallet P is largely inclined, a possible angle θP of the pallet P decreases. That is, it can be said that the upper limit angle θPmax decreases as the position of the pallet P is away from the center of the installation region AR0. In the second embodiment, the prohibited region A2 and the permitted region A1 may be set using this principle to narrow down the search range of the trajectory TR. For example, in this case, the candidate trajectory setting unit 56 of the arithmetic device 14 acquires the position information of the pallet P acquired by the target object information acquisition unit 74 and calculates the upper limit angle θPmax from the position of the pallet P. As described above, since the position of the pallet P and the upper limit angle θPmax are correlated, the upper limit angle θPmax can be calculated based on the position of the pallet P acquired by the target object information acquisition unit 74. The candidate trajectory setting unit 56 sets the trajectory TR at the upper limit angle θPmax calculated in this manner, as the maximum inclination trajectory TRmax. The region setting unit 78 acquires the maximum inclination trajectory TRmax and sets the region between the maximum inclination trajectory TRmax and the straight line L0, as the permitted region A1. As a result, it is possible to set the maximum inclination trajectory TRmax depending on the position of the pallet P, and to narrow down the search range depending on the position of the pallet P as appropriate.

Third Embodiment

Next, a third embodiment will be described. A control device 28 according to the third embodiment is different from that in the second embodiment in terms of a setting method of the permitted region A1 and the prohibited region A2. In the third embodiment, description of a configuration common to that in the second embodiment will not be repeated.

Figure 14:
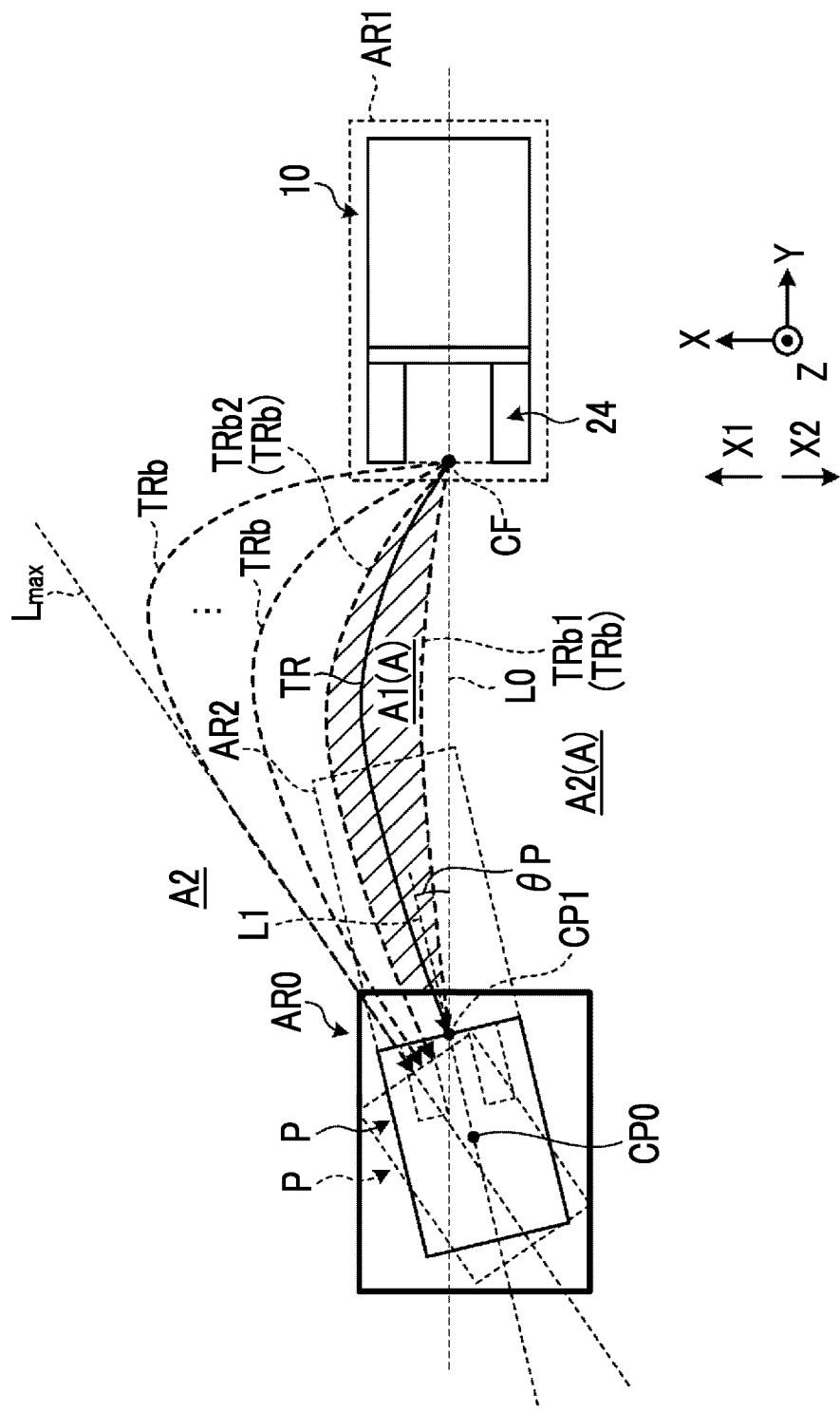
FIG. 14 is a schematic view illustrating candidate trajectories.

FIG. 14 is a schematic view illustrating candidate trajectories. A candidate trajectory setting unit 56 of an arithmetic device 14a according to the third embodiment sets a plurality of candidate trajectories TRb. The candidate trajectories TRb are trajectories TR from the starting position AR1 to the target position/posture AR2 in a case where it is assumed that the angle θP of the pallet P is an angle set in advance. The candidate trajectory setting unit 56 sets the angle θP to a predetermined angle and calculates the target position/posture AR2 in a case where the angle θP is the predetermined angle. Then, the candidate trajectory setting unit 56 calculates the trajectories TR from the starting position AR1 to the target position/posture AR2 as the candidate trajectories TRb. As shown in FIG. 14, the candidate trajectory setting unit 56 calculates the candidate trajectory TRb in the same manner while making the angle θP of the pallet P different to calculate the candidate trajectory TRb for each angle θP of the pallet P. A maximum value of the angle θP in calculating the candidate trajectory TRb is the upper limit angle θPmax. That is, the candidate trajectory setting unit 56 sets the angle θP of the pallet P to a different value within a range of 0 degrees to the upper limit angle θPmax to calculate the candidate trajectory TRb for each angle θP of the pallet P. It is preferable that a difference between the angles θP of the candidate trajectories TRb is a given value. In other words, it is preferable that the candidate trajectory setting unit 56 calculates the candidate trajectory TRb in a case of changing the angle θP by a predetermined amount. The predetermined amount herein, that is, the difference between the angles θP of the candidate trajectories TRb of which the angles θP are closest, is set as a difference value. The difference value can be set optionally, but may be, for example, about 5 degrees. A calculation method of the target position/posture AR2 or the trajectory TR in the candidate trajectory setting unit 56 is the same as the calculation method of the second embodiment. Hereinafter, the angle θP used for the calculation of the candidate trajectory TRb is described as an angle for calculation as appropriate.

A region setting unit 78 of the control device 28 according to the third embodiment acquires information regarding each candidate trajectory TRb from the candidate trajectory setting unit 56. Information regarding the candidate trajectory TRb herein also includes information regarding the angle for calculation used for the calculation of the candidate trajectory TRb. The region setting unit 78 divides the region A using information regarding the direction of the pallet P acquired by the target object information acquisition unit 74 and the candidate trajectories TRb. Specifically, the region setting unit 78 acquires the angle θP of the pallet P detected by the sensor 26 from the target object information acquisition unit 74. The region setting unit 78 extracts a first candidate trajectory TRb1 and a second candidate trajectory TRb2 from a plurality of candidate trajectories TRb based on the angle θP of the pallet P and on information regarding the angle for calculation. The first candidate trajectory TRb1 indicates the candidate trajectory TRb of which the angle for calculation is closest to the angle θP of the pallet P detected by the sensor 26, among the candidate trajectories TRb of which the angle for calculation is smaller than the angle θP of the pallet P detected by the sensor 26. The second candidate trajectory TRb2 indicates the candidate trajectory TRb of which the angle for calculation is closest to the angle θP of the pallet P detected by the sensor 26, among the candidate trajectories TRb of which the angle for calculation is greater than the angle θP of the pallet P detected by the sensor 26. The region setting unit 78 sets a region between the first candidate trajectory TRb1 and the second candidate trajectory TRb2 extracted in this manner, that is, a region surrounded by the first candidate trajectory TRb1 and the second candidate trajectory TRb2, as a permitted region A1. Then, the region setting unit 78 sets a region other than the region between the first candidate trajectory TRb1 and the second candidate trajectory TRb2, as a prohibited region A2. The trajectory setting unit 80 sets a trajectory TR such that the trajectory TR passes through the permitted region A1 and does not pass through the prohibited region A2. The movement control unit 72 moves the mobile machine 10 to the target position/posture AR2 following the trajectory TR set in this way.

Both a case where the pallet P is inclined in one direction (for example, a clockwise direction) by the upper limit angle θPmax and a case where the pallet P is inclined in the other direction (for example, a counterclockwise direction) by the upper limit angle θPmax are considered. In this case, the candidate trajectory setting unit 56 calculates the candidate trajectory TRb of each angle for calculation for each inclination direction. Then, the region setting unit 78 determines a direction in which the pallet P is inclined, from the direction of the pallet P, and acquires the candidate trajectory TRb of each angle for calculation at which the pallet P is inclined to a direction side in which the pallet P is inclined.

Figure 15:
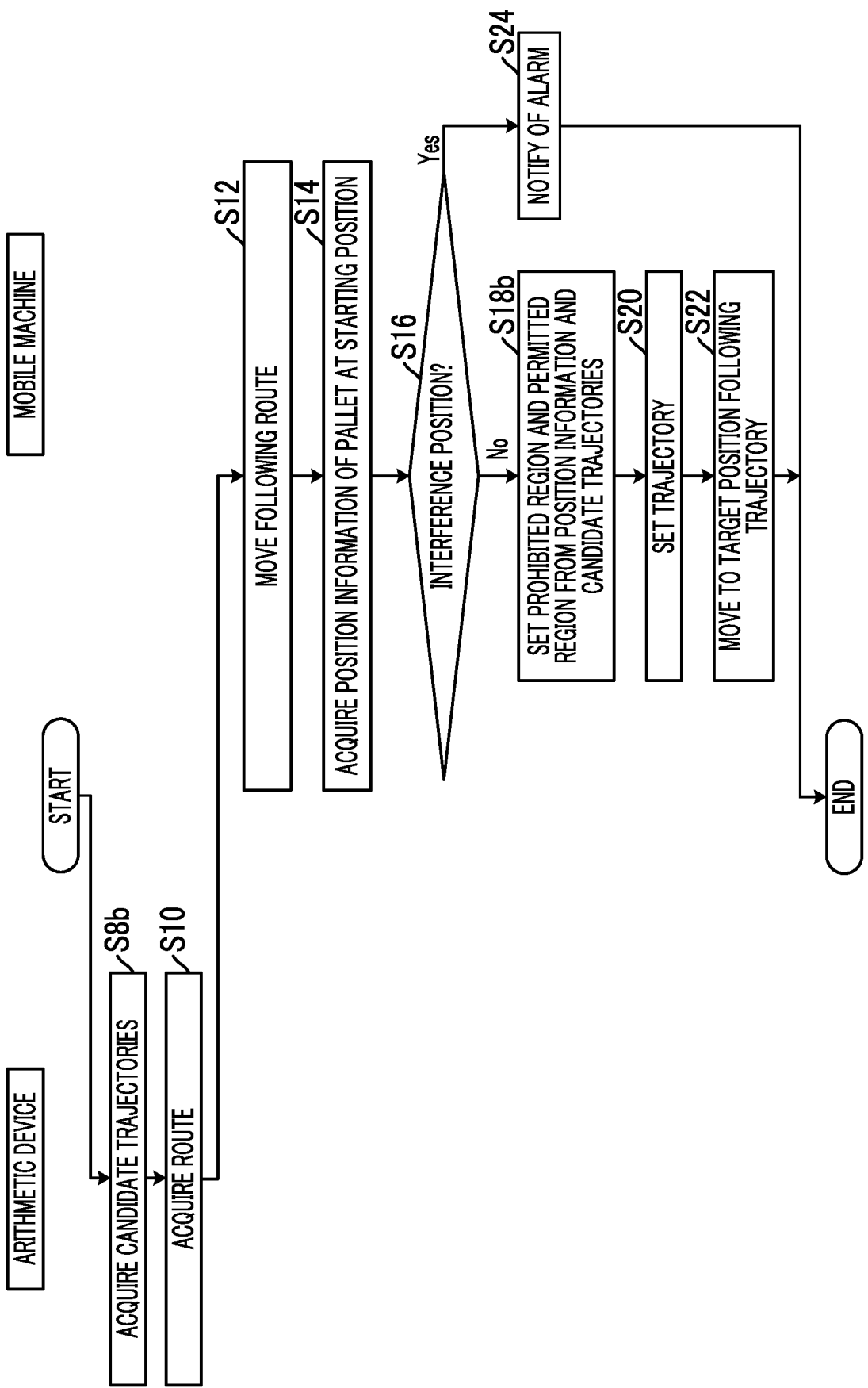
FIG. 15 is a flowchart illustrating a movement control flow of a mobile machine according to a third embodiment.

FIG. 15 is a flowchart illustrating a movement control flow of the mobile machine according to the third embodiment. As shown in FIG. 15, the arithmetic device 14a according to the third embodiment acquires a plurality of candidate trajectories TRb set in advance, with the candidate trajectory setting unit 56 (Step S8b). The candidate trajectory setting unit 56 sets the candidate trajectory TRb in advance for each angle for calculation. The candidate trajectory setting unit 56 acquires the candidate trajectories TRb set for the installation region AR0 of the target pallet P. Processing of subsequent Steps S10 to S16 is the same as in the first embodiment, and thus, description thereof will not be repeated. In the example of FIG. 15, although Step S10 is executed after Step S8b, the order of Steps S8b and S10 is not limited thereto and is optional.

In a case where determination is made in Step S16 that the pallet P is not at the interference position (Step S16; No), the control device 28 sets the prohibited region A2 and the permitted region A1 based on the position information of the pallet P and on the candidate trajectories TRb, with the region setting unit 78 (Step S18b). The region setting unit 78 extracts the first candidate trajectory TRb1 and the second candidate trajectory TRb2 based on the angle for calculation of the candidate trajectory TRb and on the angle θP of the pallet P. Then, the region setting unit 78 sets the region between the first candidate trajectory TRb1 and the second candidate trajectory TRb2 as the permitted region A1, and sets a region other than the region between the first candidate trajectory TRb1 and the second candidate trajectory TRb2, as the prohibited region A2. Processing after subsequent Step S20 is the same as in the first embodiment, and thus, description thereof will not be repeated.

As described above, in the third embodiment, the region setting unit 78 acquires a plurality of candidate trajectories TRb calculated in advance as the trajectory TR of the mobile machine 10 of each angle for calculation (inclination angle) of the pallet P. The region setting unit 78 sets the permitted region A1 through which the trajectory TR of the mobile machine 10 is permitted to pass, based on the angle for calculation in the candidate trajectory TRb and on the direction of the pallet P acquired by the target object information acquisition unit 74. The trajectory setting unit 80 sets the trajectory TR to pass through the permitted region A1. In this way, in the third embodiment, the candidate trajectory TRb of each angle for calculation is set in advance without depending on the detection result of the position information of the pallet P. Then, the control device 28 spreads and sets the prohibited region A2 to a region outside the first candidate trajectory TRb1 and the second candidate trajectory TRb2, that is, spreads and sets the prohibited region A2 to a region on a side toward which the pallet P is not directed or to a region outside the maximum inclination trajectory TRmax. In other words, the control device 28 sets the region between the first candidate trajectory TRb1 and the second candidate trajectory TRb2 as the permitted region A1 to further narrow down the search range. For this reason, with the control device 28 of the third embodiment, it is possible to further narrow down the search range. Since the outside of the first candidate trajectory TRb1 and the second candidate trajectory TRb2 is a trajectory in a direction in which the pallet P is not directed, there is a lower probability that the outside of the first candidate trajectory TRb1 and the second candidate trajectory TRb2 is set as an actual trajectory TR. For this reason, with the control device 28 of the third embodiment, it is possible to suppress reduction of the calculation accuracy of the trajectory TR while further narrowing down the search range.

Fourth Embodiment

Next, a fourth embodiment will be described. A control device 28 according to the fourth embodiment is different from that in the third embodiment in terms of a setting method of the permitted region A1 and the prohibited region A2. In the fourth embodiment, description of a configuration common to that in the third embodiment will not be repeated.

Figure 16:
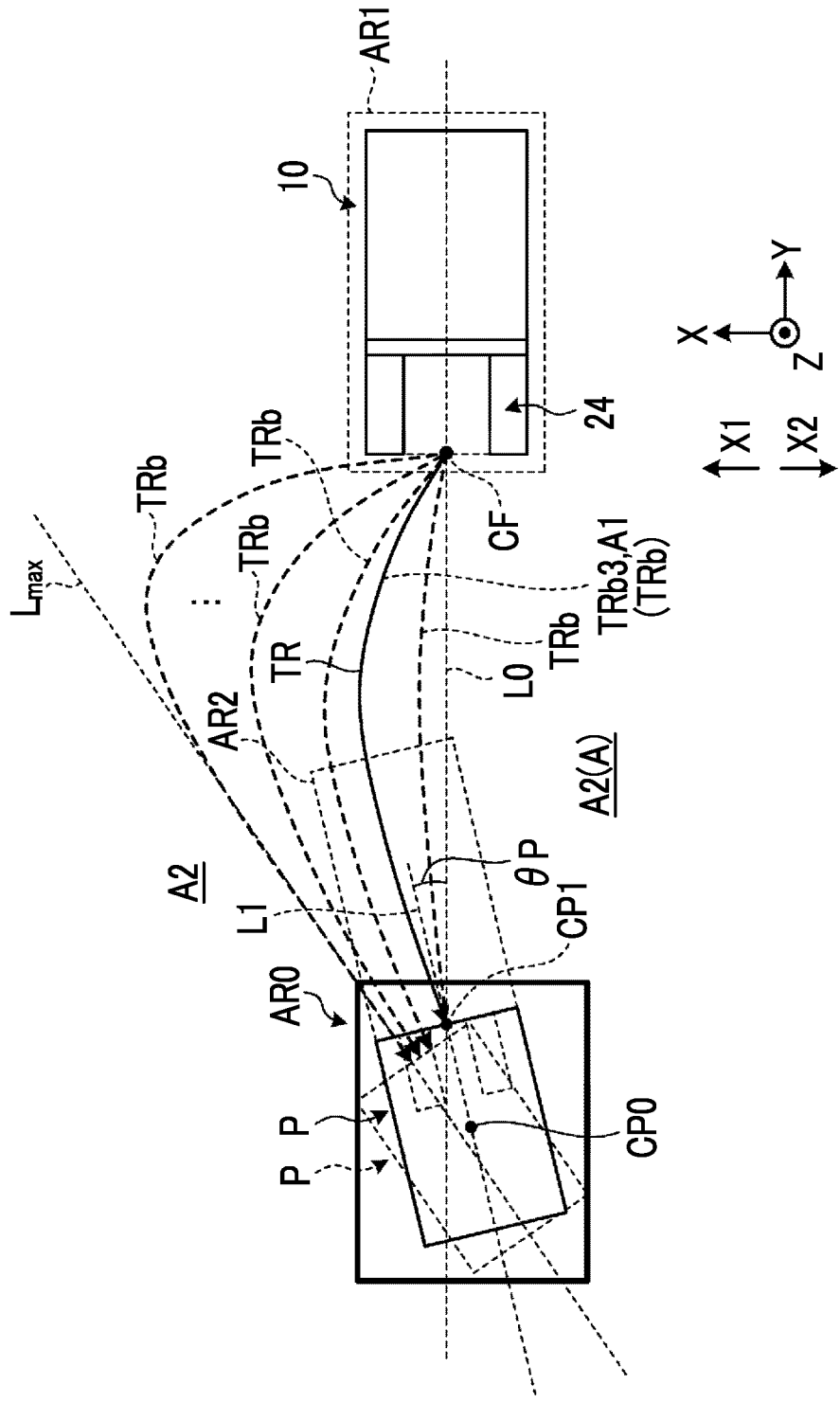
FIG. 16 is a schematic view illustrating candidate trajectories.

FIG. 16 is a schematic view illustrating candidate trajectories. A candidate trajectory setting unit 56 of an arithmetic device 14a according to the fourth embodiment sets a plurality of candidate trajectories TRb. In the fourth embodiment, the difference value of the angle for calculation of the candidate trajectory TRb is smaller than that in the third embodiment, for example. In the fourth embodiment, even in a case where the angle θP used for the calculation of the trajectory TR of the mobile machine 10 deviates from an actual inclination angle of the pallet P by the difference value, for example, it is preferable that the difference value is set such that the pallet P can be picked up with the movement (side shift) of the fork 24 in the horizontal direction. For example, the difference value of the fourth embodiment is preferably greater than 0 degrees and equal to or less than 1 degree, and more preferably, equal to or greater than 0.5 degrees and equal to or less than 1 degree. Also in the fourth embodiment, a calculation method of the candidate trajectory TRb in a case where the angle for calculation is set is the same as in the third embodiment.

The control device 28 according to the fourth embodiment selects the trajectory TR from among the candidate trajectories TRb without performing the calculation of the trajectory TR. That is, the control device 28 extracts the candidate trajectory TRb of which the angle for calculation is closest to the angle θP of the pallet P acquired by the target object information acquisition unit 74 and selects the candidate trajectory TRb as an actual trajectory TR. For example, the region setting unit 78 according to the fourth embodiment acquires information regarding each candidate trajectory TRb from the candidate trajectory setting unit 56. The region setting unit 78 divides the region A using information regarding the direction of the pallet P acquired by the target object information acquisition unit 74 and the candidate trajectories TRb. Specifically, the region setting unit 78 acquires the angle θP of the pallet P detected by the sensor 26 from the target object information acquisition unit 74. The region setting unit 78 extracts the candidate trajectory TRb of which the angle for calculation is closest to the angle θP of the pallet P detected by the sensor 26, from a plurality of candidate trajectories TRb based on the angle θP of the pallet P and on information regarding the angle for calculation. The region setting unit 78 sets the extracted candidate trajectory TRb as the permitted region A1, and sets a region other than the candidate trajectory TRb, that is, a region that does not overlap the candidate trajectory TRb, as the prohibited region A2. The trajectory setting unit 80 sets (employs) the candidate trajectory TRb set as the permitted region A1, that is, the candidate trajectory TRb of which the angle for calculation is closest to the detected angle θP of the pallet P, as the trajectory TR without calculating the trajectory TR through an arithmetic operation. The movement control unit 72 moves the mobile machine 10 to the target position/posture AR2 following the trajectory TR set in this way.

Both a case where the pallet P is inclined in one direction (for example, a clockwise direction) by the upper limit angle θPmax and a case where the pallet P is inclined in the other direction (for example, a counterclockwise direction) by the upper limit angle θPmax are considered. In this case, the candidate trajectory setting unit 56 calculates the candidate trajectory TRb of each angle for calculation for each inclination direction. Then, the control device 28 determines a direction in which the pallet P is inclined, from the direction of the pallet P, and acquires the candidate trajectory TRb of each angle for calculation at which the pallet P is inclined on a direction side on which the pallet P is inclined.

FIG. 17 is a flowchart illustrating a movement control flow of the mobile machine according to the fourth embodiment. As shown in FIG. 17, the arithmetic device 14a according to the fourth embodiment acquires a plurality of candidate trajectories TRb set in advance, with the candidate trajectory setting unit 56 (Step S8c). The candidate trajectory setting unit 56 sets the candidate trajectory TRb for each angle for calculation. The candidate trajectory setting unit 56 acquires the candidate trajectories TRb set for the installation region AR0 of the target pallet P. Processing of subsequent Steps S10 to S16 is the same as in the first embodiment, and thus, description thereof will not be repeated. In the example of FIG. 17, although Step S10 is executed after Step S8c, the order of Steps S8c and S10 is not limited thereto and is optional.

In a case where determination is made in Step S16 that the pallet P is not at the interference position (Step S16; No), the control device 28 sets the prohibited region A2 and the permitted region A1 based on the position information of the pallet P and on the candidate trajectories TRb, with the region setting unit 78 (Step S18c). The region setting unit 78 extracts the candidate trajectory TRb of which the angle for calculation is closest to the angle θP of the pallet P, based on the angle for calculation of the candidate trajectory TRb and on the angle θP of the pallet P, and sets the candidate trajectory TRb as the permitted region A1. Then, the control device 28 employs, as the trajectory TR, the candidate trajectory TRb set as the permitted region A1, with the trajectory setting unit 80 (Step S20c). Processing after Step S22 is the same as in the first embodiment, and thus, description thereof will not be repeated.

As described above, in the fourth embodiment, the region setting unit 78 sets the candidate trajectory TRb of which the angle for calculation (inclination angle) is closest to the direction of the pallet P acquired by the target object information acquisition unit 74, as the permitted region A1. The trajectory setting unit 80 sets, as the trajectory TR, the candidate trajectory TRb set as the permitted region A1. In this way, in the third embodiment, the candidate trajectory TRb of each angle for calculation is set in advance without depending on the detection result of the position information of the pallet P. Then, the control device 28 employs the candidate trajectory TRb closest to the detected direction of the pallet P as the trajectory TR without performing the calculation of the trajectory TR. For this reason, with the control device 28 of the fourth embodiment, the calculation processing of the trajectory TR is not required, and it is possible to further reduce the calculation load. The candidate trajectory TRb that is closest to the detected angle θP of the pallet P is employed, whereby it is also possible to suppress reduction of the selection accuracy of the trajectory TR.

In the third embodiment, the trajectory TR is calculated with the region surrounded by the first candidate trajectory TRb1 and the second candidate trajectory TRb2 as the search range; however, as in the fourth embodiment, the candidate trajectory TRb calculated in advance may be set as the trajectory TR depending on conditions without calculating the trajectory TR. For example, in the third embodiment, in a case where there is the candidate trajectory TRb for which a difference in angle for calculation from the trajectory TR is equal to or less than a threshold value, the control device 28 employs the candidate trajectory TRb as the trajectory TR without performing the calculation of the trajectory TR. The threshold value herein can be set optionally, and may be, for example, 1 degree.

Fifth Embodiment

Next, a fifth embodiment will be described. The fifth embodiment is different from the first to fourth embodiments in that in transporting the pallet P as the target object, determination is made whether or not the pallet P interferes with an adjacent object disposed in the vicinity, and in a case where there is no interference, the pallet P is transported. The fifth embodiment can be applied to the first to fourth embodiments. That is, for example, while a trajectory is set not to pass through a prohibited region using a method of at least one of the first to fourth embodiments, determination may be made whether or not the pallet P interferes with an adjacent object in a case of transporting the pallet P along the trajectory, and in a case where there is no interference, the trajectory may be employed and the mobile machine 10 may be moved along the trajectory.

(Overall Configuration of Movement Control System)

FIG. 18A is a schematic view of a movement control system according to the fifth embodiment. As shown in FIG. 18A, a movement control system 1 according to the fifth embodiment includes a mobile machine 10, a management system 12, and an arithmetic device 14. The movement control system 1 is a system that controls the movement of the mobile machine 10 belonging to a facility W. The facility W is, for example, a facility that is used for physical distribution management, such as a warehouse. In a region A of the facility W, a plurality of installation regions AR0 are provided. The region A is, for example, a floor surface of the facility W and is a region where the pallet P (load) is installed or the mobile machine 10 moves. The installation region AR0 is a region where the pallet P (load) as a target object is installed. The installation region AR0 is set in advance as a region where the pallet P (load) as a target object should be installed. The installation region AR0 is divided by, for example, white lines, and a position (coordinates), a shape, and a size of the installation region AR0 are set in advance. In the present embodiment, although the installation region AR0 is provided in the region A that is a floor of the facility W, the present invention is not limited thereto, and the installation region AR0 may be provided in a platform of a vehicle that carries the pallet P in the facility W. Although the installation region AR0 is partitioned for each pallet P, and one pallet P is disposed in the installation region AR0, the present invention is not limited thereto. For example, the installation region AR0 may be set as a free space such that a plurality of pallets P are installed. In the example of FIG. 18A, although the installation region AR0 has a rectangular shape, the shape and the size may be optional. FIG. 18B is a schematic view showing an example of another installation region of the movement control system according to the fifth embodiment. As shown in FIG. 18B, two lines may be drawn in parallel vertically, and a range of a width of the two lines may be an installation region. In this case, the pallets P are disposed to be arranged vertically within the range of the width of the two lines drawn vertically.

The mobile machine 10 is a device that can automatically move. In the present embodiment, the mobile machine 10 is a forklift, and additionally, is a so-called automated guided forklift (AGF), an automated guided vehicle (AGV), or the like. As illustrated in FIG. 18A, the mobile machine 10 moves on the region A in the facility W. The mobile machine 10 moves toward the installation region AR0 following a route R. In a case of reaching a starting position AR1, the mobile machine 10 moves from the starting position AR1 to a target position/posture AR2 following a trajectory TR1 set based on the position information of the pallet P to pick up the pallet P. In the present embodiment, the mobile machine 10 continuously carries out detection with a sensor 26 described below during running following the route R, and a position where the sensor 26 can detect the position information of the pallet P is the starting position AR1. That is, it can be said that the starting position AR1 is a position on the route R where the sensor 26 can detect the position information of the pallet P (the detection of the position information of the pallet P with the sensor 26 is valid). The target position/posture AR2 is a position and a posture to be a predetermined position and posture with respect to the pallet P. It can be said that the target position/posture AR2 is a position/posture in which the mobile machine 10 can pick up the pallet P. In the example of the present embodiment, it can be said that the target position/posture AR2 is a position and a posture (direction) of the mobile machine 10 in which the mobile machine 10 moves straight without moving in a lateral direction such that a fork 24 of the mobile machine 10 described below can be inserted into openings Pb of the pallet P described below. The mobile machine 10 moves straight from the target position/posture AR2 to pick up the pallet P and transports the pallet P following a transport trajectory TR2. The details of the movement following the route R of the mobile machine 10, the trajectory TR1, and the transport trajectory TR2 will be described below. Hereinafter, one direction along the region A is referred to as a direction X, and a direction along the region A and orthogonal to the direction X is referred to as a direction Y. A direction orthogonal to the region A, that is, a direction orthogonal to the directions X and Y, is referred to as a direction Z. It can be said that the directions X and Y are a horizontal direction, and the direction Z is a vertical direction.

In the facility W, an adjacent object PA may be disposed in the vicinity of the installation region AR0 where the pallet P is installed. It can be said that the adjacent object PA is an object that is disposed in the vicinity of the pallet P as the target object. In the following description, although the adjacent object PA is a pallet (load) that is disposed in the vicinity of the installation region AR0, the present invention is not limited thereto, and the adjacent object PA may be any object or may be an object to be transported, such as a pallet or a load, or a structure, such as a post, a wall, or a fence. Hereinafter, a case where the adjacent object PA is disposed in an installation region AR0A other than the installation region AR0, and the installation region AR0A is adjacent to the installation region AR0 will be described as an example.

(Mobile Machine)

Figure 19:
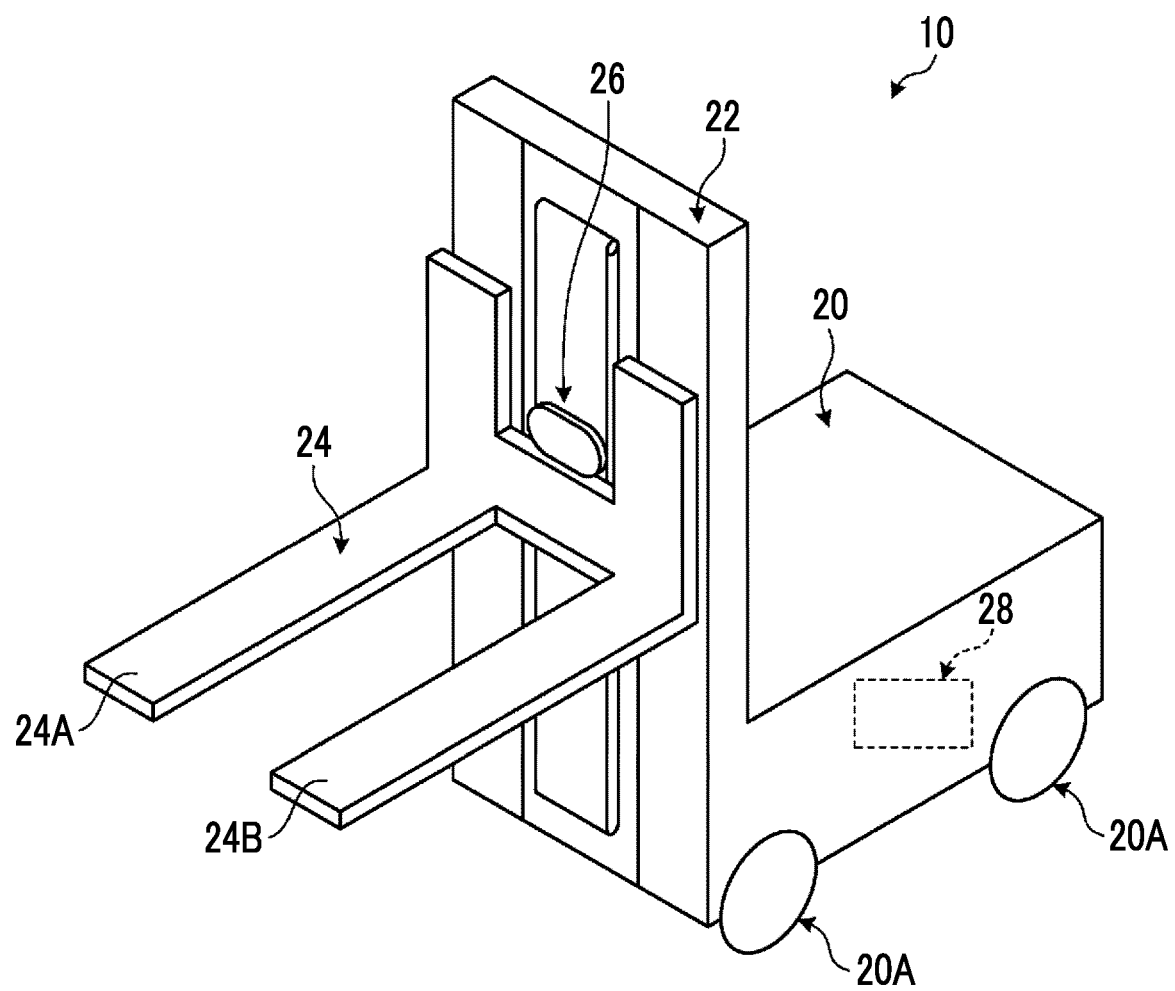
FIG. 19 is a schematic view showing the configuration of a mobile machine.

FIG. 19 is a schematic view of the configuration of the mobile machine. As shown in FIG. 19, the mobile machine 10 includes a vehicle body 20, a mast 22, a fork 24, a sensor 26, and a control device 28. The vehicle body 20 includes wheels 20A. The mast 22 is provided in one end portion in a front-rear direction of the vehicle body 20. The mast 22 extends along an up-down direction (here, the direction Z) orthogonal to the front-rear direction. The fork 24 is attached to the mast 22 to be movable in the direction Z. The fork 24 may be movable in a lateral direction (a direction crossing the up-down direction and the front-rear direction) of the vehicle body 20 with respect to the mast 22. The fork 24 has a pair of tabs 24A and 24B. The tabs 24A and 24B extend toward a direction away from the vehicle body 20 vertically with respect to the mast 22. The tab 24A and the tab 24B are disposed away from each other in a lateral direction of the mast 22. Hereinafter, in the front-rear direction, a direction on a side on which the fork 24 is provided in the mobile machine 10 is referred to as a first direction, and a side on which the fork 24 is not provided is referred to as a second direction.

The sensor 26 detects at least one of a position and a posture of an object present around the vehicle body 20. It can also be said that the sensor 26 detects the position of the object with respect to the mobile machine 10 and the posture of the object with respect to the mobile machine 10. In the present embodiment, the sensor 26 is provided in the mast 22 and detects the position and the posture of the object on the first direction side of the vehicle body 20. Note that a detection direction of the sensor 26 is not limited to the first direction, and detection may be performed on both the first direction side and the second direction side. In this case, as the sensor 26, a sensor that performs detection on the first direction side and a sensor that performs detection on the second direction side may be provided. The sensor 26 is, for example, a sensor (laser sensor) that emits laser light. The sensor 26 emits laser light while scanning in one direction (here, a lateral direction) and detects the position and the posture of the object from reflected light of emitted laser light. The sensor 26 may be a sensor that detects the object using any method, not limited to that described above, and may be, for example, a camera or an image sensor. A position where the sensor 26 is provided is not limited to the mast 22. Specifically, for example, a safety sensor that is provided on the mobile machine 10 may be used as the sensor 26. The use of the safety sensor eliminates a need for newly providing a sensor.

The control device 28 controls the movement of the mobile machine 10. The control device 28 will be described below.

(Management System)

Figure 20:
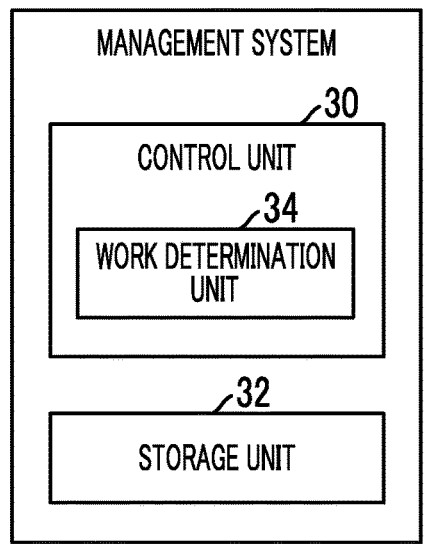
FIG. 20 is a configuration diagram of a management system according to the fifth embodiment.

FIG. 20 is a configuration diagram of the management system. The management system 12 is a system that manages physical distribution in the facility W. Although the management system 12 is a warehouse management system (WMS) in the present embodiment, the management system 12 may be any system not limited to the WMS, and may be, for example, a back-end system, such as other production management systems. The management system 12 is provided at any position, and may be provided in the facility W or may be provided at a position away from the facility W to manage the facility W through wired communication or wireless communication therefrom. The management system 12 includes a computer, and as shown in FIG. 20, includes a control unit 30 and a storage unit 32. The storage unit 32 is a storage device that stores various kinds of information, such as details of calculation of the control unit 30 and programs, and includes, for example, at least one of a main storage device, such as a random access memory (RAM) or a read only memory (ROM), and an external storage device, such as a hard disk drive (HDD) or a solid state drive (SSD).

The control unit 30 includes an arithmetic device, that is, a central processing unit (CPU). The control unit 30 includes a work determination unit 34. The control unit 30 reads out a program (software) from the storage unit 32 and executes the program to realize the work determination unit 34, and executes processing thereof. The control unit 30 may execute the processing with one CPU or may include a plurality of CPUs and may execute parallel processing with a plurality of CPUs. The work determination unit 34 may be realized by a hardware circuit.

The work determination unit 34 determines the pallet P to be transported. Specifically, the work determination unit 34 determines work details indicating information of the pallet P to be transported based on, for example, an input work plan. It can be said that the work details are information for specifying the pallet P to be transported. In the example of the present embodiment, the work determination unit 34 determines, as the work details, a facility where the pallet (load) is present, the pallet P (load) that is to be transported, and when and where the pallet P (load) is to be transported. That is, the work details are information indicating a facility and a storage space where the target pallet P is stored, the target pallet P, a transport destination of the pallet P, and a transport time of the pallet P. The work determination unit 34 transmits the determined work details to the arithmetic device 14.

(Arithmetic Device)

Figure 21:
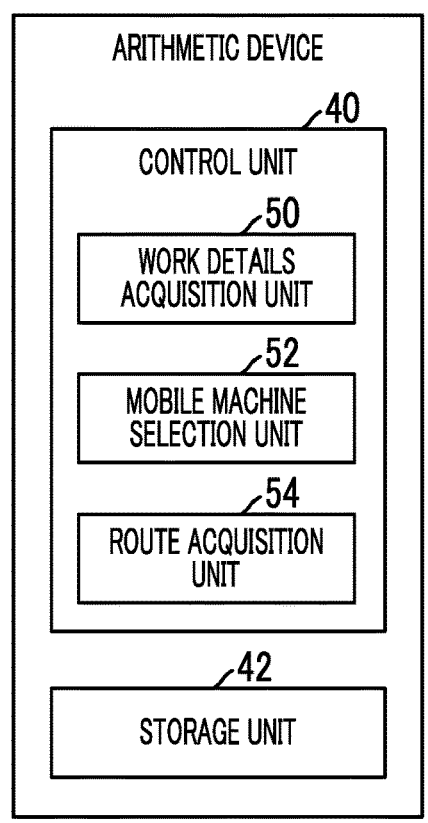
FIG. 21 is a configuration diagram of an arithmetic device according to the fifth embodiment.

FIG. 21 is a schematic configuration diagram of the arithmetic device. In the present embodiment, the arithmetic device 14 is a device that is provided in the facility W and calculates at least information regarding the movement of the mobile machine 10, or the like. The arithmetic device 14 is not limited as being provided in the facility W, and may be provided in another building different from the facility W, a control center provided at a remote location sufficiently away from the facility W, or the like, to perform telecommunication with the management system 12 provided in the facility W through wireless communication or wired communication. The arithmetic device 14 is a computer, and as shown in FIG. 21, includes a control unit 40 and a storage unit 42. The storage unit 42 is a memory that stores various kinds of information, such as details of calculation of the control unit 40 and programs, and includes, for example, at least one of a main storage device, such as a RAM or a ROM, and an external storage device, such as an HDD or an SSD.

The control unit 40 is a part that executes calculation processing. That is, the control unit 40 may be configured with a CPU. The control unit 40 includes a work details acquisition unit 50, a mobile machine selection unit 52, and a route acquisition unit 54. The control unit 40 reads out a program (software) from the storage unit 42 and executes the program to realize the work details acquisition unit 50, the mobile machine selection unit 52, and the route acquisition unit 54, and executes processing thereof. The control unit 40 may execute the processing with one CPU or may include a plurality of CPUs and may execute parallel processing with a plurality of CPUs. At least a part of the work details acquisition unit 50, the mobile machine selection unit 52, and the route acquisition unit 54 may be realized by a hardware circuit.

The work details acquisition unit 50 acquires information regarding the work details determined by the management system 12, that is, information regarding the pallet P to be transported. The work details acquisition unit 50 specifies the installation region AR0 where the pallet P is installed, from information regarding the pallet P in the work details. For example, the pallet P and the installation region AR0 where the pallet P is installed are stored in the storage unit 42 in association with each other, and the work details acquisition unit 50 reads out information from the storage unit 42 to specify the installation region AR0. The mobile machine selection unit 52 selects the target mobile machine 10. The mobile machine selection unit 52 selects the target mobile machine 10, for example, from a plurality of moving bodies 10 that belong to the facility W. Although the mobile machine selection unit 52 may select the target mobile machine 10 using any method, the mobile machine 10 suitable for transporting the pallet P in the installation region AR0 may be selected as the target mobile machine 10, for example, based on the installation region AR0 specified by the work details acquisition unit 50.

The route acquisition unit 54 acquires information regarding the route R to the installation region AR0 specified by the work details acquisition unit 50. The route R is set in advance, for example, for each installation region AR0, and the route acquisition unit 54 acquires the route R set for the installation region AR0 specified by the work details acquisition unit 50, for example, from the storage unit 42. In the present embodiment, the route R is a passage from a start position set in advance to the installation region AR0. The start position herein may be a position where the mobile machine 10 is on standby. The route R is set in advance based on map information of the facility W. The map information of the facility W is information including position information of obstacles (posts, walls, fences, and the like) that are installed in the facility W or of passages through which the mobile machine 10 can run. It can be said that the map information is information indicating regions where the mobile machine 10 can move, in the region A. The route R may be set based on information regarding a vehicle specification of the mobile machine 10 in addition to the map information of the facility W. Information regarding the vehicle specification is, for example, a specification that affects a passage through which the mobile machine 10 can move, such as a size or a minimum turn radius of the mobile machine 10. In a case where the route R is set based on information regarding the vehicle specification, the route R may be set for each mobile machine. The route R may be manually set based on the map information, information regarding the vehicle specification, or the like or may be automatically set based on the map information, information regarding the vehicle specification, or the like with a device, such as the arithmetic device 14. In a case of automatically setting the route R, for example, a desired pass point (Waypoint) may be designated, and in this case, a shortest route R that avoids obstacles (fixed objects, such as posts, walls, and fences) while passing the desired pass point can be set.

The route acquisition unit 54 may set the route R without reading out the route R set in advance. In this case, the route acquisition unit 54 may generate, as the route R, a passage from a current position of the mobile machine 10 to the installation region AR0 as a movement destination based on the position information of the target mobile machine 10, the position information of the installation region AR0, and the map information of the facility W.

The arithmetic device 14 transmits information regarding the route R generated as described above to the target mobile machine 10. Since the route R is a passage to the installation region AR0, it can be said that the route R is information regarding the movement of the mobile machine 10.

(Control Device for Mobile Machine)

Figure 22:
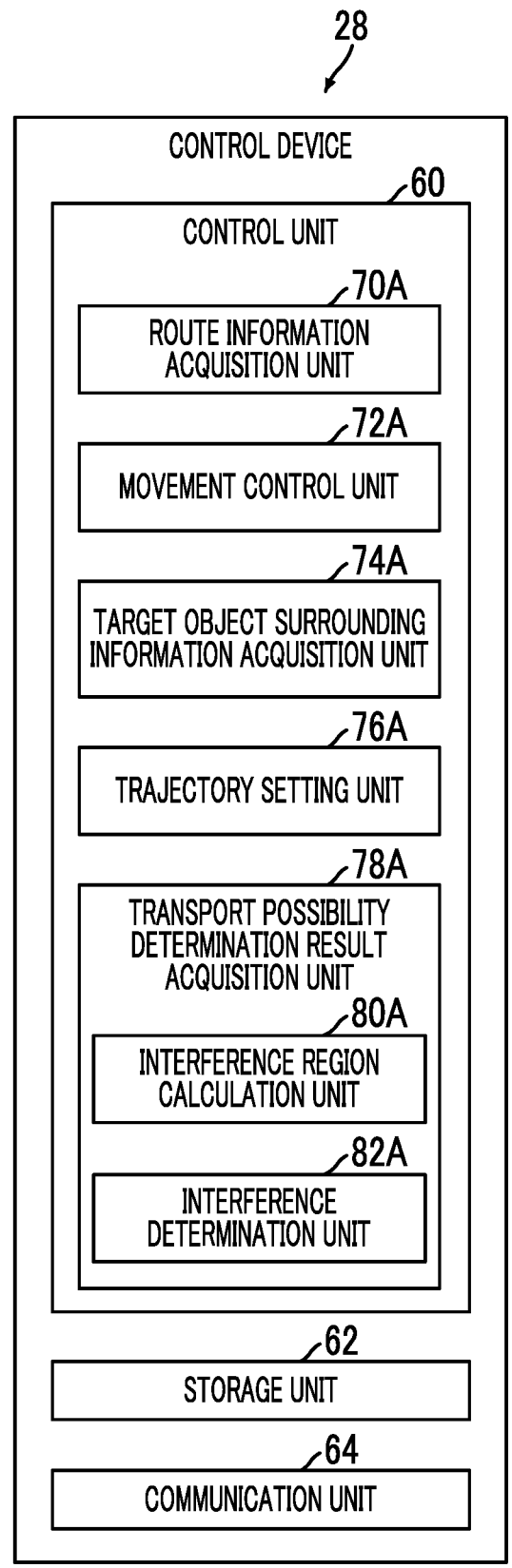
FIG. 22 is a configuration diagram of a control device according to the fifth embodiment.

Next, the control device 28 of the mobile machine 10 will be described. FIG. 22 is a configuration diagram of the control device of the mobile machine. The control device 28 controls the mobile machine 10. The control device 28 sets the trajectory TR1 to the target position/posture AR2 based on the detection result of the position or on the posture of the pallet P in the sensor 26 of the mobile machine 10. A setting method of the trajectory TR1 will be described below. The control device 28 moves the mobile machine 10 to the target position/posture AR2 along the trajectory TR1 and makes the mobile machine 10 pick up the pallet P. The control device 28 moves the mobile machine 10 that picks up the pallet P, along the transport trajectory TR2. The control device 28 is a computer, and as shown in FIG. 22, includes a control unit 60, a storage unit 62, and a communication unit 64. The storage unit 62 is a memory that stores various kinds of information, such as details of calculation of the control unit 60 and programs, and includes, for example, at least one of a main storage device, such as a RAM or a ROM, and an external storage device, such as an HDD or an SSD. The communication unit 64 is a communication module that performs communication with an external device, and is, for example, an antenna.

The control unit 60 includes a route information acquisition unit 70A, a movement control unit 72A, a target object surrounding information acquisition unit 74A, a trajectory setting unit 76A, and a transport possibility determination result acquisition unit 78A. The control unit 60 reads out a program (software) from the storage unit 62 and executes the program to realize the route information acquisition unit 70A, the movement control unit 72A, the target object surrounding information acquisition unit 74A, the trajectory setting unit 76A, and the transport possibility determination result acquisition unit 78A, and executes the processing thereof. The control unit 60 may execute the processing with one CPU or may include a plurality of CPUs and may execute parallel processing with a plurality of CPUs. At least a part of the route information acquisition unit 70A, the movement control unit 72A, the target object surrounding information acquisition unit 74A, the trajectory setting unit 76A, and the transport possibility determination result acquisition unit 78A may be realized by a hardware circuit.

(Route Information Acquisition Unit, Movement Control Unit)

The route information acquisition unit 70A acquires information regarding the route R from the arithmetic device 14 through the communication unit 64. The movement control unit 72A performs control such that a drive unit of the mobile machine 10 or a movement mechanism, such as steering, controls the movement of the mobile machine 10. The movement control unit 72A moves the mobile machine 10 following the route R acquired by the route information acquisition unit 70A. That is, the movement control unit 72A moves the mobile machine 10 from a current position of the mobile machine 10 toward the installation region AR0 to pass through the route R. The movement control unit 72A sequentially ascertains the position information of the mobile machine 10 to move the mobile machine 10 to pass through the route R. Although an acquisition method of the position information of the mobile machine 10 is optional, for example, in the present embodiment, as shown in FIG. 18A, detection bodies S are provided in the facility W, and the movement control unit 72A acquires the position information of the mobile machine 10 based on the detection of the detection body S. Specifically, the mobile machine 10 emits laser light toward the detection body S and receives reflected light of the laser light by the detection body S to detect the position of the mobile machine 10 in the facility W. As another method, the mobile machine 10 may estimate the position of the mobile machine 10 through simultaneous localization and mapping (SLAM). That is, the mobile machine 10 may estimate the position of the mobile machine 10 through LiDAR SLAM that is a method for increasing the accuracy of self-position estimation of the mobile machine 10 by performing environmental map creation around the mobile machine 10 using Light Detection and Ranging (LiDAR) and collating a self-position estimation result estimated based on a measured value of a laser sensor, a rotation amount of the wheels 20A of the mobile machine 10, or the like with an environmental map creation result. The mobile machine 10 may estimate the position of the mobile machine 10 through Visual SLAM that is a method for increasing the accuracy of self-position estimation by performing environmental map creation around the mobile machine 10 using a camera or an image sensor instead of LiDAR and collating a self-position estimation result estimated based on a measured value of a camera, a rotation amount of the wheels 20A of the mobile machine 10, or the like with an environmental map creation result. The mobile machine 10 may estimate the position of the mobile machine 10 by detecting a magnetic coil embedded in the region A in the facility W with a magnetic sensor mounted in the mobile machine 10. The position of the mobile machine 10 herein is two-dimensional coordinates of the direction X and the direction Y in the region A of the facility W. Hereinafter, a position indicates two-dimensional coordinates in the region A unless otherwise described.

(Target Object Surrounding Information Acquisition Unit)

The target object surrounding information acquisition unit 74A makes the sensor 26 of the mobile machine 10 detect an object while the mobile machine 10 is running on the route R. That is, the target object surrounding information acquisition unit 74A makes the sensor 26 sequentially execute detection processing of the object while the mobile machine 10 is running on the route R. In a case where the mobile machine 10 reaches a distance at which the position information and posture information of the pallet P or of the adjacent object PA can be detected by the sensor 26, in a case where the sensor 26 is a laser sensor, the sensor 26 receives reflected light from the pallet P or from the adjacent object PA to detect the position information and the posture information of the pallet P or of the adjacent object PA. In a case where the sensor 26 is a camera, the target object surrounding information acquisition unit 74A acquires image data of the pallet P or of the adjacent object PA with the camera and analyzes the acquired image data to detect the position information and the posture information (information regarding the position and information regarding the posture) of the pallet P or of the adjacent object PA. In the present embodiment, a position of the mobile machine 10 in a case where the sensor 26 detects the position information and the posture information of the pallet P or of the adjacent object PA is the starting position AR1. That is, the target object surrounding information acquisition unit 74A acquires a detection result of the position information and the posture information of the pallet P or of the adjacent object PA from the sensor 26 during the running on the route R. Hereinafter, the position information and the posture information of the pallet P and the position information and the posture information of the adjacent object PA are described as target object surrounding information as appropriate.

Figure 23:
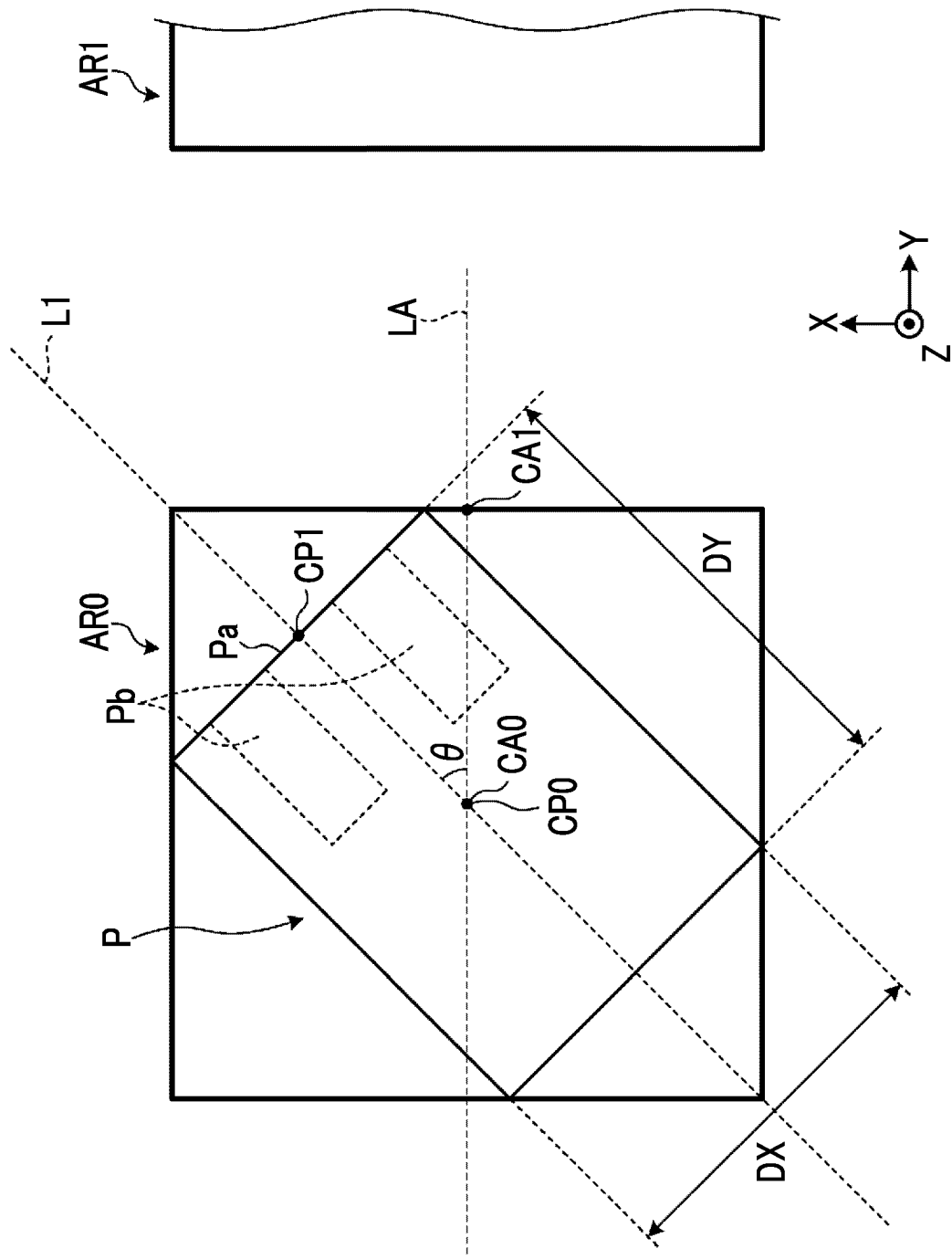
FIG. 23 is a schematic view showing disposition of a pallet in an installation region.

FIG. 23 is a diagram illustrating disposition of the pallet in the installation region. As shown in FIG. 23, the pallet P has openings Pb into which the fork 24 is inserted, in a front surface Pa as one side surface. The pallet P is disposed in the installation region AR0 such that the front surface Pa faces the starting position AR1. It is preferable that the pallet P is disposed to fall within the installation region AR0, in other words, not to protrude from the installation region AR0. It is preferable that the installation region AR0 has a size set such that an inclination angle θ of the pallet P with respect to the installation region AR0 does not exceed 45 degrees in a case where the pallet P is disposed not to protrude from the installation region AR0. That is, the inclination angle θ is set to fall within a range equal to or greater than 0 degrees and equal to or less than 45 degrees. The inclination angle θ indicates deviation of an angle of the pallet P with respect to the installation region AR0 in a horizontal direction along the installation region AR0. A straight line that connects a center point CP0 of the pallet P and a middle point CP1 of the front surface Pa of the pallet P in the horizontal direction and that is orthogonal to the Z direction (vertical direction) is referred to as a straight line L1. In addition, a straight line that connects a center point CA0 of the installation region AR0 and a middle point CA1 of a side of the installation region AR0 facing the starting position AR1 and that is orthogonal to the Z direction (vertical direction) is referred to as a straight line LA. In this case, it can be said that an angle between the straight line L1 and the straight line LA is the inclination angle θ. Here, a length of the side in the front surface Pa of the pallet P is referred to as a length DX, and a length of a side in the side surface is referred to as a length DY. In this case, to make the inclination angle θ not exceed 45 degrees in a case where the pallet P is disposed not to protrude from the installation region AR0, at least one of the sides of the installation region AR0 should be set shorter than $\{(DX/\sqrt{2})+(DY/\sqrt{2})\}$.

Figure 24:
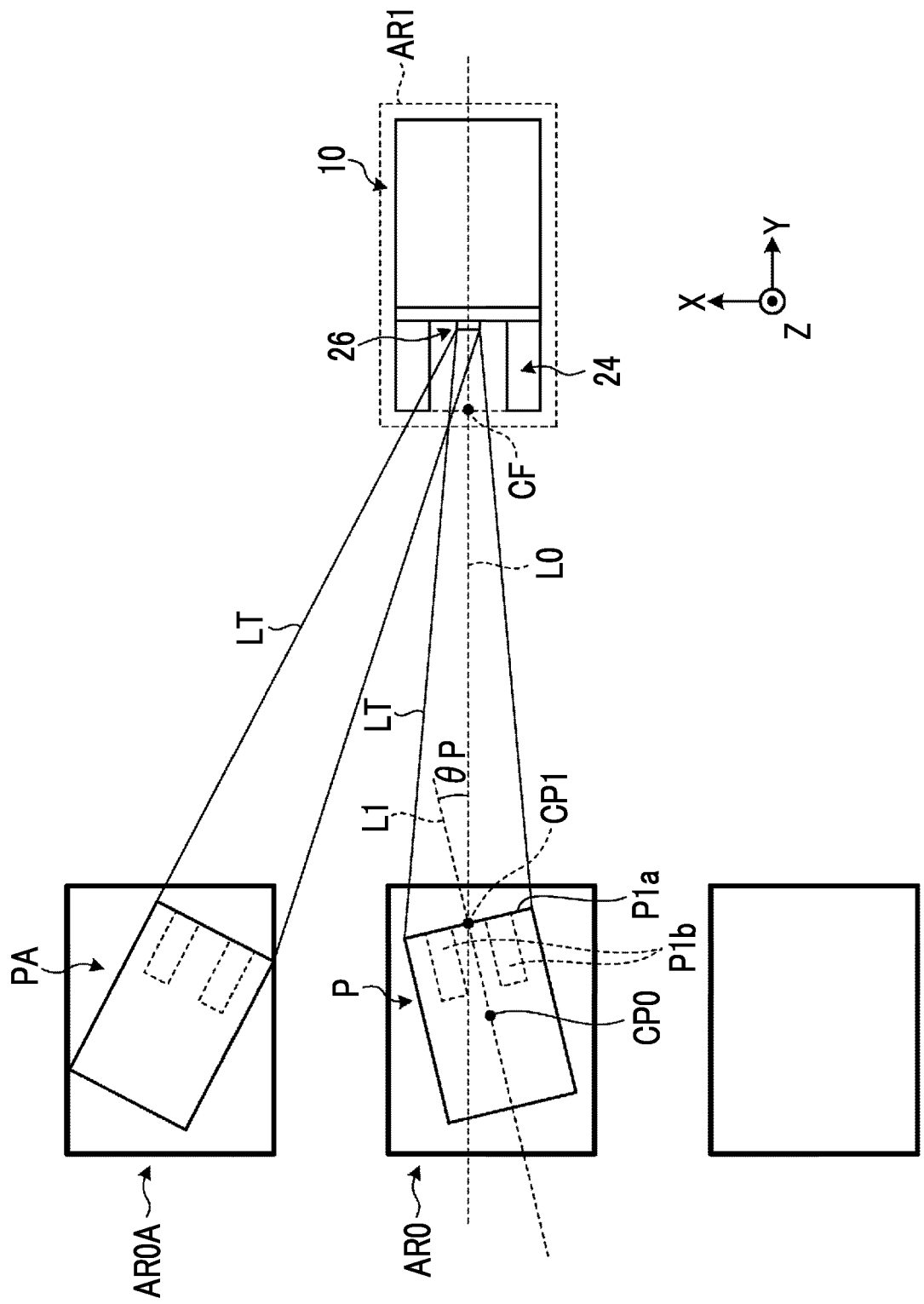
FIG. 24 is a schematic view illustrating a detection state of position information of a pallet or an adjacent object.

FIG. 24 is a schematic view illustrating a detection state of the position information of the pallet or of the adjacent object. As shown in FIG. 24, the target object surrounding information acquisition unit 74A acquires a detection result of the position information and the posture information of the pallet P as the target object and the position information and the posture information of the adjacent object PA from the sensor 26 of the mobile machine 10 at the starting position AR1. The position information and the posture information of the pallet P are information indicating the position and the posture of the pallet P, and the position information and the posture information of the adjacent object PA are information indicating the position and the posture of the adjacent object PA. For example, in a case of a configuration in which the sensor 26 emits laser light, the target object surrounding information acquisition unit 74A makes the sensor 26 emit laser light LT while scanning in a lateral direction (horizontal direction) while the mobile machine 10 is running on the route R. In a case where the mobile machine 10 reaches the starting position AR1, the pallet P and the adjacent object PA on the first direction side of the sensor 26 are irradiated with laser light LT and reflect laser light LT. The sensor 26 receives reflected light from the pallet P and from the adjacent object PA. The target object surrounding information acquisition unit 74A detects the position and the posture of the pallet P based on reflected light from the pallet P received by the sensor 26, and detects the position and the posture of the adjacent object PA based on reflected light from the adjacent object PA received by the sensor 26. That is, as shown in FIG. 24, it can be said that the target object surrounding information acquisition unit 74A acquires the detection result of the positions and the postures of the pallet P and the adjacent object PA from the sensor 26 in a case where the mobile machine 10 arrives at the starting position AR1 on the route R. In the example of FIG. 24, although a case where the number of adjacent objects PA is one has been shown, a case where a plurality of adjacent objects PA are provided around the pallet P is also considered. In this case, the target object surrounding information acquisition unit 74A acquires a detection result of the position information and the posture information of a plurality of adjacent objects PA in the sensor 26.

As described above, the position information and the posture information may be detected by any method not limited to the detection using laser light LT (LiDAR), and may be detected by, for example, a camera. In a case where the sensor 26 of the mobile machine 10 is a camera, the target object surrounding information acquisition unit 74A acquires image data of the pallet P or of the adjacent object PA while scanning the sensor 26 in the lateral direction (horizontal direction) while the mobile machine 10 is running on the route R. In a case where the mobile machine 10 reaches the starting position AR1, for the pallet P and the adjacent object PA on the first direction side of the sensor 26, image data is acquired by the sensor 26. The target object surrounding information acquisition unit 74A analyzes the acquired image data to acquire the position information and the posture information. That is, it can be said that the target object surrounding information acquisition unit 74A acquires the detection result of the positions and the postures of the pallet P and the adjacent object PA based on the image data acquired by the sensor 26.

The position of the pallet P herein is the position of the pallet P with respect to the mobile machine 10. It can be said that the position of the pallet P is the direction and the distance (that is, coordinates) in which the pallet P is positioned with respect to the mobile machine 10. It can also be said that the position of the pallet P acquired by the target object surrounding information acquisition unit 74A is the position of the pallet P with respect to the starting position AR1. The same applies to the position of the adjacent object PA.

The posture of the pallet P indicates the direction in which the pallet P faces the mobile machine 10, and more specifically, indicates a direction in which the front surface Pa of the pallet P faces the starting position AR1. In a case where a straight line that connects the middle point CP1 of the pallet P and a reference point CF of the mobile machine 10 and that is orthogonal to the direction Z (vertical direction) is referred to as a straight line L0, it can be said that an inclination of the straight line L1 with respect to the straight line L0 is the posture of the pallet P. That is, it can be also be said that the posture of the pallet P is an angle θP between the straight line L0 and the straight line L1, and the target object surrounding information acquisition unit 74A may calculate the angle θP. It can be said that the reference point CF is a reference point of the starting position AR1. The position of the reference point CF is set in advance. Although the reference point CF may be set at any position with respect to the starting position AR1, for example, a position overlapping a middle point in the horizontal direction of the mobile machine 10 that arrives at the starting position AR1 may be set as the reference point CF. The same applies to the position of the adjacent object PA. The target object surrounding information acquisition unit 74A can calculate the position and the posture of the pallet P or of the adjacent object PA from a direction in which reflected light from the pallet P or from the adjacent object PA is directed to the sensor 26, a time from when laser light LT is emitted to when reflected light is received, or the like.

(Trajectory Setting Unit)

Figure 25:
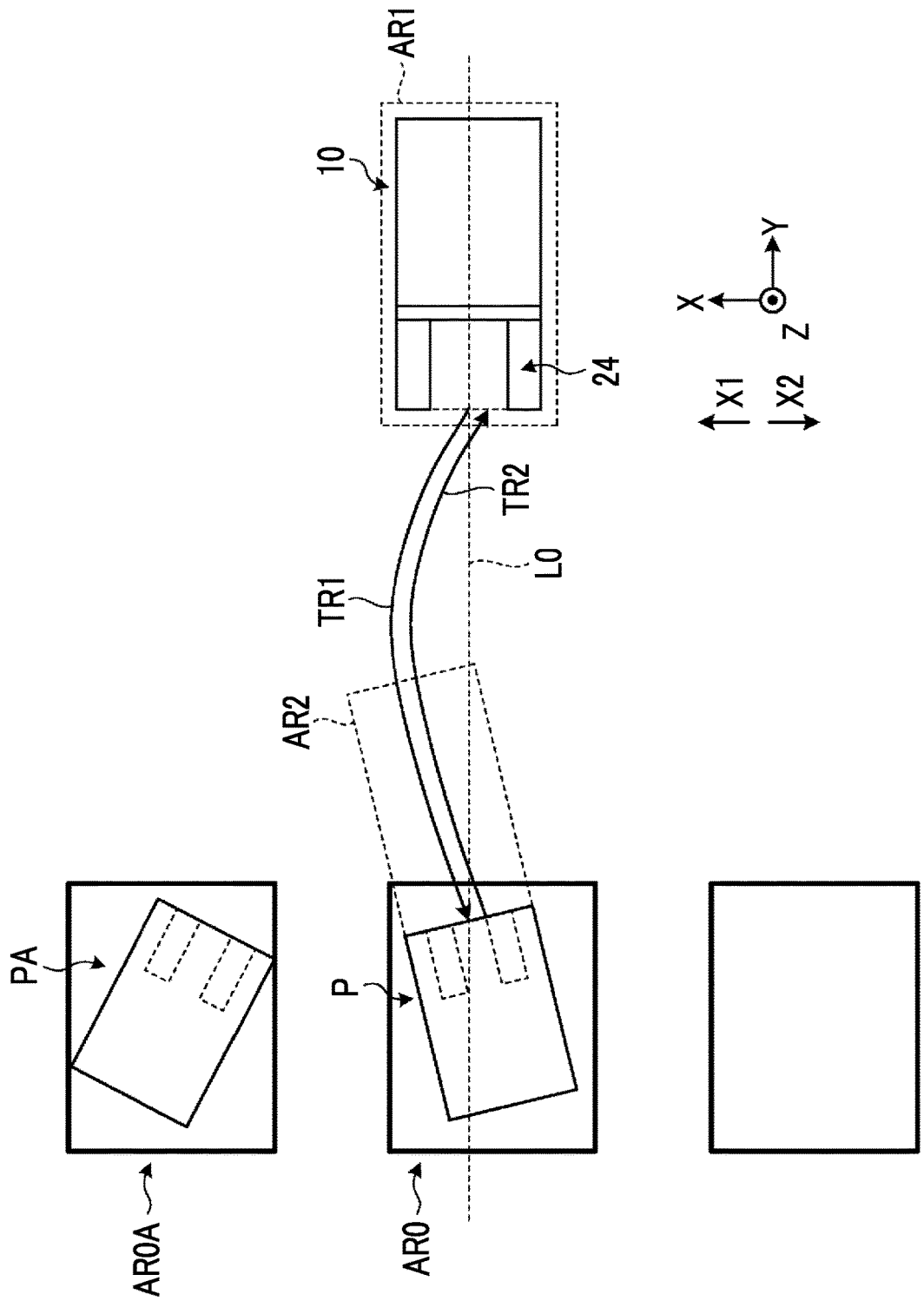
FIG. 25 is a schematic view illustrating trajectory setting.

FIG. 25 is a schematic view illustrating setting of a trajectory. As shown in FIG. 25, the trajectory setting unit 76A (see FIG. 22) sets the trajectory TR1 from the starting position AR1 (the mobile machine 10 at the starting position AR1) to the target position/posture AR2. The trajectory setting unit 76A sets the target position/posture AR2 based on the position information of the pallet P acquired by the target object surrounding information acquisition unit 74A, that is, the position and the posture of the pallet P. That is, the trajectory setting unit 76A calculates a position and a posture in which the pallet P can be picked up (the mobile machine 10 can move straight and insert the fork 24 into the openings Pb of the pallet P), from the position and the posture of the pallet P and sets the position and the posture as the target position/posture AR2. As an example, a place at 1000 mm in parallel in an axial direction of the opening Pb of the pallet P from an entrance of the openings Pb may be set as the target position/posture AR2.

In the present embodiment, the trajectory setting unit 76A calculates the trajectory TR1 through model predictive control (MPC). Hereinafter, an example of a calculation method of the trajectory TR1 will be described.

A control input u(k) of the mobile machine 10 is represented by Expression (9) described below.

$$u(k)=[v(k),\phi(k)]^T \qquad (9)$$

Here, v(k) is a speed command value of the mobile machine 10, φ(k) is a yaw rate command value of the mobile machine 10, and k represents an index of a discrete time. A control input U(k) of the mobile machine 10 of each discrete time is represented by Expression (10) described below. N is a predictive horizon.

$$U(k)=[u(k),u(k+1),\ldots,u(k+N-1)]^T \quad (10)$$

The trajectory setting unit 76A solves an optimization problem shown in Expression (11) described below and obtains u(k), u(k+1), . . . , and u(k+N−1) as an optimum solution of the control input to calculate the trajectory TR1. As a solution of the optimization problem, a known technique, such as a sequential quadratic programming method or an interior method, can be used.

$$J(U(k)) \to \min \quad (11)$$

In calculating the trajectory TR1 in this way, for example, constraint conditions shown in Expressions (12) to (16) described below are given.

$$x(k) = v(k)\cos\theta(k) \quad (12)$$

$$y(k) = v(k)\sin\theta(k) \quad (13)$$

$$\theta(k) = \frac{v(k)}{L}\tan\phi(k) \quad (14)$$

$$v(k) \leq v_{MAX} \quad (15)$$

$$-\phi_{MAX} \leq \phi(k) \leq \phi_{MAX} \quad (16)$$

Here, x is a coordinate of the mobile machine 10 in the direction X, y is a coordinate of the mobile machine 10 in the direction Y, θ is an inclination angle of the mobile machine 10 with respect to a reference axis, and L is a wheelbase indicating a distance between a front wheel and a rear wheel of a vehicle V. $v_{MAX}$ and $\phi_{MAX}$ are upper limit values of a speed and a yaw rate set in advance.

There may be a plurality of trajectories capable of reaching the target position/posture AR2 from the starting position AR1. In this case, the trajectory setting unit 76A may calculate a plurality of trajectories capable of reaching the target position/posture AR2 from the starting position AR1 and may set a trajectory closest to the straight line L0 among a plurality of trajectories, as the trajectory TR1. Since the straight line L0 is a trajectory in a case where it is assumed that the pallet P is not inclined (the angle θP is 0) and a linear trajectory that connects from the starting position AR1 to the target position/posture AR2, a trajectory closest to the straight line L0 is set as the trajectory TR1, whereby it is possible to decrease a curve and to allow the mobile machine 10 to quickly reach the target position/posture AR2.

The trajectory setting unit 76A also sets the transport trajectory TR2 that is a passage to a transport position. The transport trajectory TR2 is a passage on which the mobile machine 10 that picks up the pallet P moves. In the present embodiment, the transport position is the starting position AR1, and the transport trajectory TR2 is a passage from the target position/posture AR2 to the starting position AR1 as the transport position. That is, the transport trajectory TR2 is a trajectory that overlaps the trajectory TR1, and is a trajectory in which the direction is reversed. Note that the transport trajectory TR2 may not be a trajectory that overlaps the trajectory TR1, and the transport position is not limited to the starting position AR1. That is, the transport trajectory TR2 may be a trajectory to a position (for example, the transport destination of the pallet P) other than the starting position AR1. A generation method of the transport trajectory TR2 is also the same as a generation method of the trajectory TR1.

(Transport Possibility Determination Result Acquisition Unit)

The transport possibility determination result acquisition unit 78A shown in FIG. 22 acquires a result of determination regarding whether or not the pallet P interferes with the adjacent object PA in a case where the mobile machine 10 transports the pallet P to the transport position, based on a detection result of the target object surrounding information. In the present embodiment, the transport possibility determination result acquisition unit 78A of the control device 28 includes an interference region calculation unit 80A and an interference determination unit 82A to determine whether or not the pallet P interferes with the adjacent object PA. Note that a subject of performing interference determination is not limited to the control device 28, and the arithmetic device 14 may perform interference determination. In a case where the arithmetic device 14 performs interference determination, it can be said that the arithmetic device 14 includes the transport possibility determination result acquisition unit 78A including the interference region calculation unit 80A and the interference determination unit 82A and executes processing described below. In this case, the transport possibility determination result acquisition unit 78A in the control device 28 acquires a determination result of interference determination in the arithmetic device 14 from the arithmetic device 14 through the communication unit 64.

(Interference Region Calculation Unit)

The interference region calculation unit 80A calculates interference regions IF1 and IF2. It can be said that the interference region calculation unit 80A calculates positions occupied by the interference regions IF1 and IF2 in the region A. The interference regions IF1 and IF2 are regions through which the pallet P held by the mobile machine 10 and the mobile machine 10 pass, respectively, in a case where the mobile machine 10 that holds the pallet P is moved along the trajectory TR1 and the transport trajectory TR2. Additionally, it can be said that the interference regions IF1 and IF2 are regions to which the regions (trajectories) through which the pallet P held by the mobile machine 10 and the mobile machine 10 pass in a case where the mobile machine 10 is moved along the trajectory TR1 and the transport trajectory TR2, are projected from the Z direction.

Figure 26A:
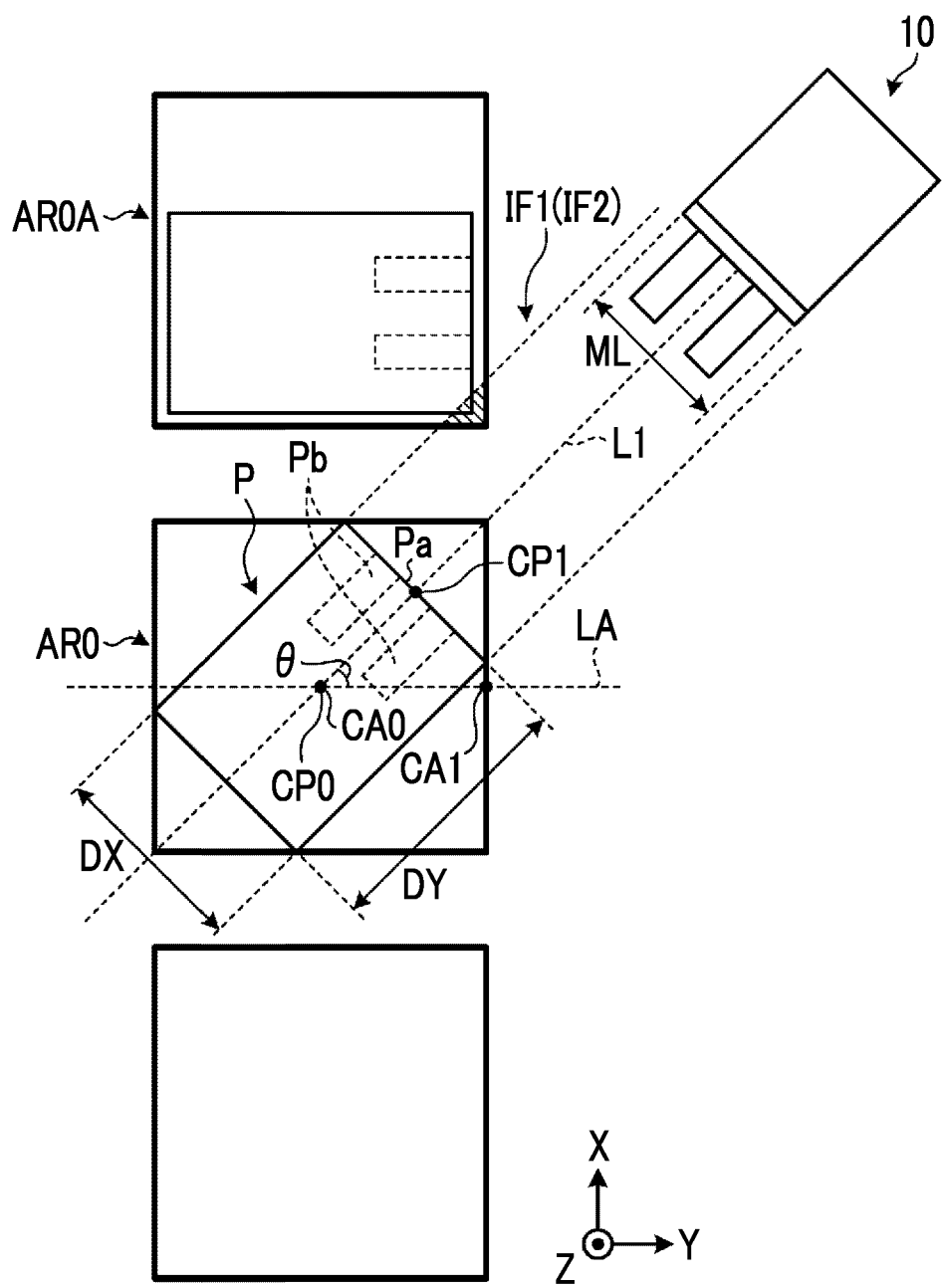
FIG. 26A is a schematic view showing an example of an interference region in a case where a width of the mobile machine is smaller than a width of the pallet.

FIG. 26A is a schematic view showing an example of interference regions in a case where a width of the mobile machine is smaller than a width of the pallet. In a case where a width ML of the mobile machine 10 is smaller than a width DX of the pallet P, the interference region IF1 is determined by the size of the pallet P and the trajectory TR1. The interference region calculation unit 80A calculates a region by spreading the trajectory TR1 toward both sides in the lateral direction by half of the width DX of the pallet P, as the interference region IF1. In this way, in a case where the width ML of the mobile machine 10 is smaller than the width DX of the pallet P, the interference region IF1 is calculated using the width DX of the pallet P. Next, a calculation method of the interference region IF2 in a case where the width ML of the mobile machine is smaller than the width DX of the pallet P will be described. In this case, the interference region IF2 is determined by the size of the pallet P and the transport trajectory TR2. The interference region calculation unit 80A calculates a region obtained by spreading the transport trajectory TR2 toward both sides in the lateral direction by half of the width DX of the pallet P, as the interference region IF2.

Figure 26B:
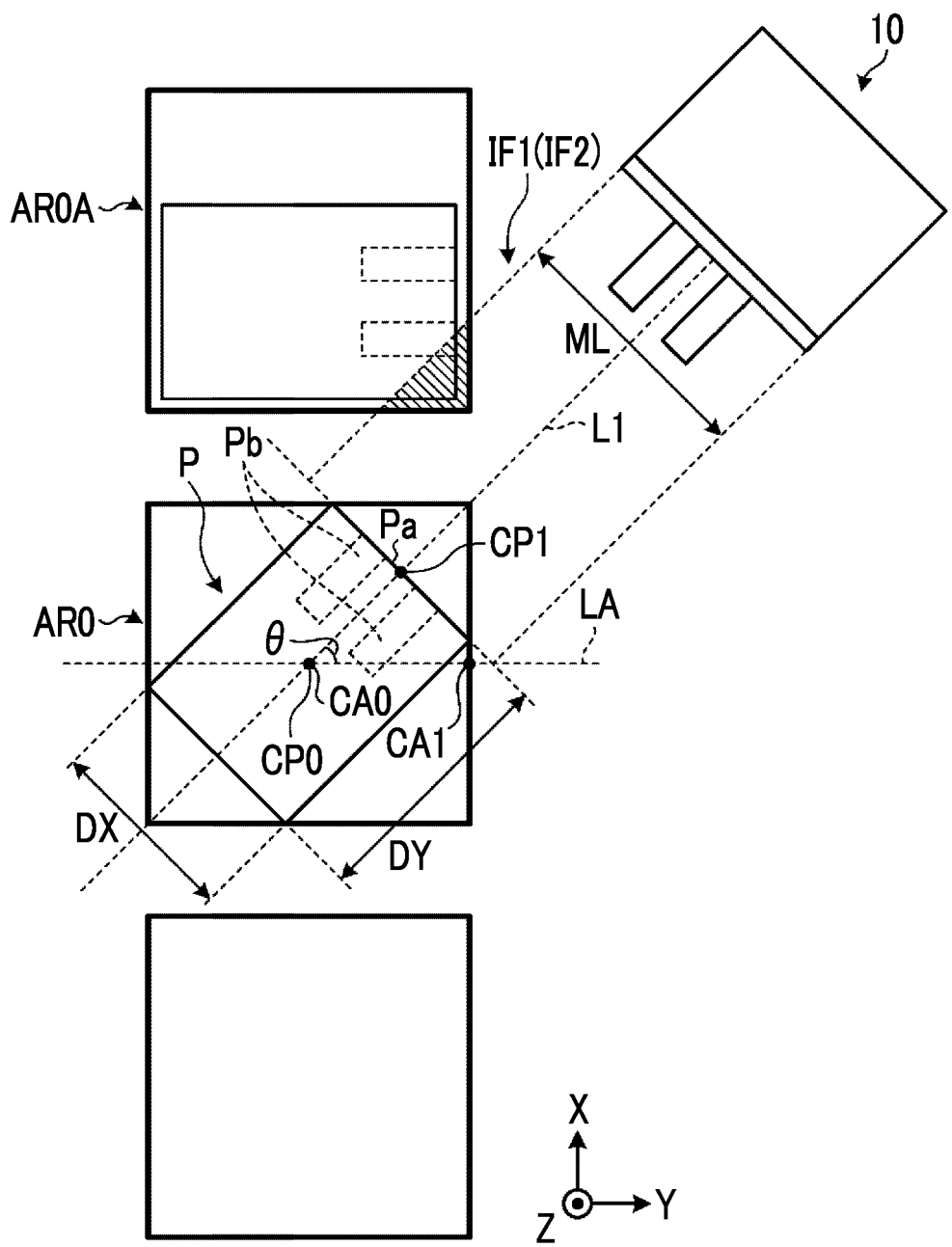
FIG. 26B is a schematic view showing an example of an interference region in a case where the width of the mobile machine is greater than the width of the pallet.

FIG. 26B is a schematic view showing an example of interference regions in a case where the width of the mobile machine is greater than the width of the pallet. In a case where the width ML of the mobile machine 10 is greater than the width DX of the pallet P, the interference region IF1 is determined by the size of the mobile machine 10 and the trajectory TR1. The interference region calculation unit 80A calculates a region obtained by spreading the trajectory TR1 toward both sides in the lateral direction by half of the length ML of the mobile machine 10 in the lateral direction, as the interference region IF1. In this way, in a case where the width ML of the mobile machine 10 is greater than the width DX of the pallet P, the interference region IF1 is calculated using the width ML of the mobile machine 10. Next, a calculation method of the interference region IF2 in a case where the width ML of the mobile machine is greater than the width DX of the pallet P will be described. In this case, the interference region IF2 is determined by the size of the mobile machine and the transport trajectory TR2. The interference region calculation unit 80A calculates a region obtained by spreading the transport trajectory TR2 toward both sides in the lateral direction by half of the width ML of the mobile machine, as the interference region IF2.

Values set in advance may be used as the length DX of the pallet P in the lateral direction and the length ML of the mobile machine 10 in the lateral direction, or the interference region calculation unit 80A may calculate the length DX of the pallet P in the lateral direction and the length ML of the mobile machine 10 in the lateral direction from the position information of the pallet P. Since the interference regions IF1 and IF2 may depend on information regarding the vehicle specification of the mobile machine 10, the interference regions IF1 and IF2 may also be calculated based on information regarding the vehicle specification of the mobile machine 10.

The interference region calculation unit 80A may set, as the interference regions IF1 and IF2, regions (hatched portions of FIGS. 26A and 26B) that overlap the installation region AR0A where the adjacent object PA is disposed, in a region through which the mobile machine 10 or the pallet P passes in a case where the mobile machine 10 is moved along the trajectory TR1 or the transport trajectory TR2. The mobile machine 10 may stagger right or left with respect to the trajectory TR1 depending on a method of making the mobile machine 10 approach the pallet P based on the position information and the posture information of the pallet P. In this case, the interference region IF1 may be calculated using a value obtained by further adding a width of staggering of the mobile machine 10 to the width of the interference region IF1. A value of the width of staggering may be a value set in advance.

In this way, in the present embodiment, the interference regions IF1 and IF2 are calculated by the interference region calculation unit 80A of the control device 28 in the mobile machine 10. Note that a subject of calculating the interference regions IF1 and IF2 is not limited to the control device 28 in the mobile machine 10, and, for example, the arithmetic device 14 may receive the target object surrounding information from the control device 28 to perform the calculation of the interference regions IF1 and IF2.

(Interference Determination Unit)

The interference determination unit 82A determines whether or not the mobile machine 10 interferes with the adjacent object PA in a case where the mobile machine 10 is moved along the trajectory TR1 and determines whether or not the mobile machine 10 and the pallet P interfere with the adjacent object in a case where the mobile machine 10 that holds the pallet P is moved along the transport trajectory TR2. Specifically, the interference determination unit 82A determines whether or not the adjacent object PA is disposed in the interference region IF1, as first stage processing. Thereafter, the interference determination unit 82A determines whether or not the adjacent object PA is disposed in the interference region IF2, as second stage processing. In a case where the trajectory TR1 coincides with the transport trajectory TR2, since the interference regions IF1 and IF2 coincide with each other, the interference determination unit 82A omits the second stage processing.

The first stage processing of the interference determination unit 82A will be described in more detail. The interference determination unit 82A acquires the position information and the posture information of the adjacent object PA from the target object surrounding information acquisition unit 74A to specify the position and the posture of the adjacent object PA, and determines whether or not the adjacent object PA is disposed in the interference region IF1. In the first stage processing, in a case where determination is made that the adjacent object PA is disposed in the interference region IF1, the interference determination unit 82A determines that the mobile machine 10 interferes with the adjacent object PA in the trajectory TR1 and that transport is impossible. In the first stage processing, in a case where determination is made that the adjacent object PA is not disposed in the interference region IF1, the interference determination unit 82A transits to the second stage processing.

The second stage processing of the interference determination unit 82A will be described in more detail. In the second stage processing, the interference determination unit 82A determines whether or not the adjacent object PA is disposed in the interference region IF2. In a case where determination is made that the adjacent object PA is disposed in the interference region IF2, the interference determination unit 82A determines that the mobile machine 10 or the pallet P interferes with the adjacent object PA in a case where the mobile machine 10 transports the pallet P on the transport trajectory TR2, and that transport is impossible. In a case where determination is made that the adjacent object PA is not disposed in the interference region IF2, the interference determination unit 82A determines that transport is possible. Note that, in a case where the trajectory TR1 and the transport trajectory TR2 coincide with each other, since the interference regions IF1 and IF2 coincide with each other, the interference determination unit 82A omits the second stage processing and regards the determination result of the first stage processing as an interference determination result of the interference determination unit 82A.

(Movement Method of Mobile Machine)

The movement control unit 72A shown in FIG. 22 stops the running following the route R in a case where the mobile machine 10 reaches the starting position AR1, that is, in a case where the position information of the pallet P or of the adjacent object PA is acquired. Then, in a case where the generation of the trajectory TR1 and the transport trajectory TR2 in the trajectory setting unit 76A and the determination of interference in the interference determination unit 82A are completed at the starting position AR1, the movement control unit 72A moves the mobile machine 10 from the starting position AR1 to the target position/posture AR2 to pass through the trajectory TR1 in a case where the interference determination unit 82A determines that transport is possible. The mobile machine 10 may not be stopped at the starting position AR1. In this case, the mobile machine generates the trajectory TR1 and the transport trajectory TR2 while continuously running from the starting position AR1 following the route R, and executes the determination of interference. Then, in a case where determination is made that there is no interference, the mobile machine 10 is switched to running on the trajectory TR1 from the route R. In this way, the route R and the trajectory TR1 are smoothly connected, and the mobile machine 10 is not stopped at the starting position AR1, whereby it is possible to suppress working time.

In the interference determination unit 82A, in a case where determination is made that transport is possible, the mobile machine 10 starts to move along the trajectory TR1. In a case where the mobile machine 10 moves along the trajectory TR1 and moves to the target position/posture AR2, the movement control unit 72A moves the mobile machine 10 straight from the target position/posture AR2 and makes the mobile machine 10 insert the fork 24 into the openings Pb of the pallet P to pick up the pallet P. The movement control unit 72A moves the mobile machine 10 that picks up the pallet P, following the transport trajectory TR2. In more detail, in a case where the interference determination unit 82A determines that the pallet P does not interfere with the adjacent object PA, the movement control unit 72A moves the mobile machine 10 following the trajectory TR1 and the transport trajectory TR2 to make the mobile machine 10 transport the pallet P. On the other hand, in a case where the interference determination unit 82A determines that the pallet P interferes with the adjacent object PA, the movement control unit 72A may not make the mobile machine 10 perform running following the trajectory TR1 or the transport trajectory TR2 and transport the pallet P. Hereinafter, specific description will be provided.

(Holding Possibility Determination)

In a case where determination is made that the pallet P or the mobile machine 10 interferes with the adjacent object PA, that is, in a case where determination is made that the mobile machine 10 cannot approach the pallet P on the trajectory TR1 or that the mobile machine cannot transport the pallet P on the transport trajectory TR2, the interference determination unit 82A determines whether or not the pallet P is holdable by the mobile machine 10. Holding the pallet P means, for example, inserting the fork 24 of the mobile machine 10 into the openings Pb of the pallet P. In a case where the mobile machine 10 moves along the trajectory TR1, the interference determination unit 82A determines that the pallet P can be held in a case where the mobile machine 10 can reach the pallet P (the target position/posture AR2) without interfering with the adjacent object PA. On the other hand, in a case where the mobile machine 10 moves along the trajectory TR1, the interference determination unit 82A determines that the pallet P cannot be held in a case where the mobile machine 10 interferes with the adjacent object PA and cannot reach the pallet P (the target position/posture AR2). The interference determination unit 82A determines whether or not the pallet P can be held, based on the trajectory TR1, the position information of the adjacent object PA, and information regarding the size of the mobile machine 10.

In a case where determination is made that the pallet P can be held, the interference determination unit 82A determines whether or not the pallet P held by the mobile machine 10 can be moved to a position with no interference with the adjacent object PA, based on vehicle type information of the mobile machine 10. In the present embodiment, in a case where the mobile machine 10 is a rack fork and is a vehicle type that is turnable on the spot, the interference determination unit 82A determines that the pallet P can be moved. The rack fork is a vehicle type that can move the fork 24 in the lateral direction (horizontal direction). The vehicle type that is turnable on the spot indicates a vehicle type in which the mobile machine 10 is turnable on the spot without moving the position (coordinates).

In a case where the interference determination unit 82A determines that the pallet P can be held and that the pallet P can be moved to the position with no interference with the adjacent object PA, the movement control unit 72A moves the mobile machine 10 along the trajectory TR1 and makes the mobile machine hold the pallet P and move the pallet P to the position with no interference with the adjacent object PA. For example, in a case of a rack fork, the movement control unit 72A makes the mobile machine 10 hold the pallet P, and then, moves the fork 24 to an opposite side to the adjacent object PA without moving the position (coordinates). In this case, since the pallet P held by the fork 24 is moved to the position with no interference with the adjacent object PA in the horizontal direction while the mobile machine 10 is kept at the same position, the pallet P does not interfere with the adjacent object PA even though the pallet P passes through the transport trajectory TR2 in a state in which the pallet P is held by the fork 24 without change. For example, in a case of a vehicle type that is turnable on the spot, the movement control unit 72A makes the mobile machine 10 hold the pallet P, and then, turns the mobile machine 10 such that the pallet P is away from the adjacent object PA, without moving the position (coordinates). Then, the movement control unit 72A moves the mobile machine 10. For example, since the direction of the mobile machine 10 is changed in a case when the mobile machine 10 turns on the spot, the transport trajectory TR2 may be updated by the trajectory setting unit 76A. In a case where the interference determination unit 82A determines that the pallet P cannot be held or in a case where the interference determination unit 82A determines that the pallet P cannot be moved to the position with no interference with the adjacent object PA, the movement control unit 72A notifies the arithmetic device 14 of, for example, an alarm indicating that the pallet P cannot be transported, through the communication unit 64 without making the mobile machine 10 perform running along the trajectory TR1.

(Movement Control Flow)

A flow of movement control of the mobile machine 10 described above will be described based on a flowchart. FIG. 27A is a flowchart illustrating a movement control flow of the mobile machine according to the fifth embodiment.

The control device 28 of the mobile machine 10 acquires information regarding the route R set by the arithmetic device 14 with the route information acquisition unit 70, and moves the mobile machine 10 to the starting position AR1 following the route R with the movement control unit 72A. In a case where the mobile machine 10 arrives at the starting position AR1, the control device 28 acquires the position information of the pallet P and the position information of the adjacent object PA with the target object surrounding information acquisition unit 74A (Step S10A). Then, the control unit 60 generates the trajectory TR1 and the transport trajectory TR2 based on the position information of the pallet P with the trajectory setting unit 76A (Step S11A). Then, the control device 28 acquires a determination result regarding whether or not the mobile machine 10 can approach the pallet P on the trajectory TR1 or whether or not the mobile machine 10 can transport the pallet P on the transport trajectory TR2, with the transport possibility determination result acquisition unit 78A (Step S12A). Specifically, the transport possibility determination result acquisition unit 78A calculates the interference regions IF1 and IF2 with the interference region calculation unit 80A, and acquires a determination result of determining whether or not the adjacent object PA is disposed in the interference regions IF1 and IF2, with the interference determination unit 82A. The interference determination unit 82A determines that the pallet P cannot be transported in a case where the adjacent object PA is disposed in the interference regions IF1 and IF2, and determines that the pallet P can be transported in a case where the adjacent object PA is not disposed in the interference regions IF1 and IF2.

In a case where the pallet P cannot be transported (Step S12A; No), that is, in a case where the pallet P cannot be transported without interfering with the adjacent object PA, the control device 28 determines whether or not the pallet P can be held, based on the trajectory TR1 and on the position information of the adjacent object PA (Step S14A).

In a case where the pallet P can be held (Step S14A; Yes), the control device 28 determines whether or not the pallet P can be moved to the position with no interference with the adjacent object PA, based on the vehicle type information. Specifically, the control device 28 determines whether or not the mobile machine 10 can move the fork 24 in the horizontal direction, that is, whether or not the mobile machine 10 is a rack fork (Step S18A). In a case where the mobile machine 10 can move the fork 24 in the horizontal direction (Step S18A; Yes), the control device 28 moves the mobile machine 10 following the trajectory TR1 to make the mobile machine 10 hold the pallet P, with the movement control unit 72A (Step S20A). In a case where the mobile machine 10 holds the pallet P, the movement control unit 72A moves the fork 24 in the horizontal direction to move the pallet P outside the range of the interference region, that is, to a position with no interference with the adjacent object PA (Step S22A). Then, the movement control unit 72A moves the mobile machine 10 along the transport trajectory TR2.

In a case where the mobile machine 10 cannot move the fork 24 in the horizontal direction (Step S18A; No), the control device 28 determines whether or not the mobile machine 10 is turnable (Step S24A). In a case where the mobile machine 10 is turnable (Step S24A; Yes), the control device 28 moves the mobile machine 10 following the trajectory TR1 to make the mobile machine 10 hold the pallet P, with the movement control unit 72A (Step S26A). In a case where the mobile machine 10 holds the pallet P, the control device 28 turns the mobile machine 10 to move the pallet P outside the range of the interference region (Step S28A). In a case where the mobile machine 10 is not turnable (Step S24A; No), that is, in a case where the pallet P cannot be moved to the position with no interference with the adjacent object PA, the control device 28 notifies the arithmetic device 14 of an alarm through the communication unit 64 (Step S30A). The alarm is information indicating that the pallet P can be held but cannot be transported due to interference with the adjacent object PA. The alarm may be output from an output unit in the mobile machine 10.

In a case where the pallet P cannot be held (Step S14A; No), the control device 28 notifies the arithmetic device 14 of an alarm without making the mobile machine 10 run following the trajectory TR1 (Step S16A). The alarm is information indicating that the pallet P cannot be held and that the pallet P cannot be picked up.

In a case where the pallet P can be transported (Step S12A; Yes), that is, in a case where the pallet P can be transported without interfering with the adjacent object PA, the control device 28 makes the mobile machine 10 run following the trajectory TR1 and hold the pallet P (Step S32A). In a case where the mobile machine 10 holds the pallet P, the control device 28 performs control such that the mobile machine 10 is moved to the transport position following the transport trajectory TR2 (Step S34A).

(Effects of Present Embodiment)

The mobile machine 10 determines whether or not the pallet P can be transported without interfering with the adjacent object PA, based on the target object surrounding information. For this reason, according to the present embodiment, it is possible to suppress interference of the pallet P and the adjacent object PA. Even in a case where the pallet P interferes with the adjacent object PA, in a case where the pallet P can be held and in a case where the mobile machine 10 can be moved to the position with no interference with the pallet P on the spot, after the pallet P is held by the mobile machine 10, the pallet P is moved outside the range of the interference region. Accordingly, since determination is made whether or not the pallet P interferes with the adjacent object PA, and determination is made whether or not to execute a transport operation, based on the type of the mobile machine 10, it is possible to more appropriately suppress interference of the pallet P and the adjacent object PA.

(Example where Starting Position is Set)

In the above description, a position on the route R where the sensor 26 can detect the position information of the pallet P is the starting position AR1, and the starting position AR1 is not a position set in advance. Note that the starting position AR1 may be a position set in advance. In this case, the starting position AR1 is set in advance as a position where the sensor 26 can detect the position information of the pallet P installed in the installation region AR0, for each installation region AR0. In this case, the route R may be set in advance as a passage from the start position to the starting position AR1. In a case of arriving at the starting position AR1 through the route R, the mobile machine 10 starts the detection of the position information of the pallet P with the sensor 26 at the starting position AR1 to acquire the position information of the pallet P. An example where the starting position AR1 is set in advance can be applied to other embodiments described below.

(Another Example of Sensor)

Figure 27B:
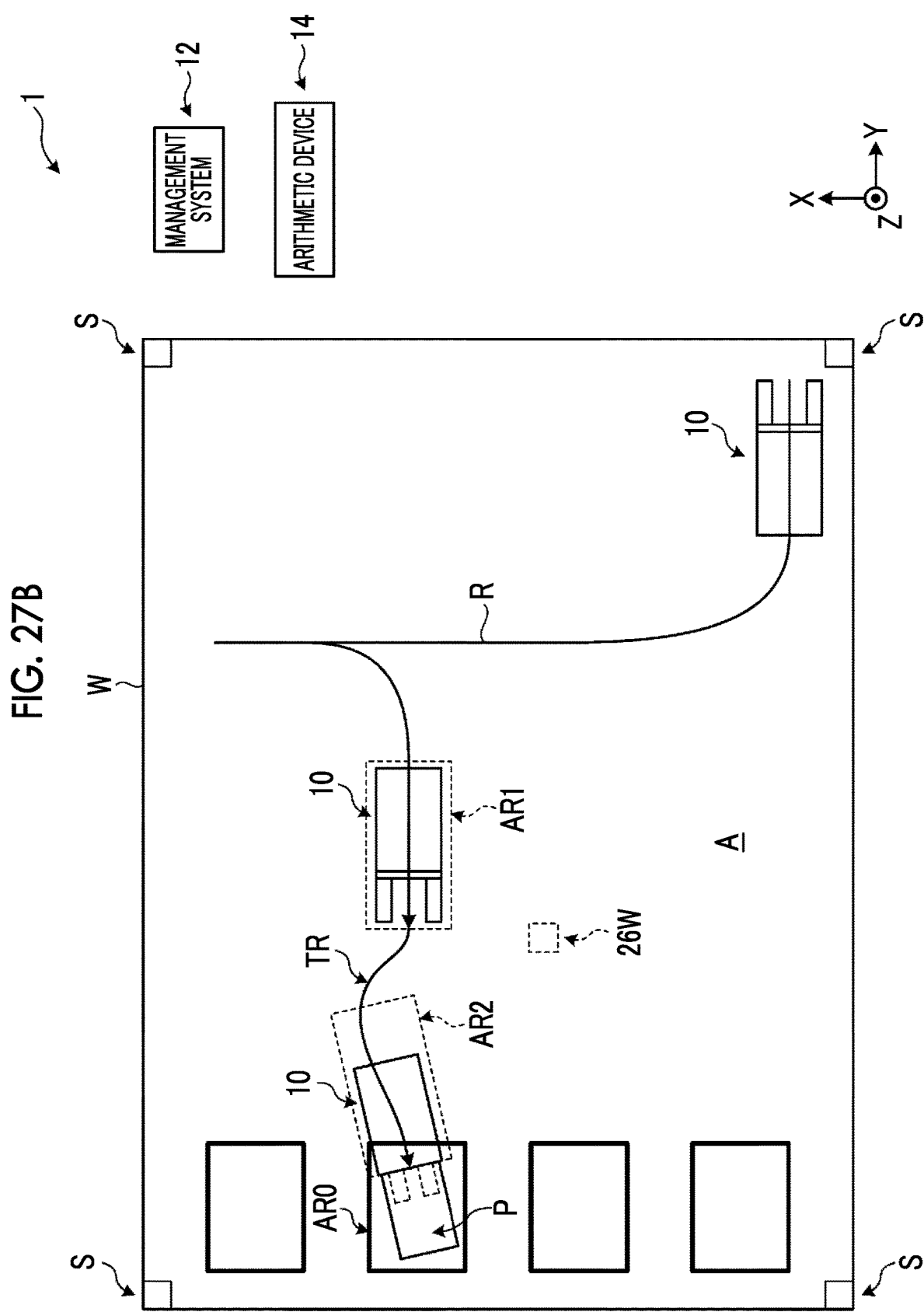
FIG. 27B is a schematic view showing another example of a sensor.

In the present embodiment, the control device 28 of the mobile machine 10 acquires the detection result of the position information of the pallet P from the sensor 26 provided in the mobile machine 10. Note that the position information of the pallet P is not limited as being detected by the sensor 26 in the mobile machine 10, and may be detected by a sensor provided at a place other than the mobile machine 10. FIG. 27B is a schematic view showing another example of the sensor. In the example of FIG. 27B, a sensor 26W is provided in facility W. The sensor 26W may detect the position information of the pallet P using the same method as in the sensor 26 described above. That is, for example, the sensor 26W may emit laser light in the facility W and may receive reflected light of laser light from the pallet P to detect the position information of the pallet P or may detect the position information of the pallet P with other systems, such as a camera. The control device 28 of the mobile machine 10 acquires the detection result of the position information of the pallet P from the sensor 26W, for example, through communication means, such as wireless communication. The sensor 26W is provided at any position, and may be fixed and provided in the facility W, for example. In this case, for example, the sensor 26w may be provided on a ceiling or the like of the facility W to detect the position and the direction of the pallet P from above, may be provided on a wall or the like of the facility W to detect the position and the direction of the pallet P from the side, or may be provided on both the ceiling and the wall. The sensor 26W may be provided in a mobile machine other than the mobile machine 10. The mobile machine other than the mobile machine 10 may be, for example, a vehicle that is provided with the sensor 26W and patrols in the facility W, a flying body (a drone or the like) that is provided with the sensor 26W and flies in the facility W, or the like. An example where the position information of the pallet P is detected with the sensor 26W provided at a place other than the mobile machine 10 can also be applied to other embodiments described below.

(Another Example of System)

In the present embodiment, the management system 12 determines the work details indicating information regarding the pallet P, and the arithmetic device 14 specifies the target mobile machine 10 or acquires the route R. Note that the details of processing of the management system 12 and the arithmetic device 14 are not limited thereto. For example, the management system 12 may perform at least a part of the processing of the arithmetic device 14, and the arithmetic device 14 may perform at least a part of the processing of the management system 12. The management system 12 and the arithmetic device 14 may be one device (computer).

Sixth Embodiment

Next, a sixth embodiment will be described. The sixth embodiment is different from the fifth embodiment in that a transport order of the pallet P and the adjacent object PA is determined in a case where the pallet P and the adjacent object PA interfere with each other. In the sixth embodiment, description of a configuration common to that in the fifth embodiment will not be repeated.

(Arithmetic Device)

Figure 28:
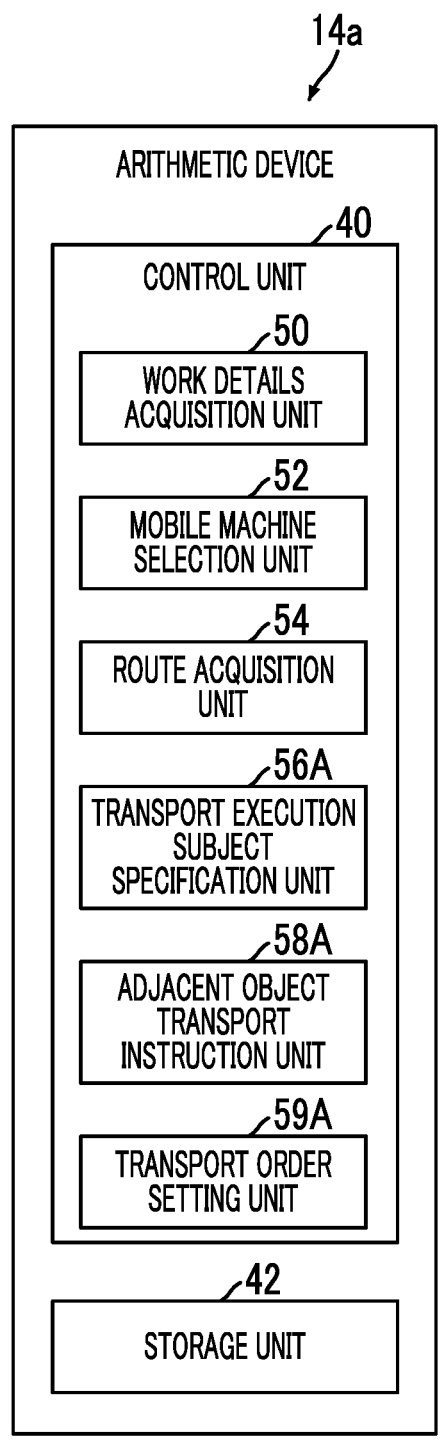
FIG. 28 is a configuration diagram of an arithmetic device according to the sixth embodiment.

FIG. 28 is a configuration diagram of an arithmetic device according to the sixth embodiment. As shown in FIG. 28, a control unit 40 of an arithmetic device 14a according to the sixth embodiment includes a transport order setting unit 59A. The transport order setting unit 59A sets a transport order of the pallet P and the adjacent object PA. That is, the transport order setting unit 59A determines an order in which the pallet P and the adjacent object PA are to be transported. The transport order setting unit 59A determines the transport order based on the position information of the pallet P and on the position information of the adjacent object PA. For example, in a case where the pallet P interferes with the adjacent object PA in transporting on the transport trajectory TR2, the pallet P can be transported on the transport trajectory TR2 in a case where the adjacent object PA is transported first. For this reason, for example, the transport order setting unit 59A determines to transport the adjacent object PA first, and then, to transport the pallet P, in a case where the pallet P interferes with the adjacent object PA in transporting on the transport trajectory TR2. In a case where there are a plurality of adjacent objects PA, the transport order setting unit 59A determines a transport order of a plurality of adjacent objects PA and the pallet P.

The transport order setting unit 59A may be included in the control device 28. That is, the control device 28 may set the transport order of the pallet P and the adjacent object PA based on the position information of the pallet P and on the position information of the adjacent object PA.

As shown in FIG. 28, the arithmetic device 14a according to the sixth embodiment includes a transport execution subject specification unit 56A. The transport execution subject specification unit 56A selects a mobile machine that transports the adjacent object PA. In a case where the interference determination unit 82A determines that the pallet P interferes with the adjacent object PA, the control device 28 of the mobile machine 10 transmits information indicating transporting the adjacent object PA, to the arithmetic device 14a. That is, the control device 28 transmits information indicating that the transport order setting unit 84 determines to transport the adjacent object PA first, to the arithmetic device 14a. The transport execution subject specification unit 56A selects a mobile machine that transports the adjacent object PA determined to be transported first by the transport order setting unit 59A.

The transport execution subject specification unit 56A selects a mobile machine that transports the adjacent object PA, from a plurality of moving bodies belonging to the facility W. That is, the transport execution subject specification unit 56A selects a mobile machine that transports the adjacent object PA, from a mobile machine 10 (first mobile machine) that is about to transport the pallet P and from a mobile machine (second mobile machine) other than the first mobile machine. Although the transport execution subject specification unit 56A may select a mobile machine that transports the adjacent object PA, using any method, for example, the transport execution subject specification unit 56A selects a mobile machine that transports the adjacent object PA, based on information regarding the vehicle specification of each mobile machine, the position information of the adjacent object PA, or the like. For example, the transport execution subject specification unit 56A may select a mobile machine that can transport the adjacent object PA quickly or may select a mobile machine that is on standby.

The arithmetic device 14a transmits instruction information indicating moving the adjacent object PA, to the selected mobile machine in the transport execution subject specification unit 56A. That is, in a case where the mobile machine 10 (first mobile machine) is selected, the control device 28 of the mobile machine 10 (first mobile machine) acquires instruction information indicating moving the adjacent object PA ahead of the pallet P from the arithmetic device 14a. In a case where the instruction information is acquired, the movement control unit 72A of the control unit 60 moves the adjacent object PA outside the interference region IF2. The movement control unit 72A may transport and temporarily dispose the adjacent object PA at a position outside the interference region IF2 but close to the current position or may transport the adjacent object PA to a designated transport destination. A passage through which the adjacent object PA is transported may be set by the mobile machine 10 (first mobile machine) or may be set by the arithmetic device 14a. In a case where the transport of the adjacent object PA ends, the mobile machine 10 (first mobile machine) transmits information indicating the end of the transport to the arithmetic device 14a. In a case where information indicating that the transport of the adjacent object PA ends is acquired, the arithmetic device 14a transmits instruction information indicating moving the pallet P to the mobile machine 10 (first mobile machine). The mobile machine 10 (first mobile machine) moves following the trajectory TR1 and the transport trajectory TR2 to transport the pallet P.

On the other hand, in a case where the second mobile machine that is a mobile machine other than the mobile machine 10 (first mobile machine) is selected, the arithmetic device 14*a* transmits an instruction indicating to be on standby to the mobile machine 10 (first mobile machine), and the mobile machine 10 (first mobile machine) is on standby on the spot. The arithmetic device 14*a* transmits an instruction indicating moving the adjacent object PA to the second mobile machine. In a case where the instruction indicating moving the adjacent object PA is acquired, the second mobile machine moves the adjacent object PA outside the interference region IF2. The second mobile machine may transport and temporarily dispose the adjacent object PA at a position outside the interference region IF2 but close to the current position or may transport the adjacent object PA to a designated transport destination. A passage through which the adjacent object PA is transported may be set by the second mobile machine or may be set by the arithmetic device 14*a*. In a case where the transport of the adjacent object PA ends, the second mobile machine transmits information indicating the end of the transport to the arithmetic device 14*a*. In a case where information indicating that the transport of the adjacent object PA ends is acquired, the arithmetic device 14*a* outputs an instruction indicating transporting the pallet P, to the mobile machine 10 (first mobile machine). The mobile machine 10 (first mobile machine) moves following the trajectory TR1 and the transport trajectory TR2 to transport the pallet P.

(Movement Control Flow)

Figure 29:
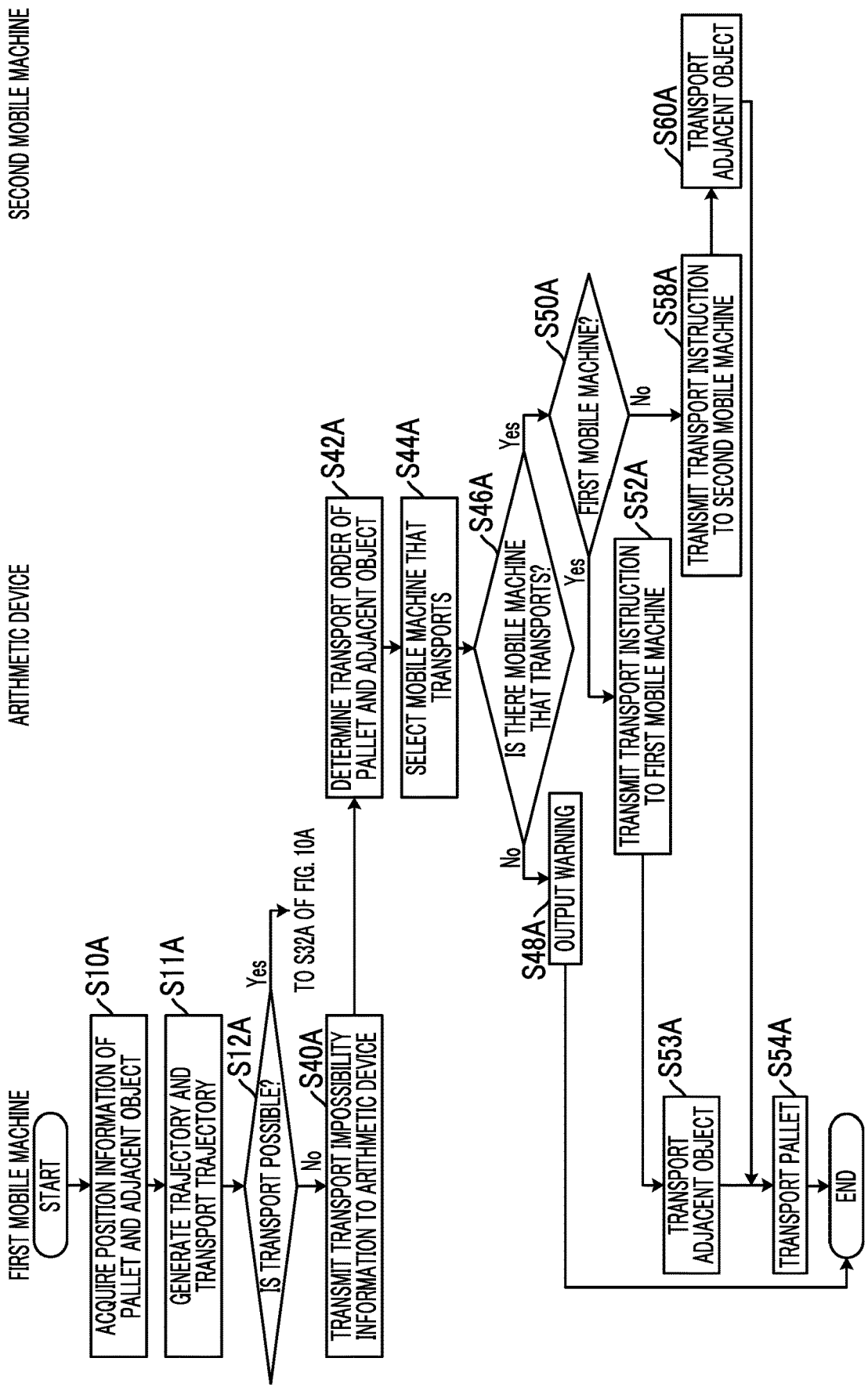
FIG. 29 is a flowchart illustrating an execution flow of a movement control system.

FIG. 29 is a flowchart illustrating an execution flow of the movement control system. Processing to Step S12A of the execution flow of the movement control system according to the sixth embodiment shown in FIG. 29 is the same as the processing to Step S12A of the fifth embodiment shown in FIG. 27A. In Step S12A, in a case where determination is made that transport is impossible (Step S12A; No), the control device 28 of the mobile machine 10 transmits transport impossibility information to the arithmetic device 14*a* (Step S40A). The arithmetic device 14*a* determines the transport order of the pallet P and the adjacent object PA based on the target object surrounding information, with the transport order setting unit 59A (Step S42A). Here, as described above, since determination is made before the processing of Step S40A that transport is impossible, the adjacent object PA that interferes with the pallet P in transporting the pallet P is transported first.

The arithmetic device 14*a* that determines the transport order selects a mobile machine that transports the adjacent object PA, with the transport execution subject specification unit 56A (Step S44A). In a case where there is a mobile machine that transports the adjacent object PA (Step S46A; Yes), and in a case where the mobile machine that transports the adjacent object PA is the first mobile machine (Step S50A; Yes), the arithmetic device 14*a* transmits a transport instruction of the adjacent object PA to the first mobile machine (Step S52A). The first mobile machine that receives the transport instruction of the adjacent object PA transports the adjacent object PA outside the range of the interference region IF2 (Step S53A). In a case where the transport of the adjacent object PA ends, the first mobile machine outputs information indicating the end of the transport to the arithmetic device 14*a*. In a case where the information indicating the end of the transport is acquired from the first mobile machine, the arithmetic device 14*a* transmits a transport instruction of the pallet P to the first mobile machine. In a case where the transport instruction is received, the first mobile machine holds the pallet P and executes a transport operation (Step S54A).

In a case where the mobile machine that transports the adjacent object PA is not the first mobile machine (Step S50A; No), the arithmetic device 14*a* transmits the transport instruction of the adjacent object PA to the second mobile machine as a mobile machine that transports the adjacent object PA (Step S58A). The second mobile machine that receives the transport instruction transports the adjacent object PA outside the range of the interference region IF2 (Step S60A). In a case where the adjacent object PA is transported outside the range of the interference region IF2, the second mobile machine transmits information (adjacent object exclusion completion notification) indicating that the adjacent object PA is transported outside the range of the interference region IF2, to the arithmetic device 14*a*. The arithmetic device 14*a* that receives the adjacent object exclusion completion notification transmits the transport instruction of the pallet P to the first mobile machine. The first mobile machine that receives the transport instruction of the pallet P holds the pallet P and executes the transport operation (Step S54A).

In a case where no mobile machine that can move the adjacent object PA is in the facility W (Step S46A; No), the arithmetic device 14*a* outputs an alarm (Step S48A). The arithmetic device 14*a* displays an output that transport is impossible, as the alarm on a graphical user interface (GUI).

As described above, in the sixth embodiment, in a case where the pallet P interferes with the adjacent object PA, the adjacent object PA is transported first. For this reason, according to the sixth embodiment, since the adjacent object PA is transported first, even though the pallet P is transported on the transport trajectory TR2, interference of the pallet P and the adjacent object PA is suppressed, and it is possible to transport the pallet P without interfering with the adjacent object PA.

Other Examples

In the above description, the mobile machine 10 detects the position information of the adjacent object PA that is a pallet, and determines interference with the pallet P that is installed in the installation region AR0. Note that, as described below, position information of an object (load) other than a pallet as well as the adjacent object PA that is a pallet may also be detected, and interference with the pallet P may be determined.

Figure 30:
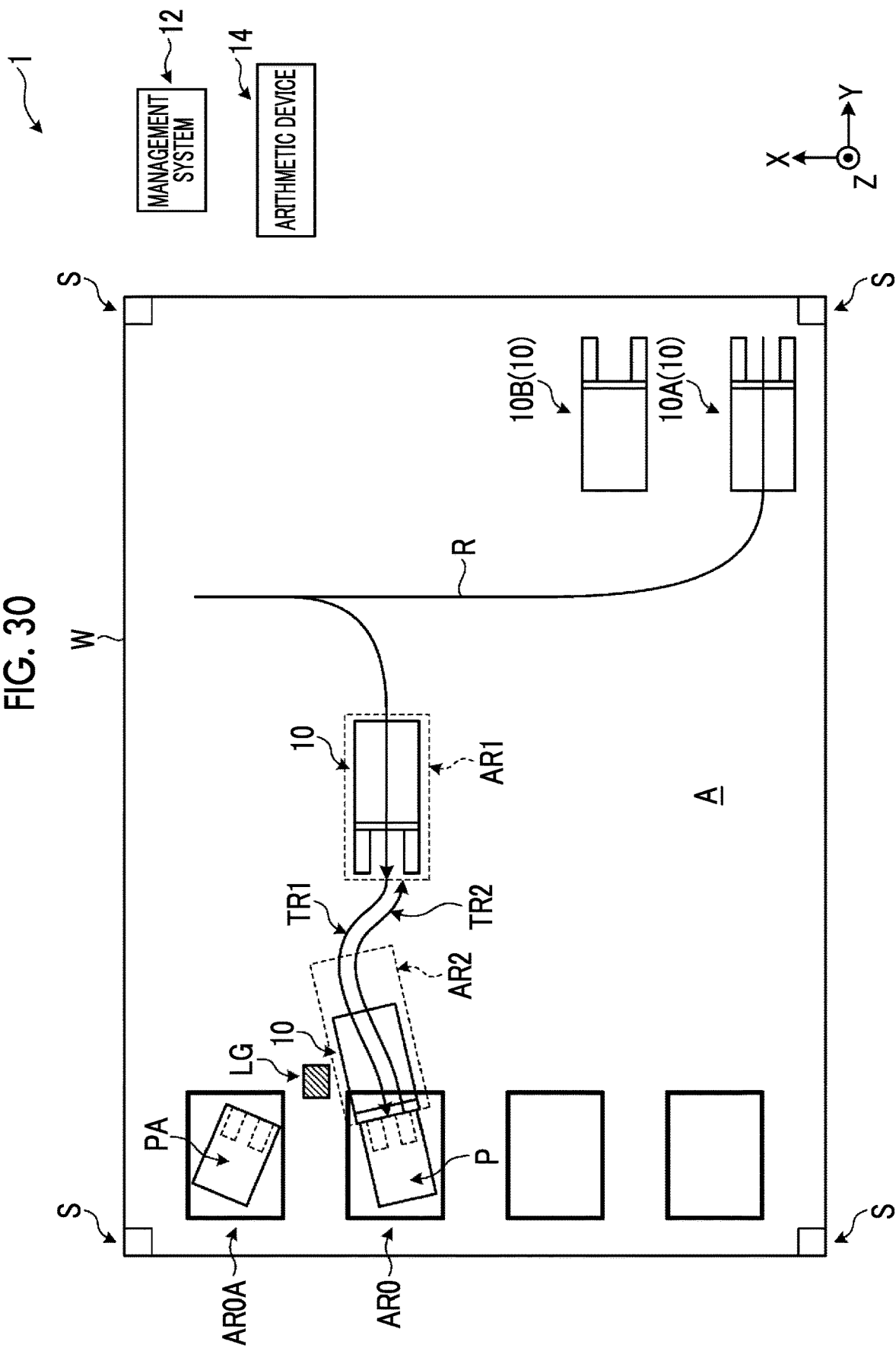
FIG. 30 is a schematic view illustrating processing in a case where a load is disposed in the vicinity of a target object.

FIG. 30 is a schematic view illustrating processing in a case where a load is disposed in the vicinity of the target object. In FIG. 30, an object LG is positioned in the vicinity of the pallet P. The object LG is, for example, a load and is positioned outside the range of the installation region where the pallet P or the adjacent object PA is disposed. The mobile machine 10 also detects position information and posture information of the object LG with the sensor 26 at the starting position AR1, in addition to the pallet P or the adjacent object PA. Then, the mobile machine 10 also determines interference of the pallet P and the object LG using the same method as the determination of interference of the pallet P and the adjacent object PA. The object LG may be an object in the installation region.

In a case where the object LG (load) is disposed in the vicinity of the pallet P, the control device 28 according to the present example further acquires information regarding a position and a posture of the load as the target object surrounding information. Then, a transport possibility determination result acquisition unit 78A in the control device 28 determines whether or not the pallet P interferes with the object LG in determining whether or not the pallet P interferes with the adjacent object PA. That is, the transport possibility determination result acquisition unit 78A performs determination taking into consideration the position information and the posture information of the load in addition to the position information and the posture information of the target object and the position information and the posture information of the adjacent object included in the target object surrounding information. Determination of interference of the object LG and the pallet P is performed in this way, whereby it is possible to more appropriately suppress interference of the pallet P and another object LG.

In a case where the transport possibility determination result acquisition unit 78A includes the interference region calculation unit 80A and the interference determination unit 82A, as described above, the interference region calculation unit 80A calculates the interference regions IF1 and IF2, and then, the interference determination unit 82A determines the presence or absence of interference with the adjacent object PA and the presence or absence of interference with the object LG based on the position information and the posture information of the object LG, in addition to the interference regions IF1 and IF2 and the position information and the posture information of the adjacent object PA.

(Configuration and Effects of Control Device, Mobile Machine, Movement Control System, Control Method, and Program)

The control device 28 of the mobile machine 10 according to the present disclosure includes the target object surrounding information acquisition unit 74A that acquires the detection result of the target object surrounding information including information regarding the position and the posture of the pallet P (target object) to be transported and information regarding the position and the posture of the adjacent object PA disposed in the vicinity of the pallet P (target object), the transport possibility determination result acquisition unit 78A that acquires the determination result regarding whether or not the pallet P (target object) interferes with the adjacent object PA in a case where the mobile machine 10 transports the pallet P (target object) to the transport position, based on the detection result of the target object surrounding information, and the movement control unit 72A that makes the mobile machine 10 transport the pallet P (target object) in a case where determination is made that the pallet P (target object) does not interfere with the adjacent object PA.

According to this configuration, in a case where the adjacent object is disposed in the vicinity of the target object to be transported and the target object interferes with the adjacent object in transporting the target object using the mobile machine configured to automatically move, since the transport operation is not executed, it is possible to suppress interference of the target object and the adjacent object.

The control device 28 of the mobile machine 10 according to the present disclosure further includes the trajectory setting unit 76A that sets the transport trajectory through which the mobile machine 10 passes in transporting the pallet P (target object) to the transport position, based on information of the position and the posture of the pallet P (target object) to be transported, and the transport possibility determination result acquisition unit 78A acquires the determination result determined based on the interference region that is calculated based on the transport trajectory and that is the region through which the pallet P (target object) passes in a case where the mobile machine 10 transports the pallet P (target object) along the transport trajectory, and based on information regarding the position and the posture of the adjacent object PA.

According to this configuration, the interference region is calculated based on the transport trajectory, and in a case where the adjacent object is disposed in the interference region, since determination is made that transport is impossible, it is possible to suppress interference of the target object and the adjacent object.

The transport possibility determination result acquisition unit 78A acquires a determination result regarding whether or not the pallet P (target object) is holdable, based on the target object surrounding information in a case where determination is made that the pallet P (target object) to be transported interferes with the adjacent object PA, and the movement control unit 72A makes the mobile machine 10 hold the pallet P (target object) and moves the pallet P (target object) to the position with no interference with the adjacent object PA in a case where determination is made that the pallet P (target object) is holdable.

According to this configuration, since determination is made whether or not the target object is holdable, based on the target object surrounding information, and in a case where determination is made that the target object is holdable, the mobile machine is made to hold the target object and move target object to the position with no interference with the adjacent object, it is possible to suppress interference of the target object and the adjacent object.

The mobile machine 10 has the fork 24 that holds the pallet P (target object) and that is movable in the horizontal direction, and the movement control unit 72A makes the mobile machine 10 hold the pallet P (target object) and then moves the fork 24 in the horizontal direction to move the pallet P (target object) to the position with no interference with the adjacent object PA in a case where determination is made that the pallet P (target object) is holdable.

According to this configuration, since the mobile machine is made to hold the target object and move the fork in the horizontal direction to move the target object to the position with no interference with the adjacent object, it is possible to suppress interference of the target object and the adjacent object.

The mobile machine 10 is turnable, and the movement control unit 72A makes the mobile machine 10 hold the pallet P (target object) and then turn to move the pallet P (target object) to the position with no interference with the adjacent object PA in a case where determination is made that the pallet P (target object) is holdable.

According to this configuration, since the mobile machine is made to hold the target object and turn to move the target object to the position with no interference with the adjacent object, it is possible to suppress interference of the target object and the adjacent object.

The movement control system according to the present disclosure includes the control device 28 and the arithmetic device 14, and the arithmetic device 14 includes the transport order setting unit 59A that acquires the target object surrounding information from the control device 28 in a case where determination is made that the pallet P (target object) interferes with the adjacent object PA and that sets the order of transporting the pallet P (target object) and the adjacent object based on the target object surrounding information.

According to this configuration, since the order of transporting the target object and the adjacent object is set based on the target object surrounding information in a case where determination is made that the target object interferes with the adjacent object, it is possible to suppress interference of the target object and the adjacent object.

The movement control unit 72A transports the adjacent object PA first and then transports the pallet P (target object) in a case where the transport order setting unit 59A sets the adjacent object PA to be transported first.

According to this configuration, since the order of transporting the target object and the adjacent object is set in a case where the interference determination unit determines that there is interference, and the adjacent object is set to be transported first, the adjacent object is transported first, and then, the target object is transported, it is possible to suppress interference of the target object and the adjacent object.

The arithmetic device 14a includes the transport execution subject specification unit 56A that specifies the mobile machine for transporting the adjacent object PA in a case where the transport order setting unit 59A sets the adjacent object PA to be transported first, and the adjacent object transport instruction unit 58A that outputs the command indicating transporting the adjacent object PA, to the mobile machine 10 specified by the transport execution subject specification unit 56A.

According to this configuration, since the mobile machine for transporting the adjacent object is specified in a case where the transport order setting unit sets the adjacent object to be transported first, and the instruction indicating transporting the adjacent object is output to the specified mobile machine, and the adjacent object is transported first, and then, the target object is transported, it is possible to suppress interference of the target object and the adjacent object.

The pallet P (target object) and the adjacent object PA are pallets, the target object surrounding information acquisition unit 74A further acquires the detection result of information regarding the position and the posture of the load positioned in the vicinity of the pallet P (target object), and the transport possibility determination result acquisition unit 78A acquires the determination result regarding whether or not the pallet P (target object) interferes with the load in a case where the mobile machine 10 transports the pallet P (target object) to the transport position, based on the detection result of the target object surrounding information.

According to this configuration, since the transport possibility determination result acquisition unit determines whether or not the target object interferes with the load further taking into consideration the position information and the posture information of the load, it is possible to restrain the target object from interfering with the load as well as with the adjacent object.

The mobile machine 10 according to the present disclosure includes the control device 28 or 28a of the above-described mobile machine 10.

According to this configuration, it is possible to suppress interference of the target object and the adjacent object.

The movement control system according to the present disclosure includes the above-described mobile machine 10, and the arithmetic device 14 or 14a that transmits information regarding the movement of the mobile machine 10 to the mobile machine 10.

According to this configuration, it is possible to suppress interference of the target object and the adjacent object.

A control method that controls the mobile machine 10 includes a step of acquiring the detection result of the target object surrounding information including information regarding the position and the posture of the pallet P (target object) and information regarding the position and the posture of the adjacent object PA disposed in the vicinity of the pallet P (target object), a step of acquiring the determination result regarding whether or not the pallet P (target object) interferes with the adjacent object PA in a case where the mobile machine 10 transports the pallet P (target object) to the transport position, based on the detection result of the target object surrounding information, and a step of making the mobile machine 10 transport the pallet P (target object) in a case where determination is made that the pallet P (target object) does not interfere with the adjacent object PA.

According to this configuration, it is possible to suppress interference of the target object and the adjacent object.

A program that causes a computer to execute a control method for controlling the mobile machine 10 causes the computer to execute a step of acquiring the detection result of the target object surrounding information including information regarding the position and the posture of the pallet P (target object) and information regarding the position and the posture of the adjacent object PA disposed in the vicinity of the pallet P (target object), a step of acquiring the determination result regarding whether or not the pallet P (target object) interferes with the adjacent object PA in a case where the mobile machine 10 transports the pallet P (target object) to the transport position, based on the detection result of the target object surrounding information, and a step of making the mobile machine 10 transport the pallet P (target object) in a case where determination is made that the pallet P (target object) does not interfere with the adjacent object PA.

According to this configuration, it is possible to suppress interference of the target object and the adjacent object.

Although the embodiments of the present invention have been described above, the embodiments are not limited by the contents of the embodiments. The above-described constituent elements include constituent elements that can be easily conceived by those skilled in the art, constituent elements that are substantially the same, and constituent elements in the scope of so-called equivalents. The above-described constituent elements can be combined as appropriate. Various omissions, substitutions, or alternations of the constituent elements can be made within the scope without departing from the gist of the above-described embodiments.

REFERENCE SIGNS LIST

1: movement control system
10: mobile machine
12: management system
14: arithmetic device
24: fork
26: sensor
72: movement control unit
74: target object information acquisition unit
76: interference determination unit
78: region setting unit
80: trajectory setting unit
A1: permitted region
A2: prohibited region
AR0: installation region
AR1: starting position
AR2: target position/posture (target position)
P: pallet (target object)
R: route
TR: trajectory

The invention claimed is:

1. A control device for a mobile machine that is provided in a mobile machine configured to automatically move, the control device comprising:
    a target object information acquisition unit that acquires a detection result of a direction of a target object;
    a region setting unit that sets a prohibited region through which a trajectory of the mobile machine is prohibited from passing, based on the direction of the target object;
    a trajectory setting unit that sets a trajectory from the mobile machine to a target position where the mobile machine is in a predetermined position and direction with respect to the target object such that the trajectory does not pass through the prohibited region; and
    a movement control unit that moves the mobile machine based on the trajectory.

2. The control device for a mobile machine according to claim 1,
    wherein the region setting unit divides a region where the mobile machine is movable, by a reference line connecting the mobile machine and the target object, and sets a region on an opposite side to a region on a side toward which the target object is directed, among divided regions, as the prohibited region.

3. The control device for a mobile machine according to claim 2,
    wherein the region setting unit acquires a maximum inclination trajectory set in advance as a trajectory of the mobile machine in a case where the target object is inclined at a predetermined upper limit angle and sets a region between the maximum inclination trajectory and the reference line, as a permitted region through which the trajectory of the mobile machine is permitted to pass, and
    the trajectory setting unit sets the trajectory to pass through the permitted region.

4. The control device for a mobile machine according to claim 1,
    wherein the region setting unit acquires a plurality of candidate trajectories calculated in advance as a trajectory of the mobile machine at each inclination angle of the target object and sets a permitted region through which the trajectory of the mobile machine is permitted to pass, based on the inclination angle in the candidate trajectory and on the direction of the target object acquired by the target object information acquisition unit, and
    the trajectory setting unit sets the trajectory to pass through the permitted region.

5. The control device for a mobile machine according to claim 4,
    wherein the region setting unit extracts a first candidate trajectory in which the inclination angle is closest to the direction of the target object, from among the candidate trajectories in which the inclination angle is smaller than the direction of the target object acquired by the target object information acquisition unit, extracts a second candidate trajectory in which the inclination angle is closest to the direction of the target object, from among the candidate trajectories in which the inclination angle is greater than the direction of the target object acquired by the target object information acquisition unit, and sets a region between the first candidate trajectory and the second candidate trajectory as the permitted region.

6. The control device for a mobile machine according to claim 4,
    wherein the region setting unit sets the candidate trajectory in which the inclination angle is closest to the direction of the target object acquired by the target object information acquisition unit, as the permitted region, and
    the trajectory setting unit sets the candidate trajectory set as the permitted region, as the trajectory.

7. The control device for a mobile machine according to claim 1, further comprising:
    an interference determination unit that acquires information regarding an interference position calculated in advance based on a position of an obstacle around the target object and on a position of a disposition region where the target object is disposed, the interference position being a position of the target object where the mobile machine interferes with the obstacle to be unable to reach the target position, and determines whether or not the target object is at the interference position, based on the detection result of the target object information acquisition unit,
    wherein the region setting unit and the trajectory setting unit set the prohibited region and the trajectory in a case where determination is made that the target object is not at the interference position.

8. The control device for a mobile machine according to claim 1, further comprising:
    a target object surrounding information acquisition unit that acquires a detection result of target object surrounding information including information regarding a position and a posture of the target object to be transported and information regarding a position and a posture of an adjacent object disposed in a vicinity of the target object; and
    a transport possibility determination result acquisition unit that acquires a determination result regarding whether or not the target object interferes with the adjacent object, based on the detection result of the target object surrounding information in a case where the mobile machine transports the target object to a transport position,
    wherein the movement control unit makes the mobile machine transport the target object in a case where determination is made that the target object does not interfere with the adjacent object.

9. The control device for a mobile machine according to claim 8, further comprising:
    a trajectory setting unit that sets a transport trajectory through which the mobile machine passes, in transporting the target object to the transport position based on the information regarding the position and the posture of the target object,
    wherein the transport possibility determination result acquisition unit acquires the determination result determined based on an interference region that is calculated based on the transport trajectory and that is a region through which the target object passes in a case where the mobile machine transports the target object along the transport trajectory, and based on the information regarding the position and the posture of the adjacent object.

10. The control device for a mobile machine according to claim 8,
    wherein the transport possibility determination result acquisition unit acquires a determination result regarding whether or not the target object is holdable, based on the target object surrounding information in a case where determination is made that the target object interferes with the adjacent object, and the movement control unit makes the mobile machine hold the target object and moves the target object to a position with no interference with the adjacent object in a case where determination is made that the target object is holdable.

11. The control device for a mobile machine according to claim 10, wherein the mobile machine has a fork that holds the target object and that is movable in a horizontal direction, and the movement control unit makes the mobile machine hold the target object and then moves the fork in the horizontal direction to move the target object to the position with no interference with the adjacent object in a case where determination is made that the target object is holdable.

12. The control device for a mobile machine according to claim 10, wherein the mobile machine is turnable, and the movement control unit makes the mobile machine hold the target object and then turn to move the target object to the position with no interference with the adjacent object in a case where determination is made that the target object is holdable.

13. The control device for a mobile machine according to claim 8, wherein the target object and the adjacent object are pallets, the target object surrounding information acquisition unit further acquires a detection result of information regarding a position and a posture of a load positioned in the vicinity of the target object, and the transport possibility determination result acquisition unit acquires a determination result regarding whether or not the target object interferes with the load in a case where the mobile machine transports the target object to the transport position, based on the detection result of the target object surrounding information.

14. A movement control system for a mobile machine, the movement control system comprising:

the control device for a mobile machine according to claim 8; and an arithmetic device, wherein the arithmetic device includes a transport order setting unit that acquires the target object surrounding information from the control device in a case where determination is made that the target object interferes with the adjacent object and that sets an order of transporting the target object and the adjacent object based on the target object surrounding information.

15. The movement control system for a mobile machine according to claim 14, wherein the movement control unit transports the adjacent object first and then transports the target object in a case where the transport order setting unit sets the adjacent object to be transported first.

16. The movement control system for a mobile machine according to claim 14, wherein the arithmetic device includes a transport execution subject specification unit that specifies the mobile machine for transporting the adjacent object in a case where the transport order setting unit sets the adjacent object to be transported first, and an adjacent object transport instruction unit that outputs a command indicating transporting the adjacent object, to the mobile machine specified by the transport execution subject specification unit.

17. A mobile machine comprising:

the control device for a mobile machine according to claim 1.

18. A movement control system comprising:

the mobile machine according to claim 17; and an arithmetic device that transmits information regarding movement of the mobile machine to the mobile machine.

19. A control method for a mobile machine that controls a mobile machine configured to automatically move, the control method comprising:

acquiring a detection result of a direction of a target object;

setting a prohibited region through which a trajectory of the mobile machine is prohibited from passing, based on the direction of the target object;

setting a trajectory from the mobile machine to a target position where the mobile machine is in a predetermined position and direction with respect to the target object such that the trajectory does not pass through the prohibited region; and moving the mobile machine based on the trajectory.

20. The control method for a mobile machine according to claim 19, further comprising:

acquiring a detection result of target object surrounding information including information regarding a position and a posture of the target object and information regarding a position and a posture of an adjacent object disposed in a vicinity of the target object;

acquiring a determination result regarding whether or not the target object interferes with the adjacent object, based on the detection result of the target object surrounding information in a case where the mobile machine transports the target object to a transport position; and making the mobile machine transport the target object in a case where determination is made that the target object does not interfere with the adjacent object.

21. A non-transitory computer-readable storage medium storing a program for controlling a mobile machine configured to automatically move, the program causing a computer to execute:

acquiring a detection result of a direction of a target object;

setting a prohibited region through which a trajectory of the mobile machine is prohibited from passing, based on the direction of the target object;

setting a trajectory from the mobile machine to a target position where the mobile machine is in a predetermined position and direction with respect to the target object such that the trajectory does not pass through the prohibited region; and moving the mobile machine based on the trajectory.

22. The non-transitory computer-readable storage medium according to claim 21, wherein the program causes the computer to further execute:

acquiring a detection result of target object surrounding information including information regarding a position and a posture of the target object and information regarding a position and a posture of an adjacent object disposed in a vicinity of the target object;

acquiring a determination result regarding whether or not the target object interferes with the adjacent object, based on the detection result of the target object surrounding information in a case where the mobile machine transports the target object to a transport position; and making the mobile machine transport the target object in a case where determination is made that the target object does not interfere with the adjacent object.

* * * * *